(12) United States Patent
Matsui

(10) Patent No.: US 11,402,858 B2
(45) Date of Patent: *Aug. 2, 2022

(54) ELECTRONIC STOPPER IN ACTUATOR CONTROL

(71) Applicant: The Boeing Company, Chicago, IL (US)

(72) Inventor: Gen Matsui, Bothell, WA (US)

(73) Assignee: The Boeing Company, Chicago, IL (US)

( * ) Notice: Subject to any disclaimer, the term of this patent is extended or adjusted under 35 U.S.C. 154(b) by 408 days.

This patent is subject to a terminal disclaimer.

(21) Appl. No.: 16/556,939

(22) Filed: Aug. 30, 2019

(65) Prior Publication Data
US 2020/0012298 A1 Jan. 9, 2020

Related U.S. Application Data

(63) Continuation of application No. 14/448,134, filed on Jul. 31, 2014, now Pat. No. 10,401,875.

(51) Int. Cl.
*H04B 15/00* (2006.01)
*G05D 3/20* (2006.01)
(Continued)

(52) U.S. Cl.
CPC ........... *G05D 3/20* (2013.01); *G05B 5/01* (2013.01); *G05B 19/19* (2013.01); *G05B 2219/42104* (2013.01)

(58) Field of Classification Search
CPC ....... B64C 13/16; B64C 13/503; B64C 13/46; B64C 13/10; B64C 19/00;
(Continued)

(56) References Cited

U.S. PATENT DOCUMENTS

| 4,463,297 A | 7/1984 | Bennett et al. |
| 5,310,136 A * | 5/1994 | Fowler ............ F41G 3/12 244/17.13 |

(Continued)

FOREIGN PATENT DOCUMENTS

| CN | 103391880 A | 11/2013 |
| EP | 0403842 A2 | 12/1990 |

(Continued)

OTHER PUBLICATIONS

Canadian Office Action dated Apr. 29, 2016, regarding application No. 2892556, 4 pages.

(Continued)

*Primary Examiner* — Jelani A Smith
*Assistant Examiner* — Paul A Castro
(74) *Attorney, Agent, or Firm* — Yee & Associates, P.C.

(57) ABSTRACT

A system and method of controlling a position of a structure. A position command indicating a desired position for the structure and a position feedback signal indicating the position of the structure are received. A position control signal is generated based on a difference between the desired position and the position indicated by the position feedback signal. A stop feedback signal relative to the position of the structure is received. A stop control signal is generated based on the stop feedback signal and a stop condition for the structure. One of the position control signal and the stop control signal is selected. The selected one of the position control signal and the stop control signal is provided to an actuator for controlling the position of the structure.

20 Claims, 33 Drawing Sheets

(51) Int. Cl.
*G05B 5/01* (2006.01)
*G05B 19/19* (2006.01)

(58) Field of Classification Search
CPC . B64C 2009/005; B64C 9/24; B60T 2230/03; B60T 2230/04; B60T 7/042; B60T 8/1703; B60T 8/325; B64D 45/00; B64D 45/0005; G05D 1/0066; G05D 1/0607; G05D 1/0858; G05D 3/20; G05D 3/00; Y02T 50/14; E05F 15/646; E05F 15/43; E05F 15/73; E05F 2015/434; E05F 2015/487; E05F 15/60; E05F 5/02; E05F 5/025; G05B 5/01; G05B 19/19; G05B 2219/42104
See application file for complete search history.

(56) References Cited

U.S. PATENT DOCUMENTS

| | | | |
|---|---|---|---|
| 6,134,086 | A | 10/2000 | Kim |
| 6,225,904 | B1 | 5/2001 | Jaffe et al. |
| 9,405,277 | B2 | 8/2016 | Cameron |
| 9,708,054 | B2 * | 7/2017 | Huynh ............... B64D 45/0005 |
| 2003/0077163 | A1 * | 4/2003 | Eveker ............... F04D 27/0207 415/1 |
| 2011/0210210 | A1 | 9/2011 | Lebrun |
| 2012/0025033 | A1 | 2/2012 | Huynh et al. |
| 2012/0234983 | A1 | 9/2012 | Wildman |
| 2012/0296500 | A1 | 11/2012 | Yamasaki |
| 2013/0036922 | A1 | 2/2013 | Stewart et al. |
| 2013/0318873 | A1 | 12/2013 | Knijnenburg |
| 2014/0117918 | A1 * | 5/2014 | Park ...................... G05B 19/19 318/611 |
| 2016/0031547 | A1 | 2/2016 | Matsui |

FOREIGN PATENT DOCUMENTS

| | | |
|---|---|---|
| EP | 0786710 A1 | 7/1997 |
| JP | 3084022 U | 2/2002 |
| JP | 2005069972 A | 3/2005 |
| JP | 2012126389 A | 7/2012 |
| JP | 2014108466 A | 6/2014 |
| JP | 2014125065 A | 7/2014 |

OTHER PUBLICATIONS

European Search Report dated Jul. 22, 2016, regarding application No. 15179297.5, 7 pages.
Canadian Intellectual Property Office Office Action, dated Mar. 8, 2017, regarding Application No. 2,892,556, 4 pages.
Canadian Office Action, dated Dec. 22, 2017, regarding Application No. 2892556, 3 pages.
The State Intellectual Property Office of China, Notification of First Office Action, Search Report, and English Translation, dated Jul. 3, 2018, regarding Application No. 201510441366.7, 11 pages.
Japan Patent Office, Notice of Reasons for Rejection and English Translation, dated Mar. 18, 2019, regarding Application No. 2015-098125, 9 pages.
Office Action, dated Jan. 21, 2016, regarding U.S. Appl. No. 14/448,134, 17 pages.
Final Office Action, dated Aug. 12, 2016, regarding U.S. Appl. No. 14/448,134, 17 pages.
Office Action, dated Jul. 13, 2017, regarding U.S. Appl. No. 14/448,134, 22 pages.
Final Office Action, dated Mar. 19, 2018, regarding U.S. Appl. No. 14/448,134, 22 pages.
Notice of Allowance, dated Apr. 11, 2019, regarding USPTO Application No. 14/448,134, 12 pages.
European Office Action dated Sep. 3, 2020, regarding Application No. 15179297.5, 6 pages.

* cited by examiner

ELECTRONIC STOPPER IN ACTUATOR CONTROL

This application is a continuation of U.S. patent application Ser. No. 14/448,134, filed on Jul. 31, 2014, now U.S. Pat. No. 10,401,875, which is incorporated by reference herein in its entirety.

BACKGROUND INFORMATION

1. Field

The present disclosure relates generally to aircraft and, in particular, to aircraft flight control surfaces and controlling aircraft flight control surfaces. More particularly, the present disclosure relates to a method and apparatus for implementing stops to limit a range of movement of an aircraft flight control surface or other moveable structure electronically in an actuator controller for controlling the position of the flight control surface or other structure via an actuator.

2. Background

Aircraft flight control surfaces are moveable structures on an aircraft that allow a pilot to adjust and control the attitude of the aircraft in flight. Ailerons, elevators, rudders, spoilers, flaps, slats, and air brakes are examples of aircraft flight control surfaces for fixed-wing aircraft.

Aircraft flight control surfaces may be moved by appropriate actuators. For example, various types of linear actuators, rotary actuators, or other actuators may be used to move aircraft flight control surfaces. For example, without limitation, a linear actuator for moving an aircraft flight control surface may comprise a piston in a cylinder.

It may be desirable to limit the range of allowable movement of an aircraft flight control surface to avoid undesired conditions. For example, without limitation, undesired contact of the flight control surface with another object may result in structural inconsistencies in the flight control surface. The range of movement of an aircraft flight control surface may be limited using appropriate stops. For example, the range of movement of an aircraft flight control surface may be limited using appropriate mechanical stops. Alternatively, the range of movement of an aircraft flight control surface may be limited using electronic limiting functions.

Various limitations and drawbacks may be associated with using mechanical stops and current electronic limiting functions to limit the range of movement of aircraft flight control surfaces. A system and method for limiting the range of movement of aircraft flight control surfaces and other moveable structures that overcome the limitations and drawbacks of current systems and methods may be desired. For example, without limitation, a relatively simple and robust system for implementing stops to limit the range of movement of aircraft flight control surfaces and other movable structures with high reliability and accuracy may be desired.

Accordingly, it would be beneficial to have a method and apparatus that take into account one or more of the issues discussed above, as well as possible other issues.

SUMMARY

The illustrative embodiments of the present disclosure provide a method of controlling a position of a structure. A position command indicating a desired position for the structure and a position feedback signal indicating the position of the structure are received. A position control signal is generated based on a difference between the desired position and the position indicated by the position feedback signal. A stop feedback signal relative to the position of the structure is received. A stop control signal is generated based on the stop feedback signal and a stop condition for the structure. A selected one of the position control signal and the stop control signal is selected. The selected one of the position control signal and the stop control signal is provided to an actuator for controlling the position of the structure.

The illustrative embodiments of the present disclosure also provide an apparatus comprising a position controller, a stop controller, and a control signal selector. The position controller is configured to receive a position command indicating a desired position for a structure, receive a position feedback signal indicating the position of the structure, and generate a position control signal based on a difference between the desired position and the position indicated by the position feedback signal. The stop controller is configured to receive a stop feedback signal relative to the position of the structure and generate a stop control signal based on the stop feedback signal and a stop condition for the structure. The control signal selector is configured to select a selected one of the position control signal and the stop control signal and provide the selected one of the position control signal and the stop control signal to an actuator for controlling the position of the structure.

The illustrative embodiments of the present disclosure also provide another method of controlling a position of a structure. A position command indicating a desired position for the structure and a position feedback signal indicating the position of the structure are received. A position control signal is generated based on a difference between the desired position and the position indicated by the position feedback signal. A stop feedback signal relative to the position of the structure is received. A stop control signal is generated based on a difference between the stop feedback signal and a stop position for the structure. A selected one of the position control signal and the stop control signal is selected based on relative magnitudes of the position control signal and the stop control signal. The selected one of the position control signal and the stop control signal is provided to an actuator for controlling the position of the structure.

The features, functions, and benefits can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof, will best be understood by reference to the following detailed description of illustrative embodiments of the present disclosure when read in conjunction with the accompanying drawings, wherein:

DETAILED DESCRIPTION

Figure 1:
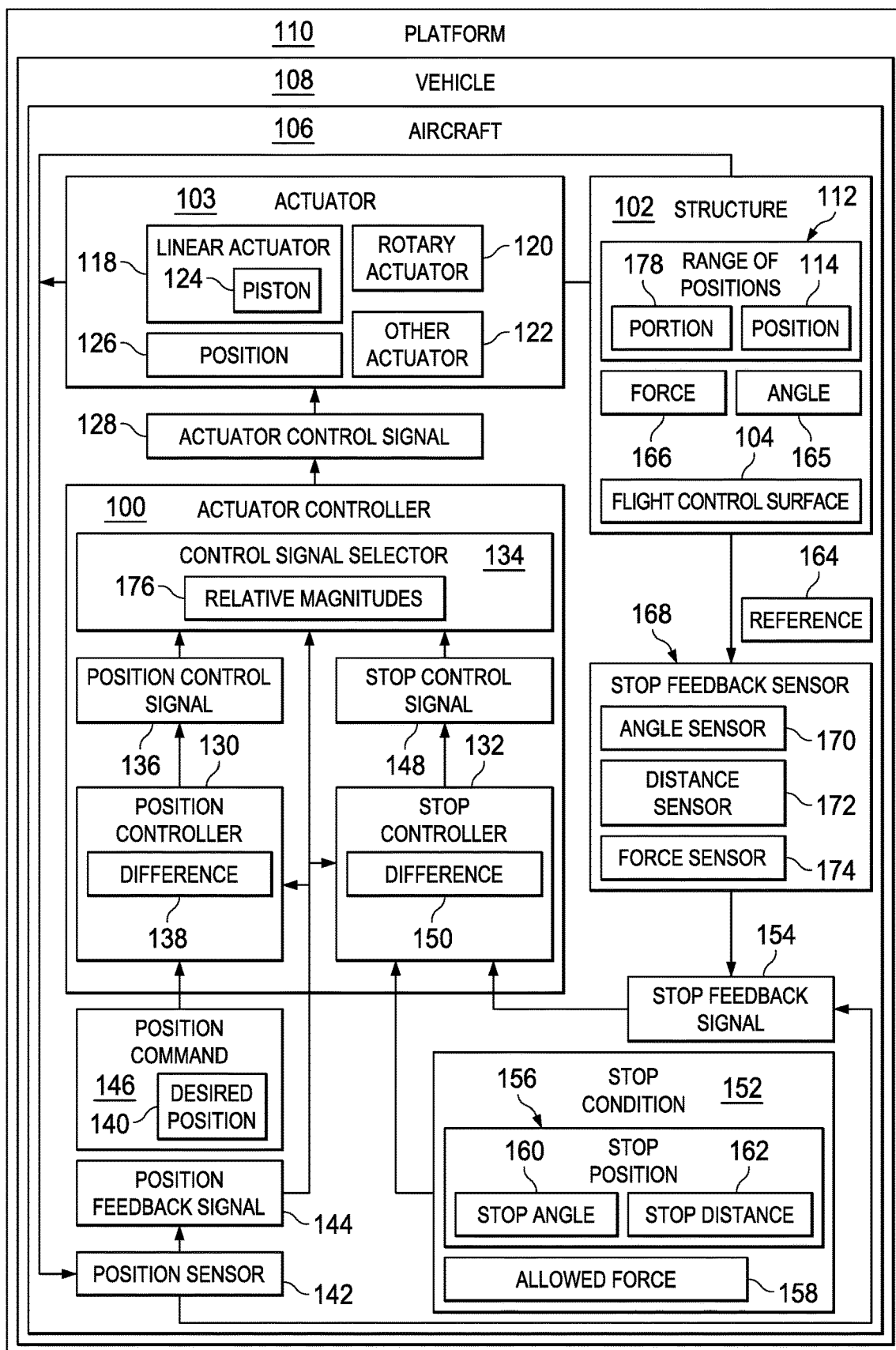
FIG. 1 is an illustration of a block diagram of an actuator controller for implementing electronic stops in accordance with an illustrative embodiment.

The different illustrative embodiments recognize and take into account a number of different considerations. "A number of," as used herein with reference to items, means one or more items. For example, "a number of different considerations" are one or more different considerations.

The different illustrative embodiments recognize and take into account that an actuator for moving an aircraft flight control surface may be controlled by a control system using an electronic feedback loop to move the aircraft flight control surface to a desired position. For example, a desired position for a piston in a linear actuator for moving an aircraft flight control surface may be indicated in a command to the control system. A measured position of the piston may be provided as feedback to the control system. The control system may be configured to control the actuator to drive the difference between the desired position for the piston and the measured position of the piston to zero or to a small value, such that the measured position of the piston provided as feedback closely follows the desired position for the piston as indicated in the command.

The different illustrative embodiments recognize and take into account that in a typical control system for controlling the position of an aircraft flight control surface, the position of the flight control surface may be closely represented by the measured position of the actuator for moving the flight control surface provided as feedback. However, the measured position of the actuator typically may not represent the position of the aircraft flight control surface exactly. For example, the position related characteristic of an aircraft flight control surface that ultimately affects the behavior of an aircraft is the angle of the surface. The angle of an aircraft flight control surface may be closely represented by the position of a piston in an actuator for moving the aircraft flight control surface. However, the position of the piston may not provide an exact representation of the angle of the aircraft flight control surface because of factors such as, for example, kinematic variations, structural compliance, and sensor tolerance. Therefore, the precision obtainable by a system for controlling the position of an aircraft flight control surface may be affected largely by characteristics associated with the feedback parameter.

The different illustrative embodiments recognize and take into account that, in some cases, the desired precision for controlling the position of an aircraft flight control surface may be especially stringent for particular portions of the functional range of movement of the aircraft flight control surface. For example, the desired precision for controlling the position of an aircraft flight control surface may be especially stringent when the range of allowable movement for the aircraft flight control surface needs to be constrained accurately to avoid an undesired condition, such as a structural inconsistency in the aircraft flight control surface, while maximizing the performance of the aircraft flight control surface. In such cases, the desired precision may not be achievable with a controller using only a single feedback parameter.

The different illustrative embodiments recognize and take into account that stops may be used to limit the range of movement of an aircraft flight control surface. The different illustrative embodiments recognize and take into account that it may be desirable that stops for an aircraft flight control surface are implemented precisely, such that the flight control surface may be moved to the limit of the range of movement of the flight control surface, or very close to the limit, without going beyond the limit of the range of movement for all conceivable conditions.

Mechanical stops may be used to limit the range of movement of an aircraft flight control surface or other moveable structure. The different illustrative embodiments recognize and take into account that the use of mechanical stops to limit the range of movement of an aircraft flight control surface may add undesirable weight to an aircraft. The use of mechanical stops to limit the range of movement of an aircraft flight control surface also may impose limitations on the optimization of aerodynamic and other performance characteristics of the flight control surface.

The different illustrative embodiments recognize and take into account that electronic limiting functions may be used to limit the range of movement of an aircraft flight control surface or other moveable structure. The different illustrative embodiments recognize and take into account that known electronic limiting functions for limiting the range of movement of an aircraft flight control surface may be relatively complex, may require a relatively large amount of computational processing power, and may use sophisticated algorithms that require many parameters from high-integrity aircraft sensor systems. The different illustrative embodiments recognize and take into account that, despite their complexity and sophistication, many electronic limiting functions for limiting the range of movement of aircraft flight control surfaces may not be adequately robust or reliable.

Illustrative embodiments implement electronic stops in an actuator controller to limit the range of movement of an aircraft flight control surface or other moveable structure. An actuator controller in accordance with an illustrative embodiment includes a position controller and a stop controller. The position controller generates a position control signal for controlling the actuator to move the aircraft flight control surface or other moveable structure to a desired position. The stop controller generates a stop control signal for controlling the actuator to move the aircraft flight control surface or other moveable structure with respect to stops for limiting the range of movement of the aircraft flight control surface or other moveable structure. A control signal selector selects one of the position control signal or the stop control signal to provide to the actuator to control the movement of the aircraft flight control surface or other moveable structure.

For example, without limitation, an actuator for moving an aircraft flight control surface or other moveable structure may be a linear actuator comprising a moveable piston connected to the aircraft flight control surface or other moveable structure. In this case, a position controller in an actuator controller in accordance with an illustrative embodiment may generate a position control signal based on a difference between a desired position for the piston indicated in a command and the position of the piston indicated by position feedback. A stop controller in the actuator controller in accordance with an illustrative embodiment may generate a stop control signal to regulate characteristics associated with stops for the flight control surface or other moveable structure using stop feedback for the characteristics. For example, without limitation, characteristics associated with stops for an aircraft flight control surface may include the angle of the surface, the distance of the surface from a reference, force on the aircraft flight control surface, other characteristics associated with the stops for the aircraft flight control surface, or a combination of a plurality of various different characteristics. For example, without limitation, a control signal selector in the actuator controller in accordance with an illustrative embodiment may select one of the position control signal or the stop control signal to provide to the actuator to control the position of the aircraft flight control surface or other moveable structure using relatively simple logic based on relative magnitudes of the position control signal and the stop control signal.

Illustrative embodiments implement stops for an aircraft flight control surface electronically in an actuator controller. Illustrative embodiments may be used to limit the range of movement of an aircraft flight control surface without incurring the weight penalty that may be incurred when mechanical stops are used to limit the range of movement of an aircraft flight control surface. Using electronic stops to limit the range of movement of an aircraft flight control surface in accordance with an illustrative embodiment does not limit optimization of aircraft aerodynamics. Reducing aircraft weight and optimization of aircraft aerodynamics may allow for reducing the cost of operating an aircraft in which stops for limiting the range of movement of aircraft flight control surfaces are implemented electronically in an actuator controller in accordance with an illustrative embodiment.

The functions performed by a position controller, stop controller, and control signal selector to implement stops in an actuator controller in accordance with an illustrative embodiment are relatively computationally simple compared to existing relatively complex electronic limiting functions that may be used to limit the range of movement of aircraft flight control surfaces. Therefore, the use of illustrative embodiments for limiting the range of movement of aircraft flight control surfaces in place of known electronic limiting functions may reduce recurring costs associated with computational throughput on an aircraft as well as non-recurring costs associated with developing and fine tuning more complex controllers for limiting the range of movement of aircraft flight control surfaces.

Illustrative embodiments provide a simple robust system to implement stops for a moveable structure with high reliability and accuracy. For example, illustrative embodiments may provide precision electronic stops in order to prevent the excursion of flight control surface deflections outside of an allowable range. For example, without limitation, stops may be defined in terms of surface position, by aerodynamic hinge movement, or in another appropriate manner. The objective may be to avoid physical interference with an external object or to prevent structural inconsistencies.

Turning to FIG. 1, an illustration of a block diagram of an actuator controller for implementing electronic stops is depicted in accordance with an illustrative embodiment. Actuator controller 100 may be configured to control the position of structure 102 via actuator 103 and to implement electronic stops to limit the range of movement of structure 102.

Structure 102 may comprise any moveable structure that may be moved by actuator 103. For example, without limitation, structure 102 may comprise flight control surface 104 on aircraft 106. For example, without limitation, flight control surface 104 may comprise an aileron, an elevator, a rudder, a spoiler, a flap, a slat, an air brake, or any other appropriate flight control surface on aircraft 106.

Aircraft 106 may be a commercial passenger aircraft, a cargo aircraft, a private or personal aviation aircraft, a military aircraft, or any other appropriate type of aircraft that may be used for any appropriate purpose. Aircraft 106 may be a fixed wing, rotary wing, or lighter-than-air aircraft. Aircraft 106 may comprise a manned aircraft or an unmanned aerial vehicle.

Aircraft 106 is an example of vehicle 108. Illustrative embodiments may be used to control the position of structure 102 on vehicle 108 other than aircraft 106. Vehicle 108 may comprise any vehicle configured for operation in the air, in space, on land, on water, under water, or in any other medium or combinations of media.

Vehicle 108 is an example of platform 110. Illustrative embodiments may be used to control the position of structure 102 on platform 110 other than vehicle 108. Platform 110 may be fixed or mobile.

Structure 102 may be movable within range of positions 112. Range of positions 112 also may be referred to as the range of movement or range of motion of structure 102. For example, without limitation, range of positions 112 may be defined by physical limits on the movement of structure 102 with respect to aircraft 106, vehicle 108, or platform 110 to which structure 102 may be attached. Structure 102 may be attached to aircraft 106, vehicle 108, or platform 110 in any appropriate manner such that structure 102 may be moved within range of positions 112 with respect to aircraft 106, vehicle 108, or platform 110, respectively.

Structure 102 may be in position 114 in range of positions 112 at any point in time. For example, without limitation, position 114 may be referred to as the current position of structure 102, the actual position of structure 102, the measured position of structure 102, the sensed position of structure 102, or using other appropriate terminology.

Actuator 103 may comprise any appropriate device or system configured to move structure 102. For example, without limitation, actuator 103 may comprise linear actuator 118, rotary actuator 120, other actuator 122, or any appropriate combination of various different types of actuators for moving structure 102. For example, without limitation, linear actuator 118 may comprise piston 124.

Actuator 103 may be in position 126 at any point in time. For example, without limitation, position 126 may be referred to as the current position of actuator 103, the actual position of actuator 103, the measured position of actuator 103, the sensed position of actuator 103, or using other appropriate terminology.

Actuator 103 may be connected to structure 102 in any appropriate manner such that structure 102 may be moved within range of positions 112 by the movement of actuator 103. In the present application, including in the claims, unless specifically stated otherwise, terms referring to the movement of actuator 103 refer to movement of a moveable portion of actuator 103 that is connected to structure 102 such that structure 102 moves in response to movement of the moveable portion of actuator 103. Similarly, in the present application, including in the claims, unless specifically stated otherwise, terms referring to the position of actuator 103 refer to the position of the moveable portion of actuator 103 that is connected to structure 102 such that the position of structure 102 changes in response to changes in the position of the moveable portion of actuator 103.

For example, without limitation, actuator 103 may comprise piston 124 moveably mounted in a cylinder. Piston 124 may be connected to structure 102 in an appropriate manner such that structure 102 moves in response to the movement of piston 124 in the cylinder. In this case, references to the movement of actuator 103 are references to the movement of piston 124 with respect to the cylinder and references to the position of actuator 103 are references to the position of a point on piston 124 relative to the cylinder.

Movement of actuator 103 to change the position of structure 102 attached to actuator 103 may be controlled by actuator control signal 128. For example, without limitation, actuator control signal 128 may be characterized by a sign and a magnitude. The sign of actuator control signal 128 may be selected to indicate a direction of the movement of actuator 103 in response to actuator control signal 128. The absolute value magnitude of actuator control signal 128 may be selected to indicate a magnitude of the movement of actuator 103 in the direction indicated by the sign of actuator control signal 128. For example, without limitation, the speed, acceleration, or force of movement of actuator 103 may be relative to the absolute value magnitude of actuator control signal 128. For example, without limitation, actuator 103 may be configured to move or accelerate more quickly or with greater force in response to actuator control signal 128 having a greater absolute value magnitude. The sign and magnitude of actuator control signal 128 may refer to any characteristics of actuator control signal 128 that may be used to control the direction and magnitude, respectively, of movement of actuator 103. The sign and magnitude of actuator control signal 128 may or may not correspond to the polarity and magnitude, respectively, of voltage or current components of actuator control signal 128.

Actuator controller 100 may be configured to generate actuator control signal 128 to control the position of structure 102 via actuator 103 and to implement stops for limiting the range of movement of structure 102. Actuator controller 100 may include position controller 130, stop controller 132, and control signal selector 134.

Position controller 130 may be configured to generate position control signal 136 based on difference 138 between position 114 of structure 102 and desired position 140 for structure 102. Difference 138 between position 114 of structure 102 and desired position 140 for structure 102 may be referred to as an error. Position controller 130 may be configured to determine difference 138 between position 114 of structure 102 and desired position 140 for structure 102 in any appropriate manner.

Position controller 130 may be configured to generate position control signal 136 based on difference 138 between position 114 of structure 102 and desired position 140 for structure 102 in any appropriate manner. For example, position control signal 136 may be generated by multiplying difference 138 between position 114 of structure 102 and desired position 140 for structure 102 by a gain or by using any other control method commonly available and appropriate for the system being controlled. For example, without limitation, position control signal 136 may be generated in an appropriate manner such that sign and magnitude characteristics of position control signal 136 may indicate difference 138 between position 114 of structure 102 and desired position 140 for structure 102.

Position 114 of structure 102 may be identified using position sensor 142. Position sensor 142 may include any appropriate device or system for identifying position 114 of structure 102 in any appropriate manner. Position 114 of structure 102 may be represented by position 126 of actuator 103 for moving structure 102. Therefore, for example, without limitation, position sensor 142 may be configured to identify position 114 of structure 102 by identifying position 126 of actuator 103 in any appropriate manner.

Position 114 of structure 102 as identified by position sensor 142 may be provided to position controller 130 as position feedback signal 144. Position feedback signal 144 may indicate position 114 of structure 102 for use by position controller 130 in any appropriate form.

Desired position 140 for structure 102 may be indicated by position command 146 provided to position controller 130. Position command 146 may indicate desired position 140 for structure 102 for use by position controller 130 in any appropriate form. For example, without limitation, position command 146 may indicate desired position 140 for structure 102 in an appropriate form for determining difference 138 between desired position 140 for structure 102 and position 114 of structure 102 as indicated in position feedback signal 144 with minimal or no modification by position controller 130. For example, when position feedback signal 144 indicates position 114 of structure 102 as represented by position 126 of actuator 103 for moving structure 102, position command 146 may indicate desired position 140 for structure 102 as a desired position for actuator 103 corresponding to desired position 140 for structure 102. Position command 146 may be generated in any appropriate manner by an appropriate interface for controlling structure 102 by a human or machine operator.

Stop controller 132 may be configured to generate stop control signal 148 based on difference 150 between stop condition 152 for structure 102 and a corresponding current condition of structure 102 indicated by stop feedback signal 154. Difference 150 between stop condition 152 for structure 102 and the corresponding current condition of structure 102 may be referred to as an error. Stop controller 132 may be configured to determine difference 150 between stop condition 152 for structure 102 and the corresponding current condition of structure 102 in any appropriate manner.

Stop controller 132 may be configured to generate stop control signal 148 based on difference 150 between stop condition 152 for structure 102 and the corresponding current condition of structure 102 in any appropriate manner. For example, stop control signal 148 may be generated by multiplying difference 150 between stop condition 152 for structure 102 and the corresponding current condition of structure 102 by a gain or by using any other control method commonly available and appropriate for the system being controlled. For example, without limitation, sign and magnitude characteristics of stop control signal 148 may indicate difference 150 between stop condition 152 for structure 102 and the corresponding current condition of structure 102.

Stop condition 152 may define a stop for structure 102 in terms of a condition associated with structure 102 that may be relative to the position of structure 102. Stop condition 152 may be identified in any appropriate manner and provided to stop controller 132 or otherwise made available for use by stop controller 132 in any appropriate form. Stop condition 152 may be fixed or variable.

For example, without limitation, stop condition 152 may indicate stop position 156, allowed force 158, or any other appropriate condition or combination of conditions for defining a stop for structure 102. Stop position 156 may indicate a position for structure 102 beyond which structure 102 should not be moved. Stop position 156 may be indicated in any appropriate manner. For example, without limitation, stop position 156 may be indicated by stop angle 160, stop distance 162, or in any other appropriate manner for indicating a position of structure 102 beyond which structure 102 should not be moved. Stop angle 160 may indicate an angle for structure 102 beyond which structure 102 should not be moved. Stop distance 162 may indicate a minimum allowed distance between structure 102 and reference 164. For example, without limitation, reference 164 may comprise a physical object or structure. Allowed force 158 may indicate a maximum amount of force on structure 102.

Stop feedback signal 154 may indicate a current condition of structure 102 corresponding to stop condition 152. For example, without limitation, stop feedback signal 154 may indicate a current condition of structure 102 in any appropriate form for use by stop controller 132 to determine difference 150 between stop condition 152 and the corresponding current condition of structure 102. For example, when stop condition 152 comprises stop position 156, stop feedback signal 154 may indicate position 114 of structure 102. When stop condition 152 comprises stop angle 160, stop feedback signal 154 may indicate the current angle 165 of structure 102. When stop condition 152 comprises stop distance 162, stop feedback signal 154 may indicate the current distance of structure 102 from reference 164. When stop condition 152 comprises allowed force 158, stop feedback signal 154 may indicate a current force 166 on structure 102.

A current condition indicated in stop feedback signal 154 may be identified using stop feedback sensor 168. Stop feedback sensor 168 may comprise any appropriate device or system for identifying a current condition of structure 102 corresponding to stop condition 152. For example, when stop condition 152 comprises stop position 156, stop feedback sensor 168 may comprise any appropriate sensor for identifying position 114 of structure 102. Preferably, the sensor for identifying position 114 of structure 102 for stop feedback signal 154 identifies position 114 of structure 102 other than by identifying position 126 of actuator 103 for moving structure 102. When stop condition 152 comprises stop angle 160, stop feedback sensor 168 may comprise any appropriate angle sensor 170 for identifying the current angle 165 of structure 102. When stop condition 152 comprises stop distance 162, stop feedback sensor 168 may comprise any appropriate distance sensor 172 for identifying the current distance of structure 102 from reference 164. When stop condition 152 comprises allowed force 158, stop feedback sensor 168 may comprise any appropriate force sensor 174 for identifying a current force 166 on structure 102.

Control signal selector 134 is configured to select either one of position control signal 136 from position controller 130 or stop control signal 148 from stop controller 132 to use as actuator control signal 128 for controlling the movement of actuator 103. Actuator controller 100 may be configured to select either position control signal 136 or stop control signal 148 to use as actuator control signal 128 based on relative magnitudes 176 of position control signal 136 and stop control signal 148. For example, based on relative magnitudes 176 of position control signal 136 and stop control signal 148, control signal selector 134 may select position control signal 136 to use as actuator control signal 128 when the current condition of structure 102 is relatively far from stop condition 152 or position command 146 is directing movement of structure 102 in a direction away from stop condition 152. Based on relative magnitudes 176 of position control signal 136 and stop control signal 148, control signal selector 134 may select stop control signal 148 to use as actuator control signal 128 when the current condition of structure 102 is relatively close to stop condition 152 and position command 146 is directing movement of structure 102 in a direction toward stop condition 152.

Certain features of particular implementations of position controller 130 and stop controller 132 may be managed appropriately depending on the selection made by control signal selector 134. For example, without limitation, integrators in the unselected one of position controller 130 and stop controller 132 may be disabled.

Control signal selector 134 may be configured to always use position control signal 136 from position controller 130 for actuator control signal 128, and never use stop control signal 148 from stop controller 132 for actuator control signal 128, when position 114 of structure 102 is in portion 178 of range of positions 112 for structure 102. For example, without limitation, portion 178 of range of positions 112 may be relatively far from any stops that may be defined for structure 102 by stop condition 152. Use of stop control signal 148 to control the position of structure 102 may not be optimal when position 114 of structure 102 is in portion 178 of range of positions 112. Alternatively, or in addition, measurements needed to provide stop feedback signal 154 may not be made, or may not be made accurately, when position 114 of structure 102 is in portion 178 of range of positions 112. In this case, it may not be possible to generate stop control signal 148 by stop controller 132 when position 114 of structure 102 is in portion 178 of range of positions 112.

Actuator controller 100 may be implemented using any appropriate analog devices, digital devices, or a combination of analog and digital devices. Digital devices that may be used to implement actuator controller 100 may include discrete digital logic devices and programmable processor units.

The different embodiments may be implemented using any hardware device or system capable of running program code. For example, without limitation, some or all of the functions performed by actuator controller 100 as described herein may be implemented on a processor unit that serves to execute instructions for software that may be loaded into memory. The processor unit may be a number of processors, a multi-processor core, or some other type of processor, depending on the particular implementation. A number, as used herein with reference to an item, means one or more items. Further, the processor unit may be implemented using a number of heterogeneous processor systems in which a main processor is present with secondary processors on a single chip. As another illustrative example, the processor unit may be a symmetric multi-processor system containing multiple processors of the same type.

Instructions for the operating system, applications, and/or programs may be located in storage devices, which may be in communication with the processor unit through a communications fabric. For example, without limitation, the instructions may be in a functional form on persistent storage. These instructions may be loaded into memory for execution by the processor unit. The processes of the different embodiments may be performed by a processor unit using computer-implemented instructions, which may be located in a memory.

These instructions may be referred to as program instructions, program code, computer usable program code, or computer readable program code that may be read and executed by a processor in a processor unit. The program code in the different embodiments may be embodied on different physical or computer readable storage media, such as memory or persistent storage.

Program code may be located in a functional form on computer readable media and may be loaded onto or transferred to a processor unit for execution. The program code and computer readable media form a computer program product in these examples. In one example, the computer readable media may be computer readable storage media or computer readable signal media.

Computer readable storage media may include, for example, an optical or magnetic disk that is inserted or placed into a drive or other device that is part of persistent storage for transfer onto a storage device, such as a hard drive, that is part of persistent storage. Computer readable storage media also may take the form of a persistent storage, such as a hard drive, a thumb drive, or a flash memory.

In these examples, computer readable storage media is a physical or tangible storage device used to store program code rather than a medium that propagates or transmits program code. Computer readable storage media is also referred to as a computer readable tangible storage device or a computer readable physical storage device. In other words, computer readable storage media is a media that can be touched by a person.

Alternatively, program code may be transferred to a processor unit using computer readable signal media. Computer readable signal media may be, for example, a propagated data signal containing program code. For example, computer readable signal media may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code may be downloaded over a network to persistent storage from another device or data processing system through computer readable signal media for use within a processor unit. For instance, program code stored in a computer readable storage medium in a server data processing system may be downloaded over a network from the server to the processor unit. The data processing system providing the program code may be a server computer, a client computer, or some other device capable of storing and transmitting program code.

In another illustrative example, the processor unit may take the form of a hardware unit that has circuits that are manufactured or configured for a particular use. This type of hardware may perform operations without needing program code to be loaded into a memory from a storage device to be configured to perform the operations.

For example, when the processor unit takes the form of a hardware unit, the processor unit may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code may be omitted, because the processes for the different embodiments are implemented in a hardware unit.

In still another illustrative example, the processor unit may be implemented using a combination of processors found in computers and hardware units. The processor unit may have a number of hardware units and a number of processors that are configured to run program code. With this depicted example, some of the processes may be implemented in the number of hardware units, while other processes may be implemented in the number of processors.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined, divided, or combined and divided into different blocks when implemented in different illustrative embodiments.

Figure 2:
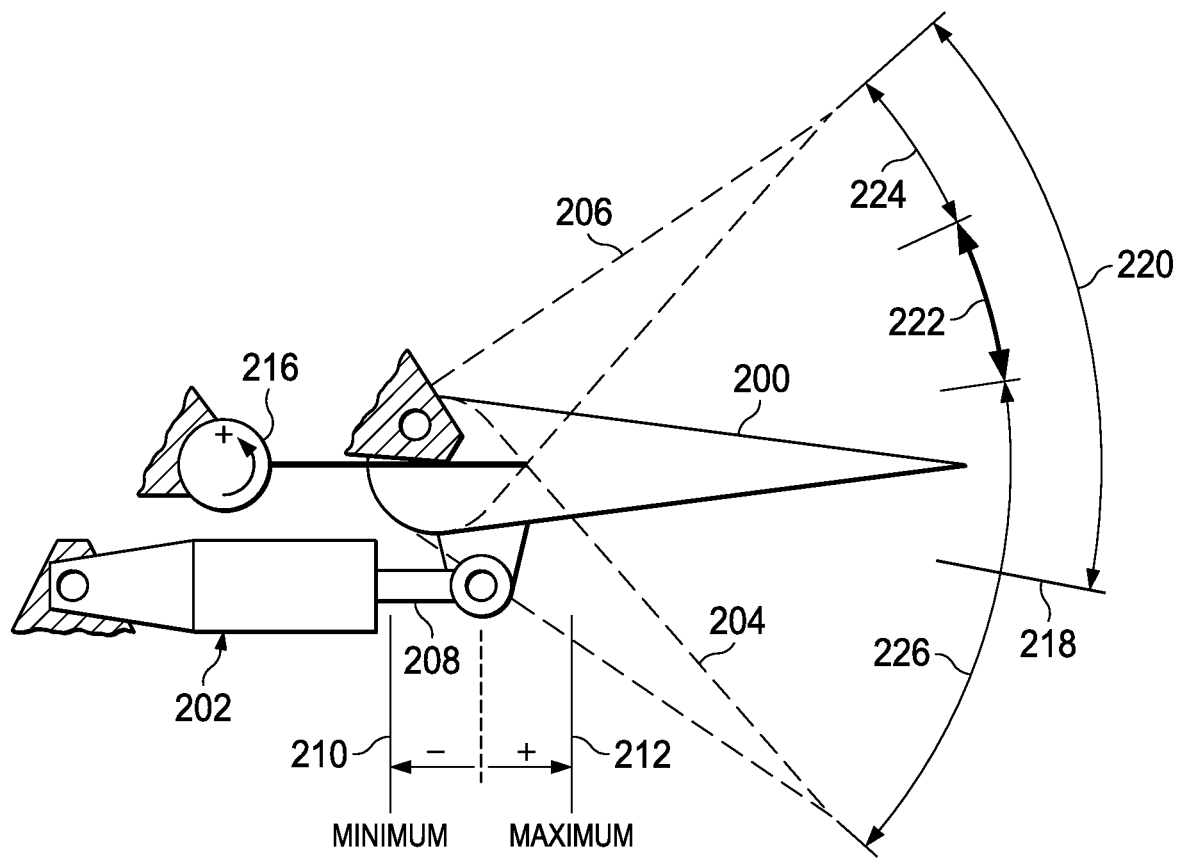
FIG. 2 is an illustration of a flight control surface with a lower stop angle in accordance with an illustrative embodiment.

Turning to FIG. 2, an illustration of a flight control surface with a lower stop angle is depicted in accordance with an illustrative embodiment. Flight control surface 200 and actuator 202 may be examples of one implementation of flight control surface 104 and actuator 103 in FIG. 1.

The lower and upper limits of the mechanical range of motion of flight control surface 200 are indicated by dashed outline 204 and dashed outline 206, respectively. Actuator 202 comprises piston 208. Piston 208 is moveable over the range indicated between lines 210 and 212. Piston 208 is connected at or near a leading-edge of flight control surface 200 in an appropriate manner such that retraction of piston 208 causes the trailing-edge of flight control surface 200 to move downward in the direction toward the lower limit of the mechanical range indicated by dashed outline 204. In this example, retraction of piston 208 and downward movement of the trailing-edge of flight control surface 200 are defined as movements in a negative direction. Extension of piston 208 causes the trailing-edge of flight control surface 200 to move upward in the direction toward the upper limit of the mechanical range indicated by dashed outline 206. Extension of piston 208 and upward movement of the trailing-edge of flight control surface 200 are defined as movements in a positive direction.

Angle sensor 216 is configured to identify the angle of flight control surface 200. Angle sensor 216 may be implemented in any appropriate manner to identify the angle of flight control surface 200. For example, without limitation, angle sensor 216 may identify the angle of flight control surface 200 by a physical connection to flight control surface 200 or in any other appropriate manner.

A lower stop angle for flight control surface 200 may be defined as the angle of flight control surface 200 at which the trailing-edge of flight control surface 200 is at the position indicated by line 218. Therefore, limits of allowable range of movement 220 of flight control surface 200 are the upper limit of the mechanical range indicated by dashed outline 206 and the position corresponding to the lower stop angle indicated by line 218. The lower stop angle may be fixed or variable. For example, without limitation, the lower stop angle may be defined by a static or moveable object which it is desirable that flight control surface 200 may approach very closely but not be allowed to strike, or in another appropriate manner.

The mechanical range of movement of flight control surface 200 may be defined by portions 222, 224, and 226. Portion 222 of the mechanical range of movement of flight control surface 200 is located away from the limits of allowable range of movement 220. Portions 224 and 226 of the mechanical range of movement of flight control surface 200 are located adjacent to upper and lower limits of allowable range of movement 220, respectively.

Figure 3:
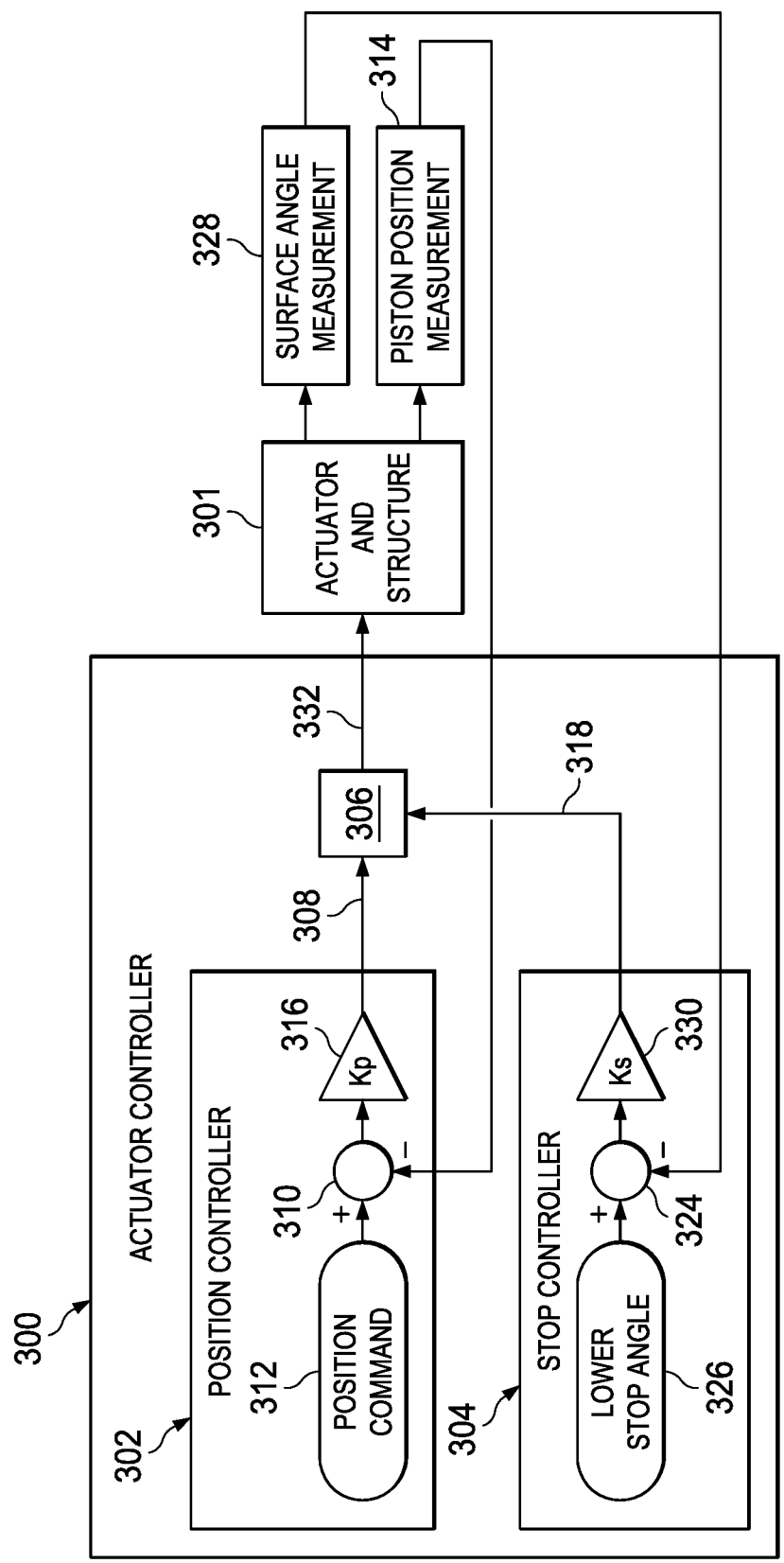
FIG. 3 is an illustration of a block diagram of a controller for a flight control surface with a lower stop angle in accordance with an illustrative embodiment.

Turning to FIG. 3, an illustration of a block diagram of a controller for a flight control surface with a lower stop angle is depicted in accordance with an illustrative embodiment. Actuator controller 300 may be an example of one implementation of actuator controller 100 in FIG. 1. Actuator controller 300 is configured to generate a control signal for controlling the position of actuator and structure 301 corresponding to actuator 202 and flight control surface 200 in FIG. 2. The description of FIG. 3 is made with reference to FIG. 2.

Actuator controller 300 comprises position controller 302, stop controller 304, and control signal selector 306. Position controller 302 generates a position control signal on line 308. Position controller 302 is configured to determine difference 310 between a desired position for piston 208 indicated by position command 312 and piston position measurement 314 indicating the current position of piston 208. Piston position measurement 314 may be obtained in any appropriate manner using any appropriate sensor to identify the current position of piston 208. Difference 310 between the desired position for piston 208 and the current position of piston 208 may be multiplied by gain 316 to generate the position control signal on line 308.

Stop controller 304 generates a stop control signal on line 318. Stop controller 304 is configured to determine difference 324 between lower stop angle 326 for flight control surface 200 and surface angle measurement 328 indicating the current angle of flight control surface 200. Surface angle measurement 328 may be provided by angle sensor 216. Difference 324 between lower stop angle 326 and the current angle of flight control surface 200 may be multiplied by an appropriate gain 330 to generate the stop control signal on line 318.

Control signal selector 306 is configured to select either the position control signal on line 308 or the stop control signal on line 318 to provide as an actuator control signal on line 332 to control actuator and structure 301. There may be portions of the range of movement of a flight control surface where use of the stop control signal for controlling the position of the surface may be appropriate and other portions where it may not be optimal. In this example, when flight control surface 200 is in a position in portion 222 of the mechanical range of movement of flight control surface 200, control signal selector 306 provides the position control signal on line 308 as the actuator control signal on line 332. When flight control surface 200 is in a position in portion 224 or portion 226 of the mechanical range of movement of flight control surface 200, control signal selector 306 selects the one of the position control signal on line 308 and the stop control signal on line 318 having the larger magnitude to provide as the actuator control signal on line 332.

Figure 4:
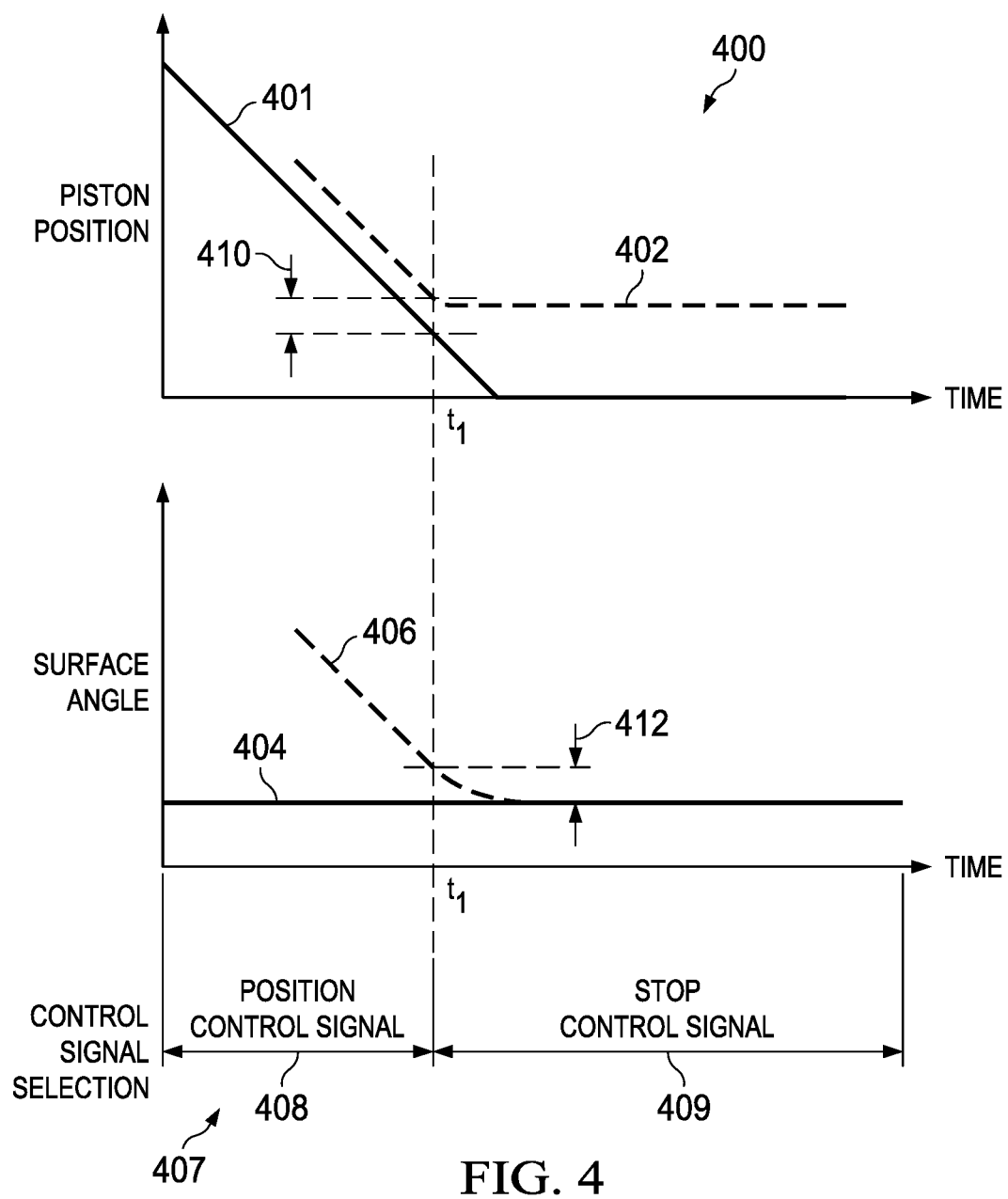
FIG. 4 is an illustration of signals over time in a controller for a flight control surface with a lower stop angle in accordance with an illustrative embodiment.

Turning to FIG. 4, an illustration of signals over time in a controller for a flight control surface with a lower stop angle is depicted in accordance with an illustrative embodiment. Signals 400 may be an example of signals in actuator controller 300 in FIG. 3 for controlling flight control surface 200 in FIG. 2. The description of FIG. 4 is made with reference to FIG. 2 and FIG. 3.

Desired piston position 401 may be an example of a desired position for piston 208 indicated in position command 312. Measured piston position 402 may be an example of piston position measurement 314 indicating the current position of piston 208. Lower stop angle 404 may indicate lower stop angle 326 for flight control surface 200. Measured angle 406 may be an example of surface angle measurement 328 indicating the current angle of flight control surface 200.

Flight control surface 200 is in portion 226 of the mechanical range of movement of flight control surface 200 for all times in this example. Therefore, in this example, control signal selector 306 selects either the position control signal on line 308 from position controller 302 or the stop control signal on line 318 from stop controller 304 as control signal selection 407 provided as the actuator control signal on line 332 to control actuator and structure 301. In this example, control signal selector 306 selects the one of the position control signal on line 308 and the stop control signal on line 318 having the larger magnitude as control signal selection 407.

For purposes of simplicity, in this example, the same amount of difference 310 determined in position controller 302 and difference 324 determined in stop controller 304 results in the same magnitude of the position control signal on line 308 from position controller 302 and the stop control signal on line 318 from stop controller 304. For example, without limitation, gain 316 in position controller 302 and gain 330 in stop controller 304 may be selected to be the same in this case.

Before time $t_1$, the difference between desired piston position 401 and measured piston position 402 is a relatively small negative value. The difference between lower stop angle 404 and measured angle 406 is a relatively large negative value. Therefore, before time $t_1$, position control signal 408 based on the difference between desired piston position 401 and measured piston position 402 is selected as control signal selection 407 for controlling actuator 202. As a result, during this time, measured piston position 402 follows desired piston position 401 as piston 208 is commanded to retract and measured angle 406 of flight control surface 200 moves toward lower stop angle 404.

After time $t_1$, the difference between desired piston position 401 and measured piston position 402 is a relatively large negative value. The difference between lower stop angle 404 and measured angle 406 is a relatively small negative value. Therefore, after time $t_1$, stop control signal 409 based on the difference between lower stop angle 404 and measured angle 406 is selected as control signal selection 407. As a result, during this time, measured angle 406 of flight control surface 200 is prevented from moving beyond lower stop angle 404 even though piston 208 is commanded to retract further.

At time $t_1$, difference 410 between desired piston position 401 and measured piston position 402 is the same as difference 412 between lower stop angle 404 and measured angle 406. Therefore, position control signal 408 and stop control signal 409 may be equal when control signal selection 407 switches at time $t_1$, resulting in a smooth transition.

Figure 5:
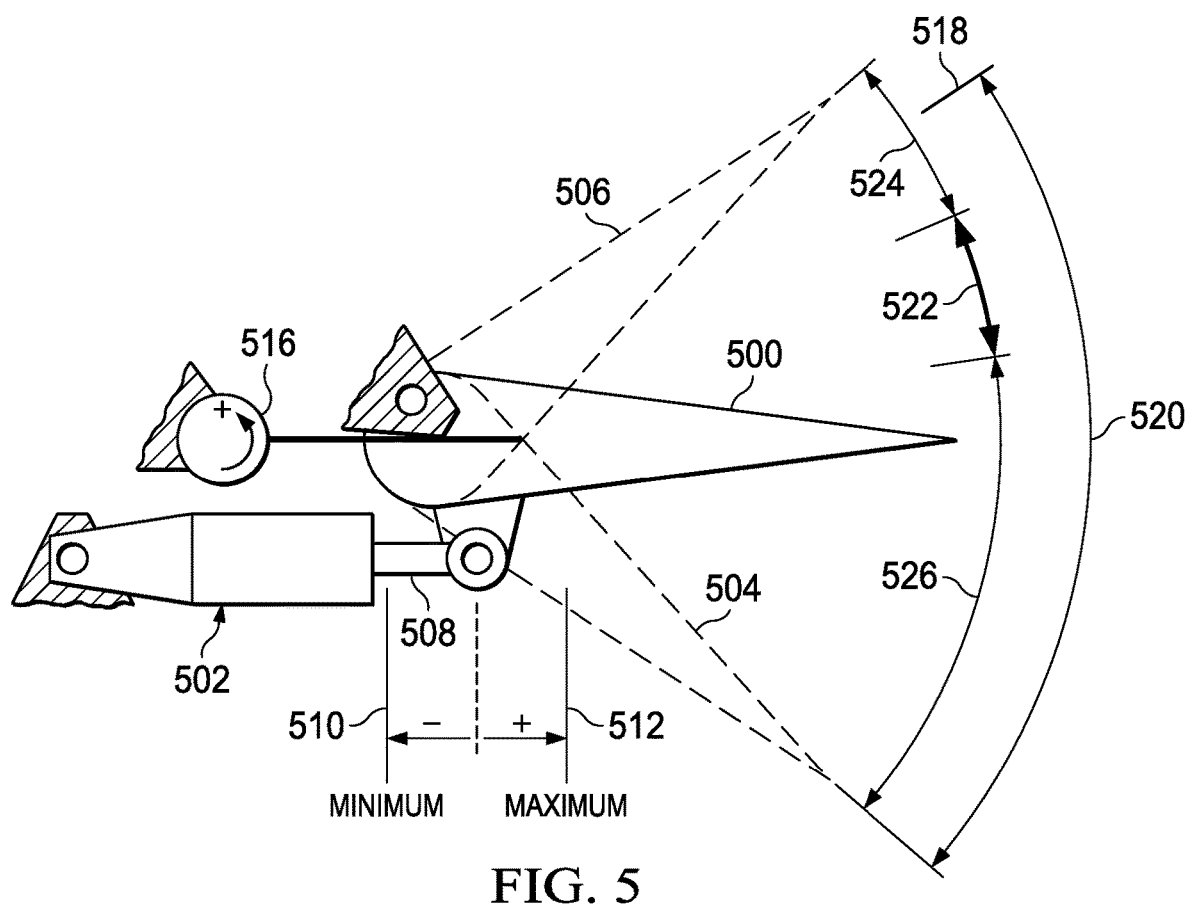
FIG. 5 is an illustration of a flight control surface with an upper stop angle in accordance with an illustrative embodiment.

Turning to FIG. 5, an illustration of a flight control surface with an upper stop angle is depicted in accordance with an illustrative embodiment. Flight control surface 500 and actuator 502 may be examples of one implementation of flight control surface 104 and actuator 103 in FIG. 1.

The lower and upper limits of the mechanical range of motion of flight control surface 500 are indicated by dashed outline 504 and dashed outline 506, respectively. Actuator 502 comprises piston 508. Piston 508 is moveable over the range indicated between lines 510 and 512. Piston 508 is connected at or near a leading-edge of flight control surface 500 in an appropriate manner such that retraction of piston 508 causes the trailing-edge of flight control surface 500 to move downward in the direction toward the lower limit of the mechanical range indicated by dashed outline 504. In this example, retraction of piston 508 and downward movement of the trailing-edge of flight control surface 500 are defined as movements in a negative direction. Extension of piston 508 causes the trailing-edge of flight control surface 500 to move upward in the direction toward the upper limit of the mechanical range indicated by dashed outline 506. Extension of piston 508 and upward movement of the trailing-edge of flight control surface 500 are defined as movements in a positive direction.

Angle sensor 516 is configured to identify the angle of flight control surface 500. Angle sensor 516 may be implemented in any appropriate manner to identify the angle of flight control surface 500. For example, without limitation, angle sensor 516 may identify the angle of flight control surface 500 by a physical connection to flight control surface 500 or in any other appropriate manner.

An upper stop angle for flight control surface 500 may be defined as the angle of flight control surface 500 at which the trailing-edge of flight control surface 500 is at the position indicated by line 518. Therefore, limits of allowable range of movement 520 of flight control surface 500 are the lower limit of the mechanical range indicated by dashed outline 504 and the position corresponding to the upper stop angle indicated by line 518. The upper stop angle may be fixed or variable. For example, without limitation, the upper stop angle may be defined by a static or moveable object which it is desirable that flight control surface 500 may approach very closely but not be allowed to strike, or in another appropriate manner.

The mechanical range of movement of flight control surface 500 may be defined by portions 522, 524, and 526. Portion 522 of the mechanical range of movement of flight control surface 500 is located away from the limits of allowable range of movement 520. Portions 524 and 526 of the mechanical range of movement of flight control surface 500 are located adjacent to upper and lower limits of allowable range of movement 520, respectively.

Figure 6:
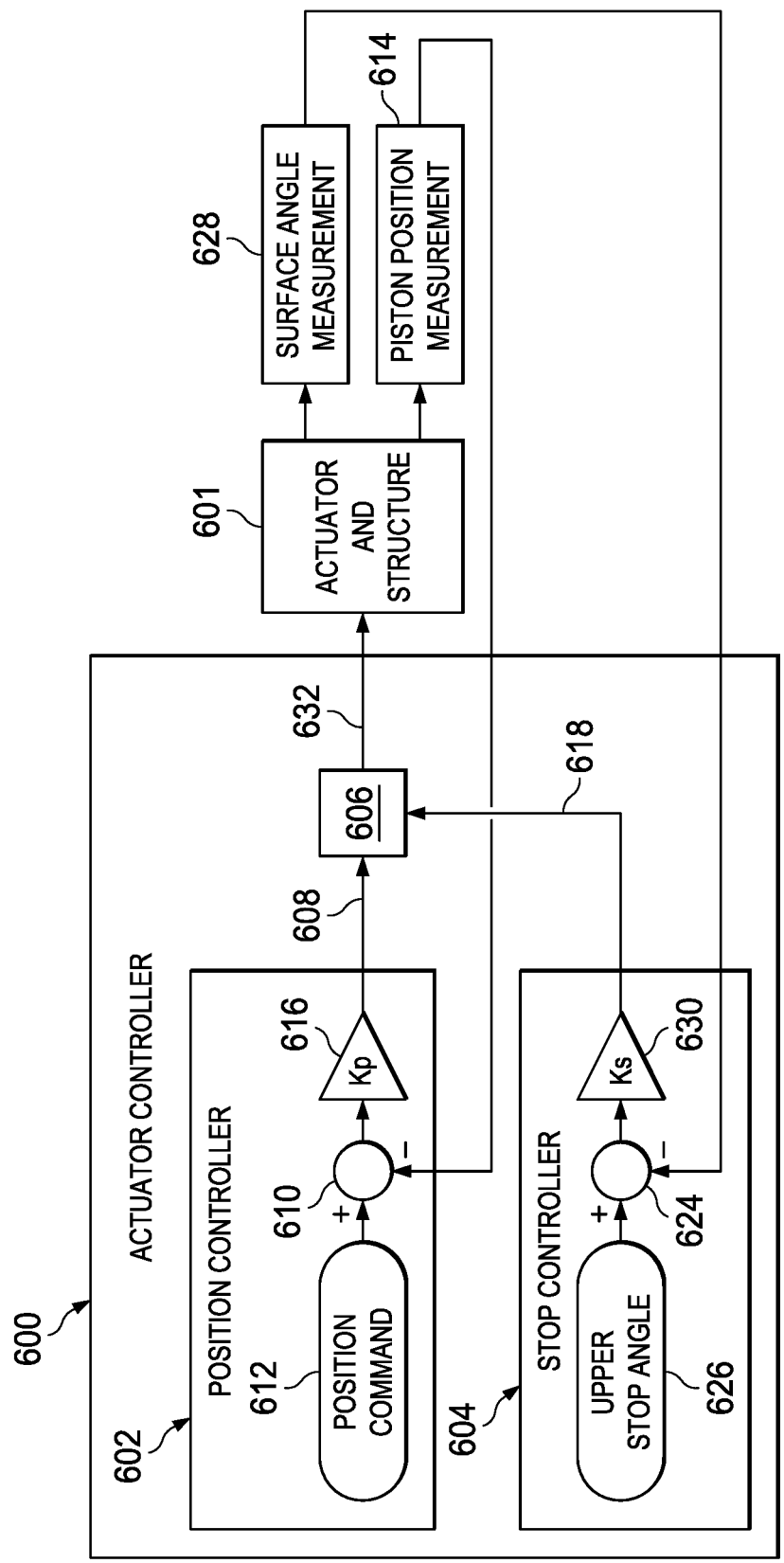
FIG. 6 is an illustration of a block diagram of a controller for a flight control surface with an upper stop angle in accordance with an illustrative embodiment.

Turning to FIG. 6, an illustration of a block diagram of a controller for a flight control surface with an upper stop angle is depicted in accordance with an illustrative embodiment. Actuator controller 600 may be an example of one implementation of actuator controller 100 in FIG. 1. Actuator controller 600 is configured to generate a control signal for controlling the position of actuator and structure 601 corresponding to actuator 502 and flight control surface 500 in FIG. 5. The description of FIG. 6 is made with reference to FIG. 5.

Actuator controller 600 comprises position controller 602, stop controller 604, and control signal selector 606. Position controller 602 generates a position control signal on line 608. Position controller 602 is configured to determine difference 610 between a desired position for piston 508 indicated by position command 612 and piston position measurement 614 indicating the current position of piston 508. Piston position measurement 614 may be obtained in any appropriate manner using any appropriate sensor to identify the current position of piston 508. Difference 610 between the desired position for piston 508 and the current position of piston 508 may be multiplied by gain 616 to generate the position control signal on line 608.

Stop controller 604 generates a stop control signal on line 618. Stop controller 604 is configured to determine difference 624 between upper stop angle 626 for flight control surface 500 and surface angle measurement 628 indicating the current angle of flight control surface 500. Surface angle measurement 628 may be provided by angle sensor 516. Difference 624 between upper stop angle 626 and the current angle of flight control surface 500 may be multiplied by an appropriate gain 630 to generate the stop control signal on line 618.

Control signal selector 606 is configured to select either the position control signal on line 608 or the stop control signal on line 618 to provide as an actuator control signal on line 632 to control actuator and structure 601. There may be portions of the range of movement of a flight control surface where use of the stop control signal for controlling the position of the surface may be appropriate and other portions where it may not be optimal. In this example, when flight control surface 500 is in a position in portion 522 of the mechanical range of movement of flight control surface 500, control signal selector 606 provides the position control signal on line 608 as the actuator control signal on line 632. When flight control surface 500 is in a position in portion 524 or portion 526 of the mechanical range of movement of flight control surface 500, control signal selector 606 selects the one of the position control signal on line 608 and the stop control signal on line 618 having the smaller magnitude to provide as the actuator control signal on line 632.

Figure 7:
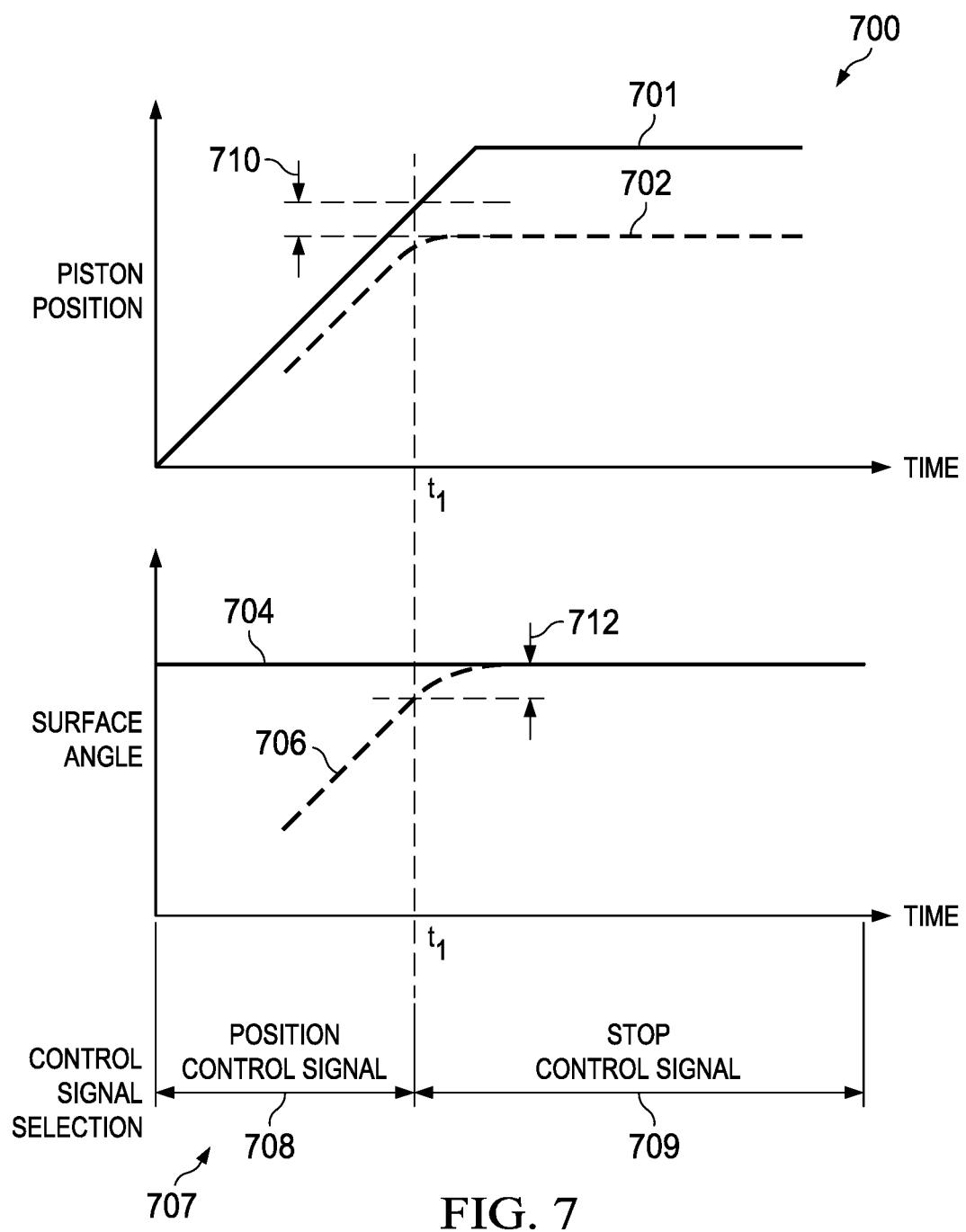
FIG. 7 is an illustration of signals over time in a controller for a flight control surface with an upper stop angle in accordance with an illustrative embodiment.

Turning to FIG. 7, an illustration of signals over time in a controller for a flight control surface with an upper stop angle is depicted in accordance with an illustrative embodiment. Signals 700 may be an example of signals in actuator controller 600 in FIG. 6 for controlling flight control surface 500 in FIG. 5. The description of FIG. 7 is made with reference to FIG. 5 and FIG. 6.

Desired piston position 701 may be an example of a desired position for piston 508 indicated in position command 612. Measured piston position 702 may be an example of piston position measurement 614 indicating the current position of piston 508. Upper stop angle 704 may indicate upper stop angle 626 for flight control surface 500. Measured angle 706 may be an example of surface angle measurement 628 indicating the current angle of flight control surface 500.

Flight control surface 500 is in portion 524 of the mechanical range of movement of flight control surface 500 for all times in this example. Therefore, in this example, control signal selector 606 selects either the position control signal on line 608 from position controller 602 or the stop control signal on line 618 from stop controller 604 as control signal selection 707 provided as the actuator control signal on line 632 to control actuator and structure 601. In this example, control signal selector 606 selects the one of the position control signal on line 608 and the stop control signal on line 618 having the smaller magnitude as control signal selection 707.

For purposes of simplicity, in this example, the same amount of difference 610 determined in position controller 602 and difference 624 determined in stop controller 604 results in the same magnitude of the position control signal on line 608 from position controller 602 and the stop control signal on line 618 from stop controller 604. For example, without limitation, gain 616 in position controller 602 and gain 630 in stop controller 604 may be selected to be the same in this case.

Before time $t_1$, the difference between desired piston position 701 and measured piston position 702 is a relatively small positive value. The difference between upper stop angle 704 and measured angle 706 is a relatively large positive value. Therefore, before time $t_1$, position control signal 708 based on the difference between desired piston position 701 and measured piston position 702 is selected as control signal selection 707 for controlling actuator 502. As a result, during this time, measured piston position 702 follows desired piston position 701 as piston 508 is commanded to extend and measured angle 706 of flight control surface 500 moves toward upper stop angle 704.

After time $t_1$, the difference between desired piston position 701 and measured piston position 702 is a relatively large positive value. The difference between upper stop angle 704 and measured angle 706 is a relatively small positive value. Therefore, after time $t_1$, stop control signal 709 based on the difference between upper stop angle 704 and measured angle 706 is selected as control signal selection 707. As a result, during this time, measured angle 706 of flight control surface 500 is prevented from moving beyond upper stop angle 704 even though piston 508 is commanded to extend further.

At time $t_1$, difference 710 between desired piston position 701 and measured piston position 702 is the same as difference 712 between upper stop angle 704 and measured angle 706. Therefore, position control signal 708 and stop control signal 709 may be equal when control signal selection 707 switches at time $t_1$, resulting in a smooth transition.

Figure 8:
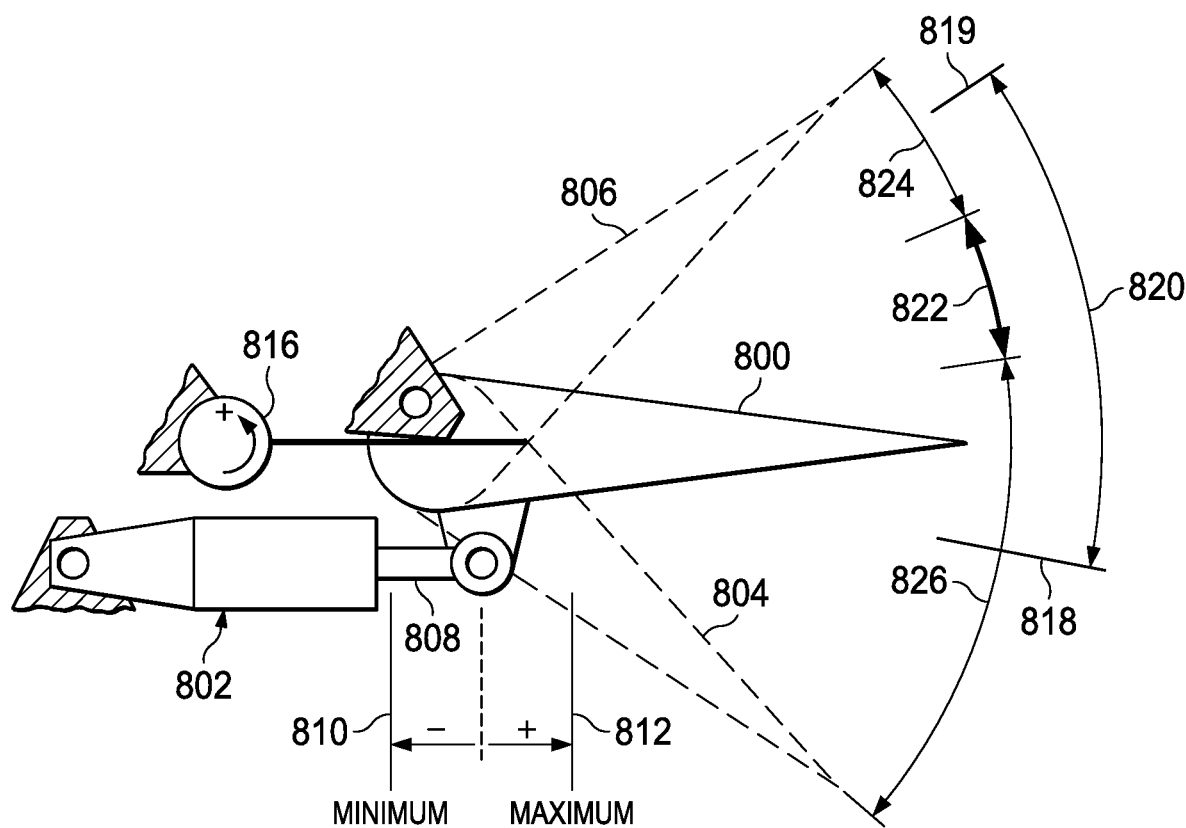
FIG. 8 is an illustration of a flight control surface with an upper stop angle and a lower stop angle in accordance with an illustrative embodiment.

Turning to FIG. 8, an illustration of a flight control surface with an upper stop angle and a lower stop angle is depicted in accordance with an illustrative embodiment. Flight control surface 800 and actuator 802 may be examples of one implementation of flight control surface 104 and actuator 103 in FIG. 1.

The lower and upper limits of the mechanical range of motion of flight control surface 800 are indicated by dashed outline 804 and dashed outline 806, respectively. Actuator 802 comprises piston 808. Piston 808 is moveable over the range indicated between lines 810 and 812. Piston 808 is connected at or near a leading-edge of flight control surface 800 in an appropriate manner such that retraction of piston 808 causes the trailing-edge of flight control surface 800 to move downward in the direction toward the lower limit of the mechanical range indicated by dashed outline 804. In this example, retraction of piston 808 and downward movement of the trailing-edge of flight control surface 800 are defined as movements in a negative direction. Extension of piston 808 causes the trailing-edge of flight control surface 800 to move upward in the direction toward the upper limit of the mechanical range indicated by dashed outline 806. Extension of piston 808 and upward movement of the trailing-edge of flight control surface 800 are defined as movements in a positive direction.

Angle sensor 816 is configured to identify the angle of flight control surface 800. Angle sensor 816 may be implemented in any appropriate manner to identify the angle of flight control surface 800. For example, without limitation, angle sensor 816 may identify the angle of flight control surface 800 by a physical connection to flight control surface 800 or in any other appropriate manner.

A lower stop angle for flight control surface 800 may be defined as the angle of flight control surface 800 at which the trailing-edge of flight control surface 800 is at the position indicated by line 818. An upper stop angle for flight control surface 800 may be defined as the angle of flight control surface 800 at which the trailing-edge of flight control surface 800 is at the position indicated by line 819. Therefore, limits of allowable range of movement 820 of flight control surface 800 are the position corresponding to the lower stop angle indicated by line 818 and the position corresponding to the upper stop angle indicated by line 819. The upper and lower stop angles may be fixed or variable. For example, without limitation, the upper and lower stop angles may be defined by static or moveable objects which it is desirable that flight control surface 800 may approach very closely but not be allowed to strike, or in another appropriate manner.

The mechanical range of movement of flight control surface 800 may be defined by portions 822, 824, and 826. Portion 822 of the mechanical range of movement of flight control surface 800 is located away from the limits of allowable range of movement 820. Portions 824 and 826 of the mechanical range of movement of flight control surface 800 are located adjacent to upper and lower limits of allowable range of movement 820, respectively.

Figure 9:
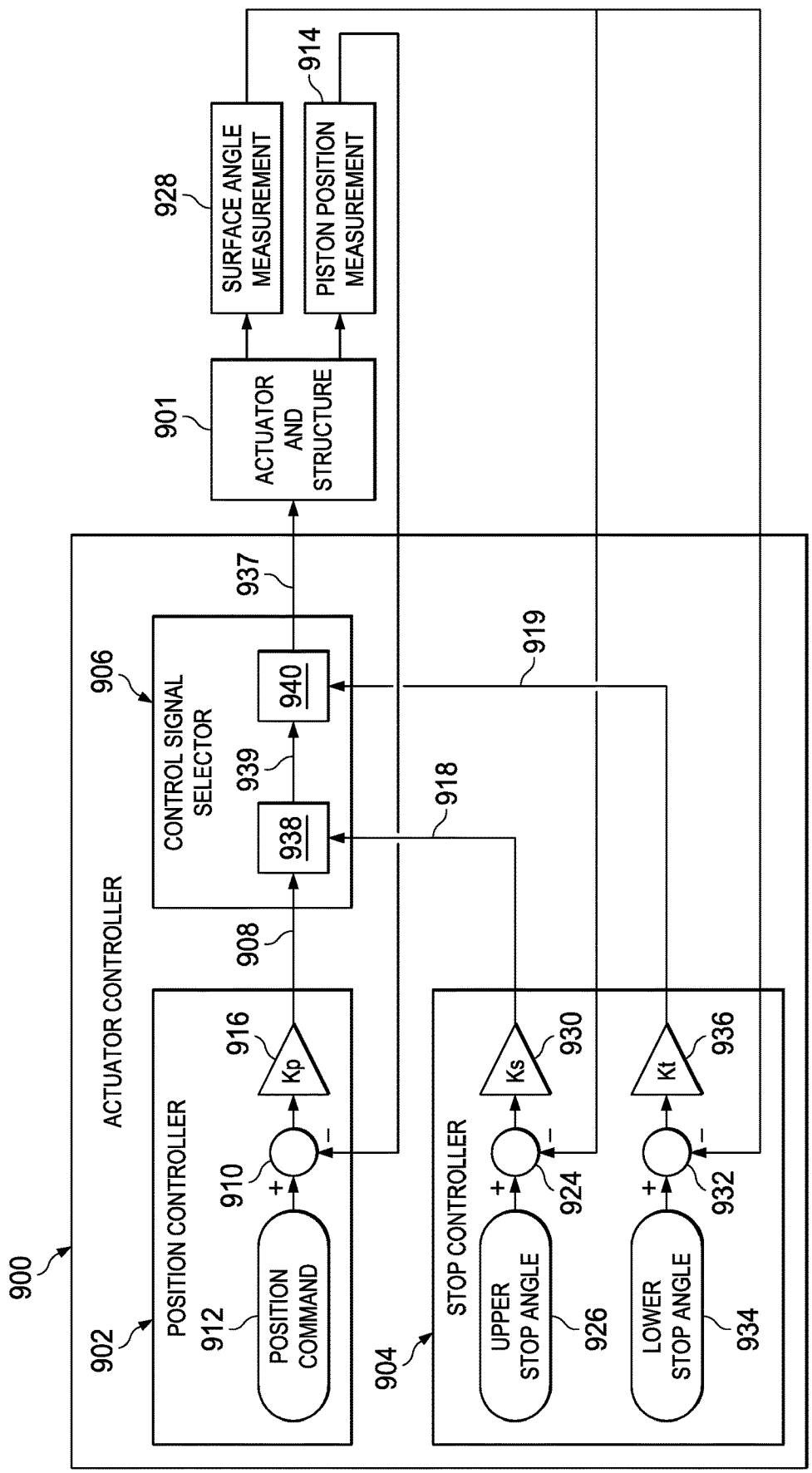
FIG. 9 is an illustration of a block diagram of a controller for a flight control surface with an upper stop angle and a lower stop angle in accordance with an illustrative embodiment.

Turning to FIG. 9, an illustration of a block diagram of a controller for a flight control surface with an upper stop angle and a lower stop angle is depicted in accordance with an illustrative embodiment. Actuator controller 900 may be an example of one implementation of actuator controller 100 in FIG. 1. Actuator controller 900 is configured to generate a control signal for controlling the position of actuator and structure 901 corresponding to actuator 802 and flight control surface 800 in FIG. 8. The description of FIG. 9 is made with reference to FIG. 8.

Actuator controller 900 comprises position controller 902, stop controller 904, and control signal selector 906. Position controller 902 generates a position control signal on line 908. Position controller 902 is configured to determine difference 910 between a desired position for piston 808 indicated by position command 912 and piston position measurement 914 indicating the current position of piston 808. Piston position measurement 914 may be obtained in any appropriate manner using any appropriate sensor to identify the current position of piston 808. Difference 910 between the desired position for piston 808 and the current position of piston 808 may be multiplied by gain 916 to generate the position control signal on line 908.

Stop controller 904 generates a stop control signal for an upper stop angle on line 918 and a stop control signal for a lower stop angle on line 919. Stop controller 904 is configured to determine difference 924 between upper stop angle 926 for flight control surface 800 and surface angle measurement 928 indicating the current angle of flight control surface 800. Surface angle measurement 928 may be provided by angle sensor 816. Difference 924 between upper stop angle 926 and the current angle of flight control surface 800 may be multiplied by an appropriate gain 930 to generate the stop control signal for the upper stop angle on line 918.

Stop controller 904 also is configured to determine difference 932 between lower stop angle 934 for flight control surface 800 and surface angle measurement 928 indicating the current angle of flight control surface 800. Difference 932 between lower stop angle 934 and the current angle of flight control surface 800 may be multiplied by an appropriate gain 936 to generate the stop control signal for the lower stop angle on line 919.

Control signal selector 906 is configured to select either the position control signal on line 908 or one of the stop control signals on line 918 or line 919 to provide as an actuator control signal on line 937 to control actuator and structure 901. There may be portions of the range of movement of a flight control surface where use of a stop control signal for controlling the position of the surface may be appropriate and other portions where it may not be optimal. In this example, when flight control surface 800 is in a position in portion 822 of the mechanical range of movement of flight control surface 800, control signal selector 906 provides the position control signal on line 908 as the actuator control signal on line 937. When flight control surface 800 is in a position in portion 824 or portion 826 of the mechanical range of movement of flight control surface 800, control signal selector 906 selects one of the position control signal on line 908, the stop control signal for the upper stop angle on line 918, or the stop control signal for the lower stop angle on line 919 to provide as the actuator control signal on line 937 based on relative magnitudes of the signals on lines 908, 918, and 919.

When flight control surface 800 is in a position in portion 824 or portion 826 of the mechanical range of movement of flight control surface 800, first selector 938 in control signal selector 906 selects the lesser one of the position control signal on line 908 and the stop control signal for the upper stop angle on line 918 to provide on line 939. Second selector 940 in control signal selector 906 then selects the greater one of the signal on line 939 from first selector 938 and the stop control signal for the lower stop angle on line 919 to provide as the actuator control signal on line 937.

Figure 10:
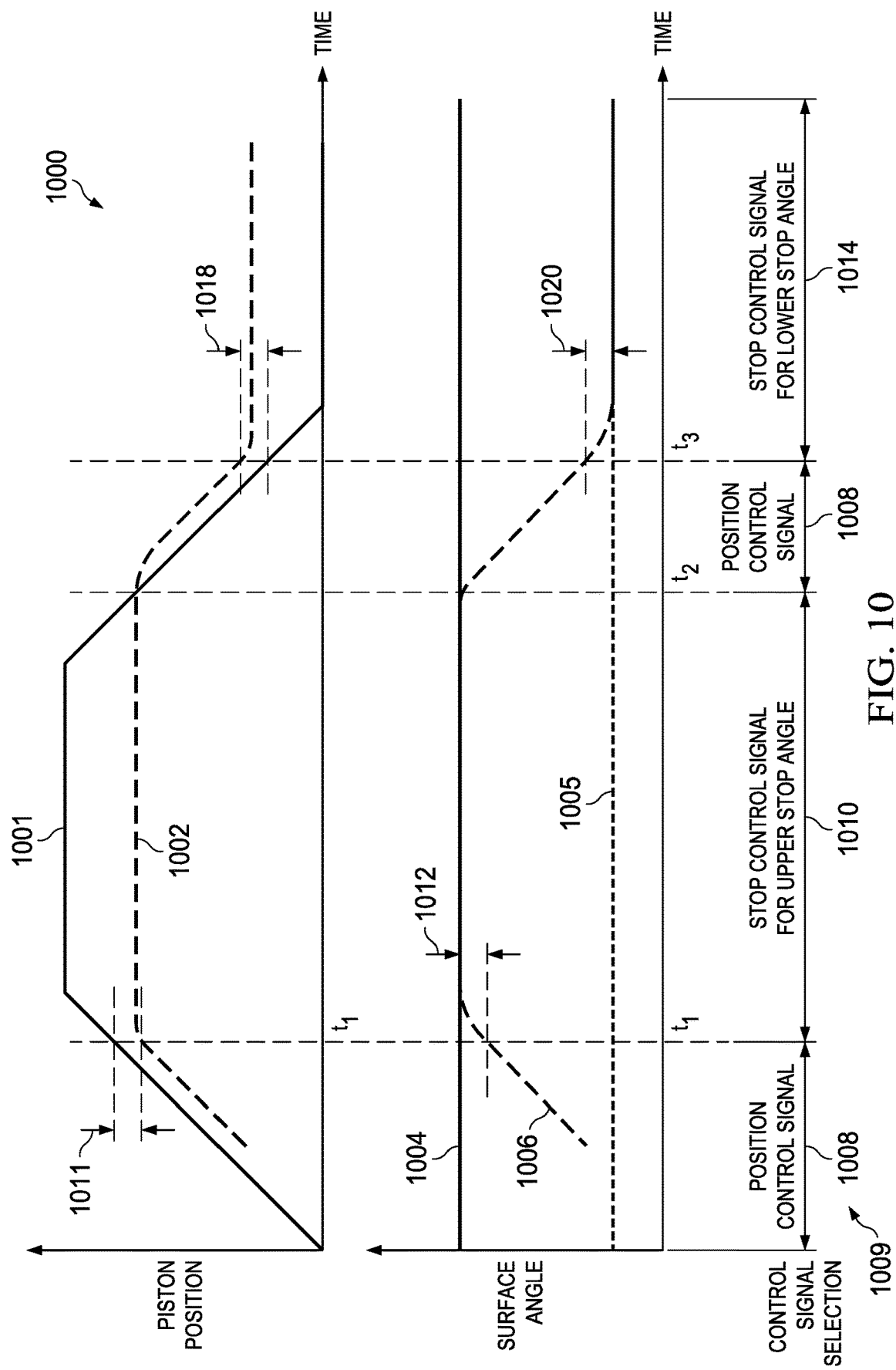
FIG. 10 is an illustration of signals over time in a controller for a flight control surface with an upper stop angle and a lower stop angle in accordance with an illustrative embodiment.

Turning to FIG. 10, an illustration of signals over time in a controller for a flight control surface with an upper stop angle and a lower stop angle is depicted in accordance with an illustrative embodiment. Signals 1000 may be an example of signals in actuator controller 900 in FIG. 9 for controlling flight control surface 800 in FIG. 8. The description of FIG. 10 is made with reference to FIG. 8 and FIG. 9.

Desired piston position 1001 may be an example of a desired position for piston 808 indicated in position command 912. Measured piston position 1002 may be an example of piston position measurement 914 indicating the current position of piston 808. Upper stop angle 1004 may indicate upper stop angle 926 for flight control surface 800. Lower stop angle 1005 may indicate lower stop angle 934 for flight control surface 800. Measured angle 1006 may be an example of surface angle measurement 928 indicating the current angle of flight control surface 800.

For purposes of simplicity, in this example, the same amount of difference 910 determined in position controller 902, difference 924 determined in stop controller 904, and difference 932 determined in stop controller 904 results in the same magnitude of the position control signal on line 908 from position controller 902, the stop control signal for the upper stop angle on line 918 from stop controller 904, and the stop control signal for the lower stop angle on line 919 from stop controller 904. For example, without limitation, gain 916 in position controller 902 and gain 930 and gain 936 in stop controller 904 may be selected to be the same in this case.

Before time $t_1$, the difference between desired piston position 1001 and measured piston position 1002 is a relatively small positive value. The difference between upper stop angle 1004 and measured angle 1006 is a relatively large positive value. The difference between lower stop angle 1005 and measured angle 1006 is a relatively large negative value. Therefore, before time $t_1$, position control signal 1008 based on the difference between desired piston position 1001 and measured piston position 1002 is selected as control signal selection 1009 for controlling actuator 802. As a result, during this time, measured piston position 1002 follows desired piston position 1001 as piston 808 is commanded to extend and measured angle 1006 of flight control surface 800 moves toward upper stop angle 1004.

Between time $t_1$ and time $t_2$, the difference between desired piston position 1001 and measured piston position 1002 is a relatively large positive value. The difference between upper stop angle 1004 and measured angle 1006 is a relatively small positive value. The difference between lower stop angle 1005 and measured angle 1006 is a relatively large negative value. Therefore, between time $t_1$ and time $t_2$, stop control signal for upper stop angle 1010, based on the difference between upper stop angle 1004 and measured angle 1006, is selected as control signal selection 1009. As a result, during this time, measured angle 1006 of flight control surface 800 is prevented from moving beyond upper stop angle 1004 even though piston 808 is commanded to extend further.

At time $t_1$, difference 1011 between desired piston position 1001 and measured piston position 1002 is the same as difference 1012 between upper stop angle 1004 and measured angle 1006. Therefore, position control signal 1008 and stop control signal for upper stop angle 1010 may be equal when control signal selection 1009 switches at time $t_1$, resulting in a smooth transition.

Between time $t_2$ and time $t_3$, the difference between desired piston position 1001 and measured piston position 1002 is a relatively small negative value. The difference between upper stop angle 1004 and measured angle 1006 is a relatively small positive value. The difference between lower stop angle 1005 and measured angle 1006 is a relatively large negative value. Therefore, between time $t_2$ and time $t_3$, position control signal 1008 based on the difference between desired piston position 1001 and measured piston position 1002 is selected again as control signal selection 1009 for controlling actuator 802. As a result, during this time, measured piston position 1002 follows desired piston position 1001 as piston 808 is commanded to retract and measured angle 1006 of flight control surface 800 moves away from upper stop angle 1004 and toward lower stop angle 1005.

After time $t_3$, the difference between desired piston position 1001 and measured piston position 1002 is a relatively large negative value. The difference between upper stop angle 1004 and measured angle 1006 is a relatively large positive value. The difference between lower stop angle 1005 and measured angle 1006 is still a relatively small negative value. Therefore, after time $t_3$, stop control signal for lower stop angle 1014, based on the difference between lower stop angle 1005 and measured angle 1006, is selected as control signal selection 1009. As a result, during this time, measured angle 1006 of flight control surface 800 is prevented from moving beyond lower stop angle 1005 even though piston 808 is commanded to retract further.

At time $t_3$, difference 1018 between desired piston position 1001 and measured piston position 1002 is the same as difference 1020 between lower stop angle 1005 and measured angle 1006. Therefore, position control signal 1008 and stop control signal for lower stop angle 1014 may be equal when control signal selection 1009 switches at time $t_3$, resulting in a smooth transition.

Figure 11:
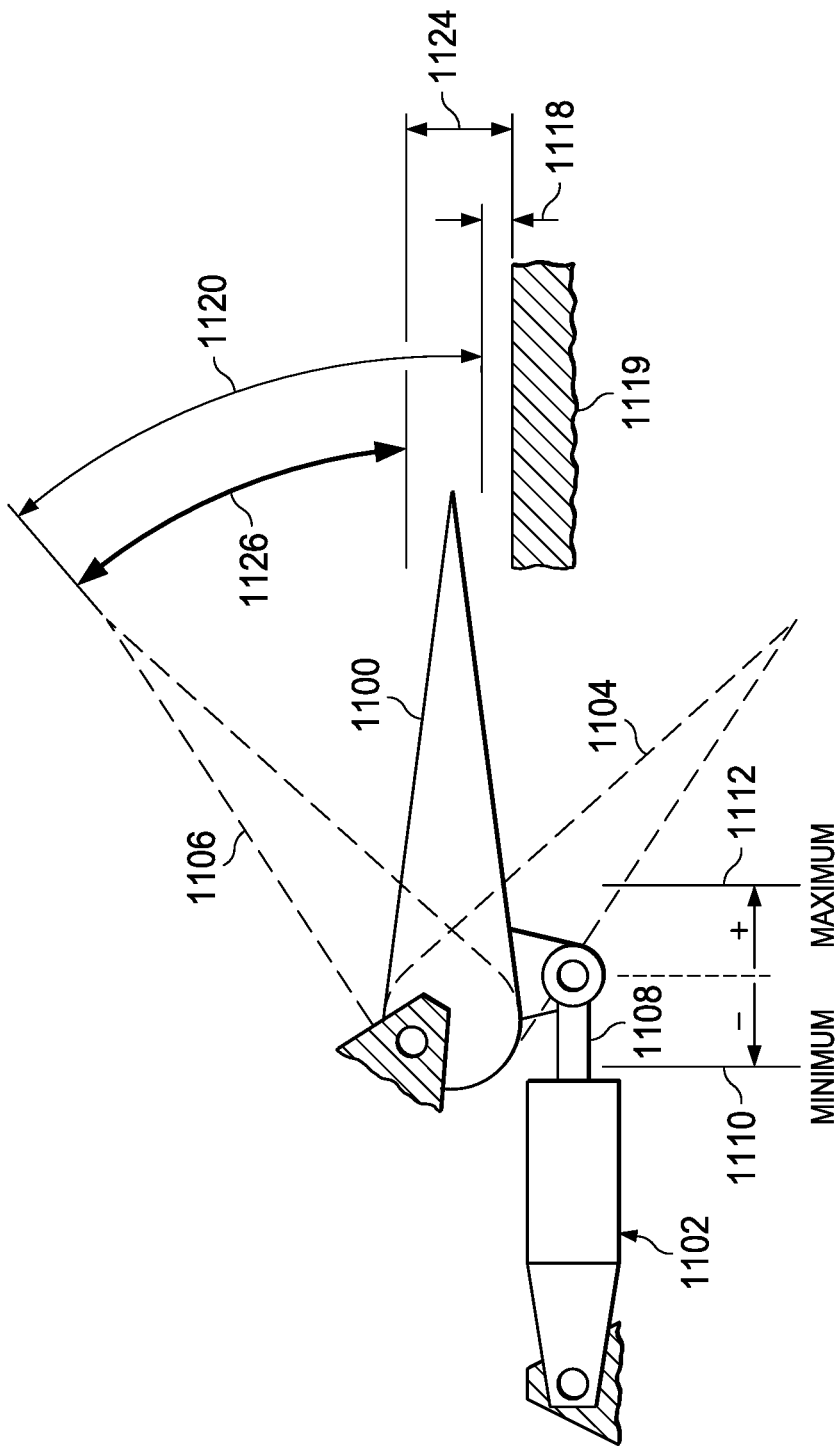
FIG. 11 is an illustration of a flight control surface with a lower stop distance in accordance with an illustrative embodiment.

Turning to FIG. 11, an illustration of a flight control surface with a lower stop distance is depicted in accordance with an illustrative embodiment. Flight control surface 1100 and actuator 1102 may be examples of one implementation of flight control surface 104 and actuator 103 in FIG. 1.

The lower and upper limits of the mechanical range of motion of flight control surface 1100 are indicated by dashed outline 1104 and dashed outline 1106, respectively. Actuator 1102 comprises piston 1108. Piston 1108 is moveable over the range indicated between lines 1110 and 1112. Piston 1108 is connected at or near a leading-edge of flight control surface 1100 in an appropriate manner such that retraction of piston 1108 causes the trailing-edge of flight control surface 1100 to move downward in the direction toward the lower limit of the mechanical range indicated by dashed outline 1104. In this example, retraction of piston 1108 and downward movement of the trailing-edge of flight control surface 1100 are defined as movements in a negative direction. Extension of piston 1108 causes the trailing-edge of flight control surface 1100 to move upward in the direction toward the upper limit of the mechanical range indicated by dashed outline 1106. Extension of piston 1108 and upward movement of the trailing-edge of flight control surface 1100 are defined as movements in a positive direction.

Lower stop distance 1118 may be defined as the minimum allowed distance of flight control surface 1100 from reference 1119. Therefore, limits of allowable range of movement 1120 of flight control surface 1100 are the upper limit of the mechanical range indicated by dashed outline 1106 and lower stop distance 1118 from reference 1119. Lower stop distance 1118 may be fixed or variable. For example, without limitation, reference 1119 may be a static or moveable object which it is desirable that flight control surface 1100 may approach to no closer than lower stop distance 1118.

The distance of flight control surface 1100 from reference 1119 may be measured in any appropriate manner using any appropriate sensor to identify the current distance of flight control surface 1100 from reference 1119. For example, the distance of flight control surface 1100 from reference 1119 may be measured when flight control surface 1100 is within distance 1124 from reference 1119. In this case, the distance of flight control surface 1100 from reference 1119 may not be measured for portion 1126 of allowed range of movement 1120 of flight control surface 1100 wherein flight control surface 1100 is further than distance 1124 from reference 1119. In this example, distances in the direction above reference 1119 are defined as positive distances.

Figure 12:
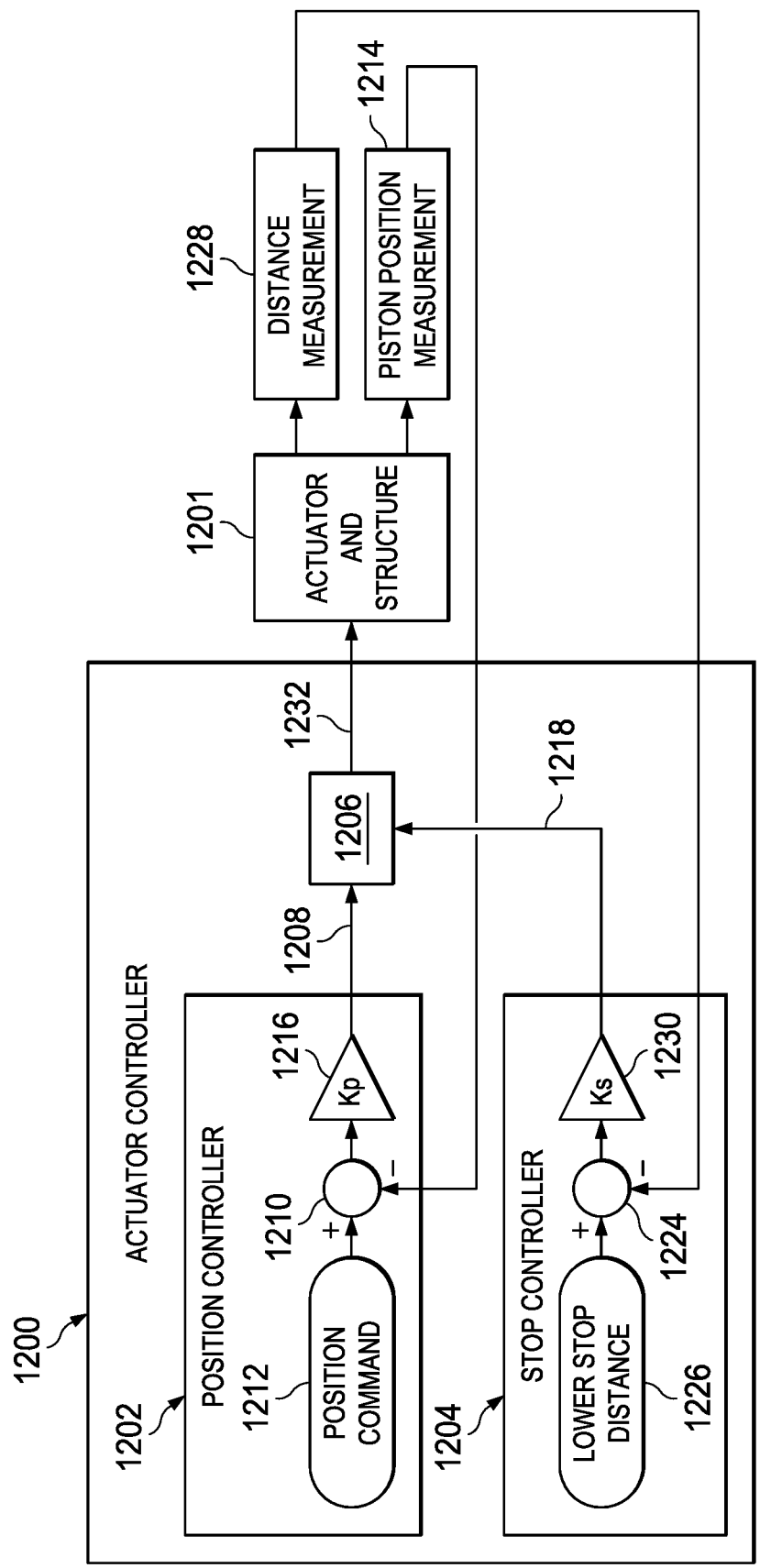
FIG. 12 is an illustration of a block diagram of a controller for a flight control surface with a lower stop distance in accordance with an illustrative embodiment.

Turning to FIG. 12, an illustration of a block diagram of a controller for a flight control surface with a lower stop distance is depicted in accordance with an illustrative embodiment. Actuator controller 1200 may be an example of one implementation of actuator controller 100 in FIG. 1. Actuator controller 1200 is configured to generate a control signal for controlling the position of actuator and structure 1201 corresponding to actuator 1102 and flight control surface 1100 in FIG. 11. The description of FIG. 12 is made with reference to FIG. 11.

Actuator controller 1200 comprises position controller 1202, stop controller 1204, and control signal selector 1206. Position controller 1202 generates a position control signal on line 1208. Position controller 1202 is configured to determine difference 1210 between a desired position for piston 1108 indicated by position command 1212 and piston position measurement 1214 indicating the current position of piston 1108. Piston position measurement 1214 may be obtained in any appropriate manner using any appropriate sensor to identify the current position of piston 1108. Difference 1210 between the desired position for piston 1108 and the current position of piston 1108 may be multiplied by gain 1216 to generate the position control signal on line 1208.

Stop controller 1204 generates a stop control signal on line 1218. Stop controller 1204 is configured to determine difference 1224 between lower stop distance 1226 for flight control surface 1100 and distance measurement 1228 indicating the current distance of flight control surface 1100 from reference 1119. Distance measurement 1228 may be provided in any appropriate manner using any appropriate sensor to identify the current distance of flight control surface 1100 from reference 1119. Difference 1224 between lower stop distance 1226 and the current distance of flight control surface 1100 from reference 1119 may be multiplied by an appropriate gain 1230 to generate the stop control signal on line 1218.

Control signal selector 1206 is configured to select either the position control signal on line 1208 or the stop control signal on line 1218 to provide as an actuator control signal on line 1232 to control actuator and structure 1201. In this example, when flight control surface 1100 is in a position in portion 1126 of allowed range of movement 1120 of flight control surface 1100, flight control surface 1100 is far enough away from reference 1119 such that the distance between flight control surface 1100 and reference 1119 is not measured. In this case, distance measurement 1228 may not be available and a stop control signal may not be generated on line 1218 by stop controller 1204. Therefore, control signal selector 1206 provides the position control signal on line 1208 as the actuator control signal on line 1232 when flight control surface 1100 is in a position in portion 1126 of allowed range of movement 1120 of flight control surface 1100. When flight control surface 1100 is within distance 1124 from reference 1119, the distance between flight control surface 1100 and reference 1119 is measured, distance measurement 1228 is available, and stop controller 1204 may generate a stop control signal on line 1218. In this case, control signal selector 1206 selects the one of the position control signal on line 1208 and the stop control signal on line 1218 having the larger magnitude to provide as the actuator control signal on line 1232.

Figure 13:
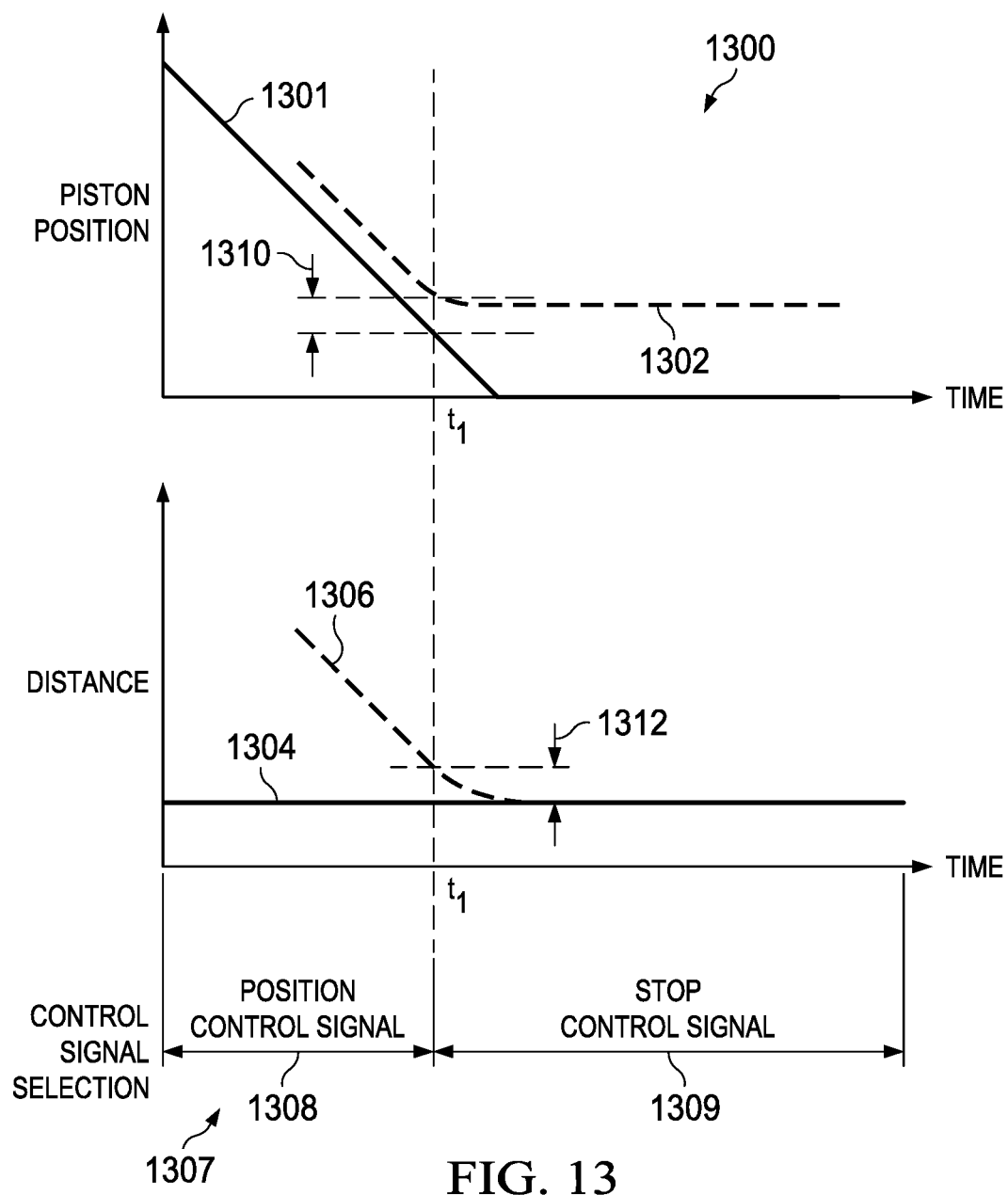
FIG. 13 is an illustration of signals over time in a controller for a flight control surface with a lower stop distance in accordance with an illustrative embodiment.

Turning to FIG. 13, an illustration of signals over time in a controller for a flight control surface with a lower stop distance is depicted in accordance with an illustrative embodiment. Signals 1300 may be an example of signals in actuator controller 1200 in FIG. 12 for controlling flight control surface 1100 in FIG. 11. The description of FIG. 13 is made with reference to FIG. 11 and FIG. 12.

Desired piston position 1301 may be an example of a desired position for piston 1108 indicated in position command 1212. Measured piston position 1302 may be an example of piston position measurement 1214 indicating the current position of piston 1108. Lower stop distance 1304 may indicate lower stop distance 1226 for flight control surface 1100. Measured distance 1306 may be an example of distance measurement 1228 indicating the current distance of flight control surface 1100 from reference 1119.

Flight control surface 1100 is within distance 1124 from reference 1119, wherein the distance of flight control surface 1100 from reference 1119 may be measured, for all times in this example. Therefore, in this example, control signal selector 1206 selects either the position control signal on line 1208 from position controller 1202 or the stop control signal on line 1218 from stop controller 1204 as control signal selection 1307 provided as the actuator control signal on line 1232 to control actuator and structure 1201. In this example, control signal selector 1206 selects the one of the position control signal on line 1208 and the stop control signal on line 1218 having the greater magnitude as control signal selection 1307.

For purposes of simplicity, in this example, the same amount of difference 1210 determined in position controller 1202 and difference 1224 determined in stop controller 1204 results in the same magnitude of the position control signal on line 1208 from position controller 1202 and the stop control signal on line 1218 from stop controller 1204. For example, without limitation, gain 1216 in position controller 1202 and gain 1230 in stop controller 1204 may be selected to be the same in this case.

Before time $t_1$, the difference between desired piston position 1301 and measured piston position 1302 is a relatively small negative value. The difference between lower stop distance 1304 and measured distance 1306 is a relatively large negative value. Therefore, before time $t_1$, position control signal 1308 based on the difference between desired piston position 1301 and measured piston position 1302 is selected as control signal selection 1307 for controlling actuator 1102. As a result, during this time, measured piston position 1302 follows desired piston position 1301 as piston 1108 is commanded to retract and measured distance 1306 of flight control surface 1100 moves toward lower stop distance 1304.

After time $t_1$, the difference between desired piston position 1301 and measured piston position 1302 is a relatively large negative value. The difference between lower stop distance 1304 and measured distance 1306 is a relatively small negative value. Therefore, after time $t_1$, stop control signal 1309 based on the difference between lower stop distance 1304 and measured distance 1306 is selected as control signal selection 1307. As a result, during this time, measured distance 1306 of flight control surface 1100 from reference 1119 is prevented from moving beyond lower stop distance 1304 even though piston 1108 is commanded to retract further.

At time $t_1$, difference 1310 between desired piston position 1301 and measured piston position 1302 is the same as difference 1312 between lower stop distance 1304 and measured distance 1306. Therefore, position control signal 1308 and stop control signal 1309 may be equal when control signal selection 1307 switches at time $t_1$, resulting in a smooth transition.

Figure 14:
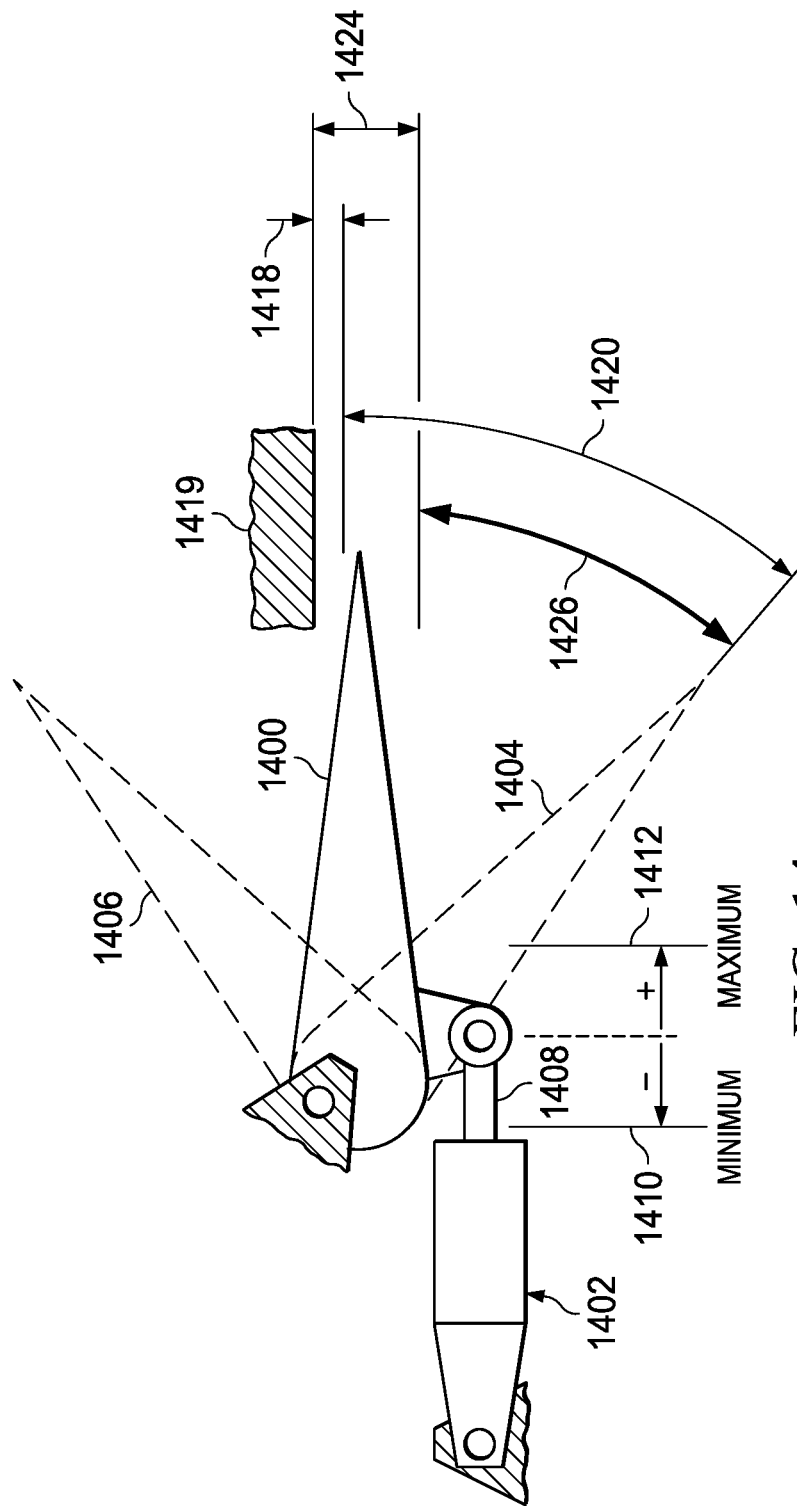
FIG. 14 is an illustration of a flight control surface with an upper stop distance in accordance with an illustrative embodiment.

Turning to FIG. 14, an illustration of a flight control surface with an upper stop distance is depicted in accordance with an illustrative embodiment. Flight control surface 1400 and actuator 1402 may be examples of one implementation of flight control surface 104 and actuator 103 in FIG. 1.

The lower and upper limits of the mechanical range of movement of flight control surface 1400 are indicated by dashed outline 1404 and dashed outline 1406, respectively. Actuator 1402 comprises piston 1408. Piston 1408 is moveable over the range indicated between lines 1410 and 1412. Piston 1408 is connected at or near a leading-edge of flight control surface 1400 in an appropriate manner such that retraction of piston 1408 causes the trailing-edge of flight control surface 1400 to move downward in the direction toward the lower limit of the mechanical range indicated by dashed outline 1404. In this example, retraction of piston 1408 and downward movement of the trailing-edge of flight control surface 1400 are defined as movements in a negative direction. Extension of piston 1408 causes the trailing-edge of flight control surface 1400 to move upward in the direction toward the upper limit of the mechanical range indicated by dashed outline 1406. Extension of piston 1408 and upward movement of the trailing-edge of flight control surface 1400 are defined as movements in a positive direction.

Upper stop distance 1418 may be defined as the minimum allowed distance of flight control surface 1100 from reference 1419. Therefore, limits of allowable range of movement 1420 of flight control surface 1400 are the lower limit of the mechanical range indicated by dashed outline 1404 and upper stop distance 1418 from reference 1419. Upper stop distance 1418 may be fixed or variable. For example, without limitation, reference 1419 may be a static or moveable object which it is desirable that flight control surface 1400 may approach to no closer than upper stop distance 1418.

The distance of flight control surface 1400 from reference 1419 may be measured in any appropriate manner using any appropriate sensor to identify the current distance of flight control surface 1400 from reference 1419. For example, the distance of flight control surface 1400 from reference 1419 may be measured when flight control surface 1400 is within distance 1424 from reference 1419. In this case, the distance of flight control surface 1400 from reference 1419 may not be measured for portion 1426 of allowed range of movement 1420 of flight control surface 1400 wherein flight control surface 1400 is further than distance 1424 from reference 1419. In this example, distances in the direction below reference 1419 are defined as positive distances.

Figure 15:
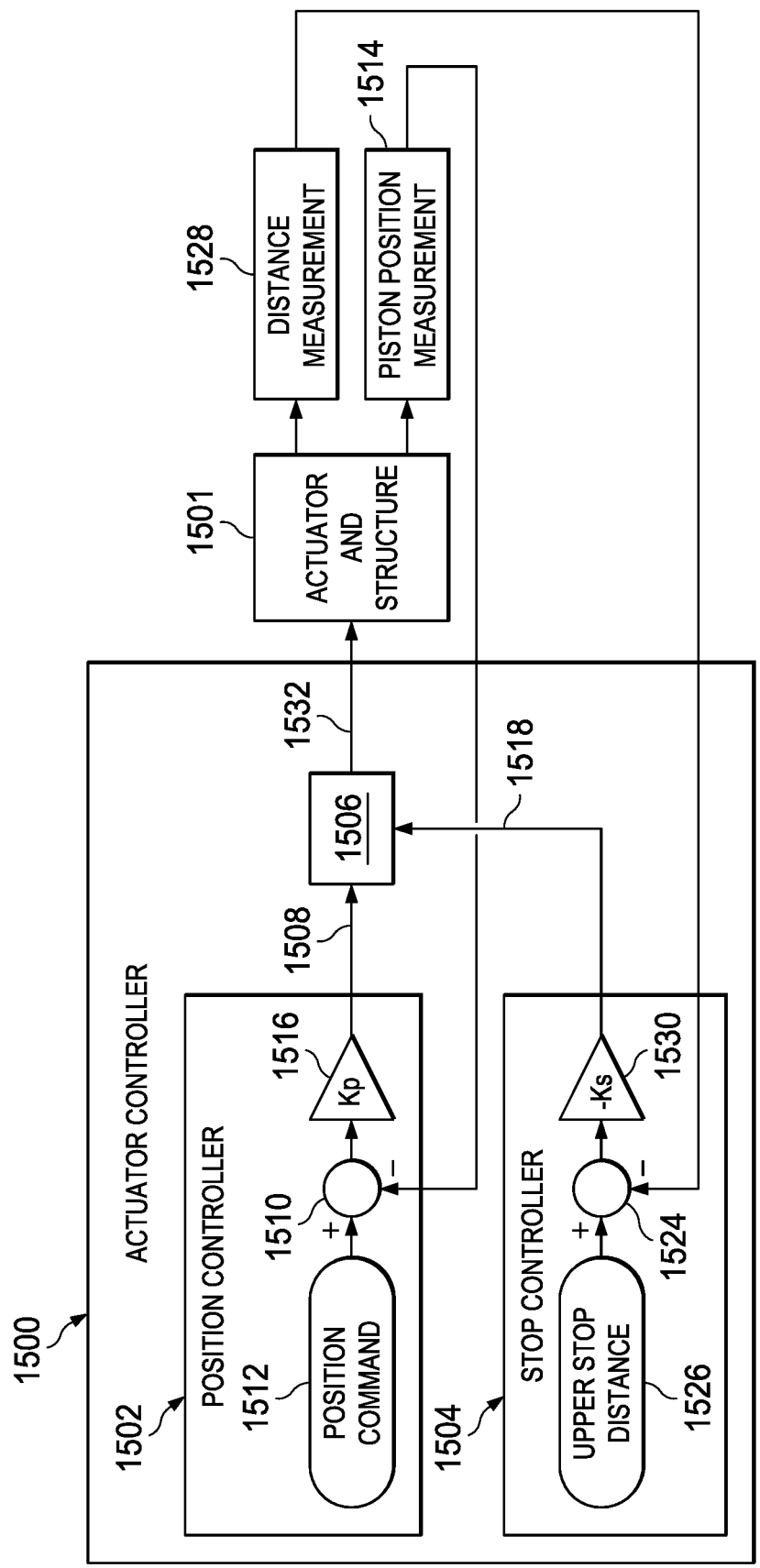
FIG. 15 is an illustration of a block diagram of a controller for a flight control surface with an upper stop distance in accordance with an illustrative embodiment.

Turning to FIG. 15, an illustration of a block diagram of a controller for a flight control surface with an upper stop distance is depicted in accordance with an illustrative embodiment. Actuator controller 1500 may be an example of one implementation of actuator controller 100 in FIG. 1. Actuator controller 1500 is configured to generate a control signal for controlling the position of actuator and structure 1501 corresponding to actuator 1402 and flight control surface 1400 in FIG. 14. The description of FIG. 15 is made with reference to FIG. 14.

Actuator controller 1500 comprises position controller 1502, stop controller 1504, and control signal selector 1506. Position controller 1502 generates a position control signal on line 1508. Position controller 1502 is configured to determine difference 1510 between a desired position for piston 1408 indicated by position command 1512 and piston position measurement 1514 indicating the current position of piston 1408. Piston position measurement 1514 may be obtained in any appropriate manner using any appropriate sensor to identify the current position of piston 1408. Difference 1510 between the desired position for piston 1408 and the current position of piston 1408 may be multiplied by gain 1516 to generate the position control signal on line 1508.

Stop controller 1504 generates a stop control signal on line 1518. Stop controller 1504 is configured to determine difference 1524 between upper stop distance 1526 for flight control surface 1400 and distance measurement 1528 indicating the current distance of flight control surface 1400 from reference 1419. Distance measurement 1528 may be provided in any appropriate manner using any appropriate sensor to identify the current distance of flight control surface 1400 from reference 1419. Difference 1524 between upper stop distance 1526 and the current distance of flight control surface 1400 from reference 1419 may be multiplied by an appropriate gain 1530 to generate the stop control signal on line 1518. In this example, gain 1530 changes the sign of difference 1524 between upper stop distance 1526 and the current distance of flight control surface 1400 from reference 1419 to generate the stop control signal on line 1518.

Control signal selector 1506 is configured to select either the position control signal on line 1508 or the stop control signal on line 1518 to provide as an actuator control signal on line 1532 to control actuator and structure 1501. In this example, when flight control surface 1400 is in a position in portion 1426 of allowed range of movement 1420 of flight control surface 1400, flight control surface 1400 is far enough away from reference 1419 such that the distance between flight control surface 1400 and reference 1419 is not measured. In this case, distance measurement 1528 may not be available and a stop control signal may not be generated on line 1518 by stop controller 1504. Therefore, control signal selector 1506 provides the position control signal on line 1508 as the actuator control signal on line 1532 when flight control surface 1400 is in a position in portion 1426 of allowed range of movement 1420 of flight control surface 1400. When flight control surface 1400 is within distance 1424 from reference 1419, the distance between flight control surface 1400 and reference 1419 is measured, distance measurement 1528 is available, and stop controller 1504 may generate a stop control signal on line 1518. In this case, control signal selector 1506 selects the one of the position control signal on line 1508 and the stop control signal on line 1518 having the lesser magnitude to provide as the actuator control signal on line 1532.

Figure 16:
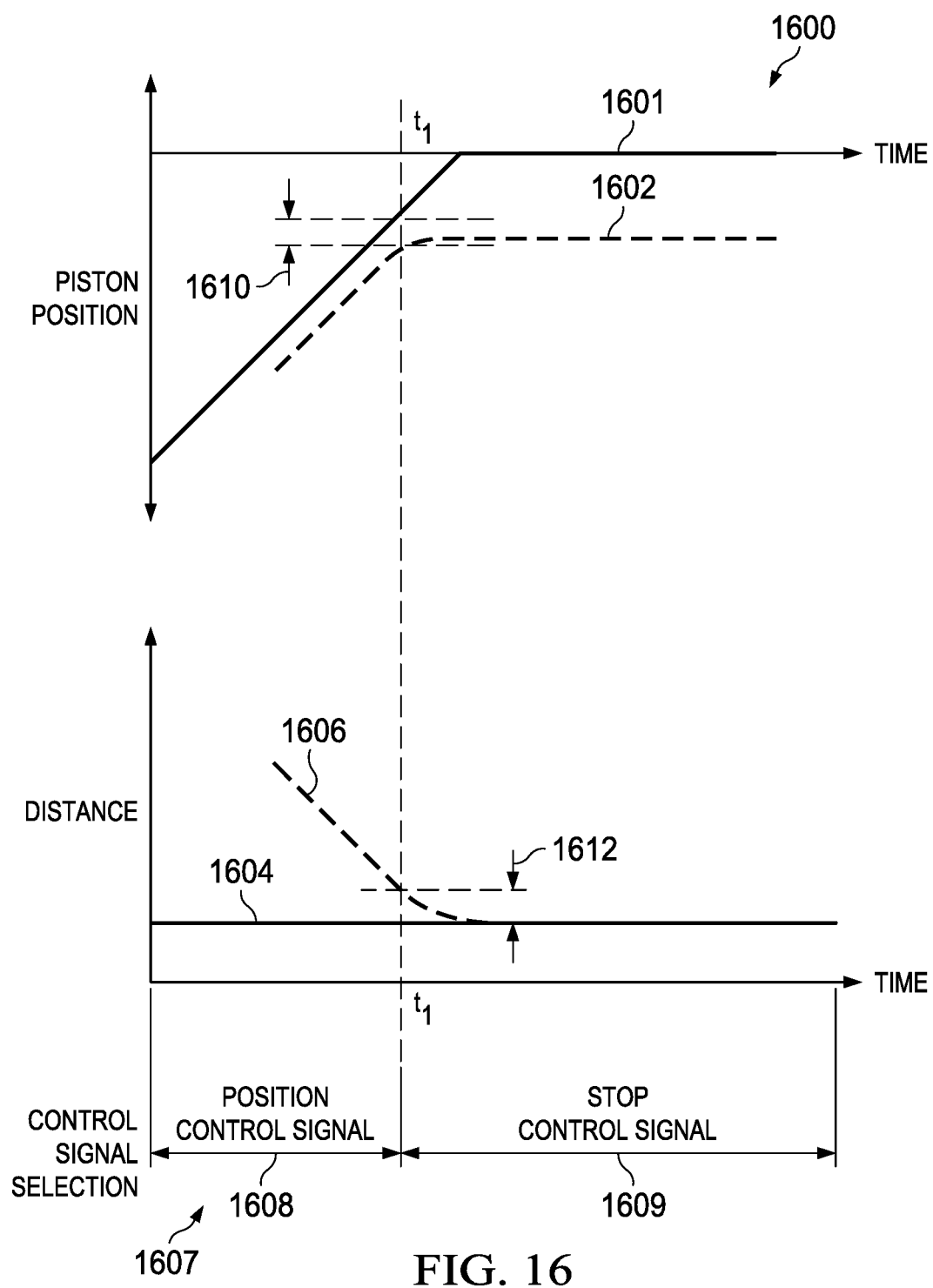
FIG. 16 is an illustration of signals over time in a controller for a flight control surface with an upper stop distance in accordance with an illustrative embodiment.

Turning to FIG. 16, an illustration of signals over time in a controller for a flight control surface with an upper stop distance is depicted in accordance with an illustrative embodiment. Signals 1600 may be an example of signals in actuator controller 1500 in FIG. 15 for controlling flight control surface 1400 in FIG. 14. The description of FIG. 16 is made with reference to FIG. 14 and FIG. 15.

Desired piston position 1601 may be an example of a desired position for piston 1408 indicated in position command 1512. Measured piston position 1602 may be an example of piston position measurement 1514 indicating the current position of piston 1408. Upper stop distance 1604 may indicate upper stop distance 1526 for flight control surface 1400. Measured distance 1606 may be an example of distance measurement 1528 indicating the current distance of flight control surface 1400 from reference 1419.

Flight control surface 1400 is within distance 1424 from reference 1419, wherein the distance of flight control surface 1400 from reference 1419 may be measured, for all times in this example. Therefore, in this example, control signal selector 1506 selects either the position control signal on line 1508 from position controller 1502 or the stop control signal on line 1518 from stop controller 1504 as control signal selection 1607 provided as the actuator control signal on line 1532 to control actuator and structure 1501. In this example, control signal selector 1506 selects the one of the position control signal on line 1508 and the stop control signal on line 1518 having the lesser magnitude as control signal selection 1607.

For purposes of simplicity, in this example, the same amount of difference 1510 determined in position controller 1502 and difference 1524 determined in stop controller 1504 results in the same magnitude of the position control signal on line 1508 from position controller 1502 and the stop control signal on line 1518 from stop controller 1504. For example, without limitation, gain 1516 in position controller 1502 and gain 1530 in stop controller 1504 may be selected to have the same absolute value magnitude in this case. However, gain 1530 in stop controller 1504 changes the sign of difference 1524 in this case.

Before time $t_1$, the difference between desired piston position 1601 and measured piston position 1602 is a relatively small positive value. The difference between lower stop distance 1604 and measured distance 1606 is a relatively large negative value. This difference is converted to a relatively large positive value by gain 1530 in stop controller 1504. Therefore, before time $t_1$, position control signal 1608 based on the difference between desired piston position 1601 and measured piston position 1602 is selected as control signal selection 1607 for controlling actuator 1402. As a result, during this time, measured piston position 1602 follows desired piston position 1601 as piston 1408 is commanded to extend and measured distance 1606 of flight control surface 1400 moves toward upper stop distance 1604.

After time $t_1$, the difference between desired piston position 1601 and measured piston position 1602 is a relatively large positive value. The difference between lower stop distance 1604 and measured distance 1606 is a relatively small negative value. This difference is converted to a relatively small positive value by gain 1530 in stop controller 1504. Therefore, after time $t_1$, stop control signal 1609 based on the difference between upper stop distance 1604 and measured distance 1606 is selected as control signal selection 1607. As a result, during this time, measured distance 1606 of flight control surface 1400 from reference 1419 is prevented from moving beyond upper stop distance 1604 even though piston 1408 is commanded to extend further.

At time $t_1$, difference 1610 between desired piston position 1601 and measured piston position 1602 has the same absolute value magnitude as difference 1612 between upper stop distance 1604 and measured distance 1606. Therefore, position control signal 1608 and stop control signal 1609 may be equal when control signal selection 1607 switches at time $t_1$, resulting in a smooth transition.

Figure 17:
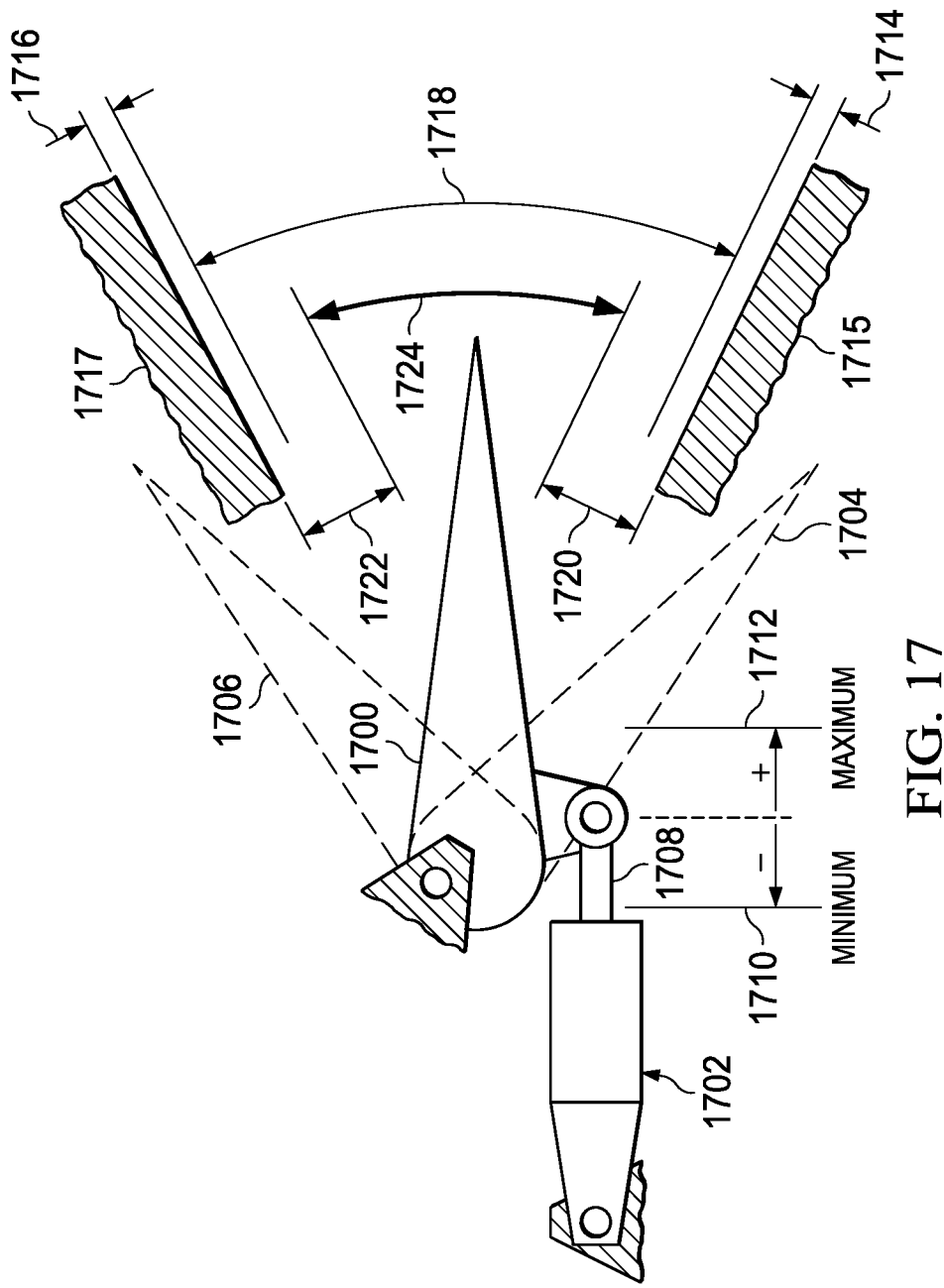
FIG. 17 is an illustration of a flight control surface with an upper stop distance and a lower stop distance in accordance with an illustrative embodiment.

Turning to FIG. 17, an illustration of a flight control surface with an upper stop distance and a lower stop distance is depicted in accordance with an illustrative embodiment. Flight control surface 1700 and actuator 1702 may be examples of one implementation of flight control surface 104 and actuator 103 in FIG. 1.

The lower and upper limits of the mechanical range of movement of flight control surface 1700 are indicated by dashed outline 1704 and dashed outline 1706, respectively. Actuator 1702 comprises piston 1708. Piston 1708 is moveable over the range indicated between lines 1710 and 1712. Piston 1708 is connected at or near a leading-edge of flight control surface 1700 in an appropriate manner such that retraction of piston 1708 causes the trailing-edge of flight control surface 1700 to move downward in the direction toward the lower limit of the mechanical range indicated by dashed outline 1704. In this example, retraction of piston 1708 and downward movement of the trailing-edge of flight control surface 1700 are defined as movements in a negative direction. Extension of piston 1708 causes the trailing-edge of flight control surface 1700 to move upward in the direction toward the upper limit of the mechanical range indicated by dashed outline 1706. Extension of piston 1708 and upward movement of the trailing-edge of flight control surface 1700 are defined as movements in a positive direction.

Lower stop distance 1714 may be defined as the minimum allowed distance of flight control surface 1700 from lower reference 1715. Upper stop distance 1716 may be defined as the minimum allowed distance of flight control surface 1700 from upper reference 1717. Therefore, limits of allowable range of movement 1718 of flight control surface 1700 are lower stop distance 1714 from lower reference 1715 and upper stop distance 1716 from upper reference 1717. Lower stop distance 1714 and upper stop distance 1716 may be fixed or variable. For example, without limitation, lower reference 1715 and upper reference 1717 may be static or moveable objects which it is desirable that flight control surface 1700 may approach to no closer than lower stop distance 1714 and upper stop distance 1716, respectively.

The distance of flight control surface 1700 from lower reference 1715 and upper reference 1717 may be measured in any appropriate manner using any appropriate sensors to identify the current distance of flight control surface 1700 from lower reference 1715 and upper reference 1717. For example, the distance of flight control surface 1700 from lower reference 1715 may be measured when flight control surface 1700 is within distance 1720 from lower reference 1715. The distance of flight control surface 1700 from upper reference 1717 may be measured when flight control surface 1700 is within distance 1722 from upper reference 1717. In this case, the distance of flight control surface 1700 from lower reference 1715 or upper reference 1717 may not be measured for portion 1724 of allowed range of movement 1718 of flight control surface 1700 wherein flight control surface 1700 is further than distance 1720 from lower reference 1715 and further than distance 1722 from upper reference 1717. In this example, distances within distance 1720 from lower reference 1715 are defined as positive distances from lower reference 1715. Distances within distance 1722 from upper reference 1717 are defined as positive distances from upper reference 1717.

Figure 18:
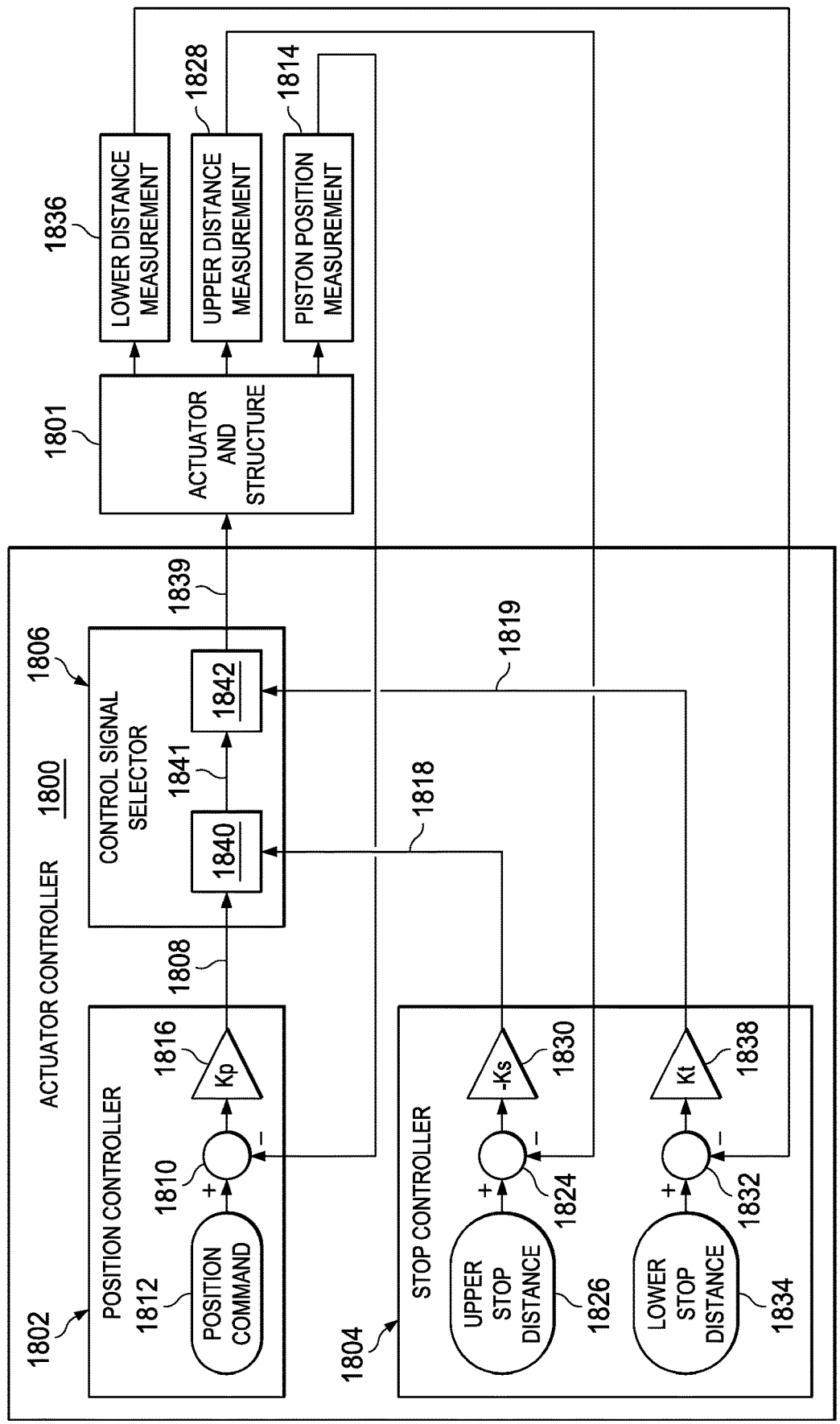
FIG. 18 is an illustration of a block diagram of a controller for a flight control surface with an upper stop distance and a lower stop distance in accordance with an illustrative embodiment.

Turning to FIG. 18, an illustration of a block diagram of a controller for a flight control surface with an upper stop distance and a lower stop distance is depicted in accordance with an illustrative embodiment. Actuator controller 1800 may be an example of one implementation of actuator controller 100 in FIG. 1. Actuator controller 1800 is configured to generate a control signal for controlling the position of actuator and structure 1801 corresponding to actuator 1702 and flight control surface 1700 in FIG. 17. The description of FIG. 18 is made with reference to FIG. 17.

Actuator controller 1800 comprises position controller 1802, stop controller 1804, and control signal selector 1806. Position controller 1802 generates a position control signal on line 1808. Position controller 1802 is configured to determine difference 1810 between a desired position for piston 1708 indicated by position command 1812 and piston position measurement 1814 indicating the current position of piston 1708. Piston position measurement 1814 may be obtained in any appropriate manner using any appropriate sensor to identify the current position of piston 1708. Difference 1810 between the desired position for piston 1708 and the current position of piston 1708 may be multiplied by gain 1816 to generate the position control signal on line 1808.

Stop controller 1804 generates a stop control signal for an upper stop distance on line 1818 and a stop control signal for a lower stop distance on line 1819. Stop controller 1804 is configured to determine difference 1824 between upper stop distance 1826 for flight control surface 1700 and upper distance measurement 1828 indicating the current distance of flight control surface 1700 from upper reference 1717. Upper distance measurement 1828 may be provided in any appropriate manner using any appropriate sensor to identify the current distance of flight control surface 1700 from upper reference 1717. Difference 1824 between upper stop distance 1826 and the current distance of flight control surface 1700 from upper reference 1717 may be multiplied by an appropriate gain 1830 to generate the stop control signal for the upper stop distance on line 1818. In this example, gain 1830 changes the sign of difference 1824 between upper stop distance 1826 and the current distance of flight control surface 1700 from upper reference 1717 to generate the stop control signal for the upper stop distance on line 1818.

Stop controller 1804 also is configured to determine difference 1832 between lower stop distance 1834 for flight control surface 1700 and lower distance measurement 1836 indicating the current distance of flight control surface 1700 from lower reference 1715. Lower distance measurement 1836 may be provided in any appropriate manner using any appropriate sensor to identify the current distance of flight control surface 1700 from lower reference 1715. Difference 1832 between lower stop distance 1834 and the current distance of flight control surface 1700 from lower reference 1715 may be multiplied by an appropriate gain 1838 to generate the stop control signal for the lower stop distance on line 1819.

Control signal selector 1806 is configured to select either the position control signal on line 1808 or one of the stop control signals on line 1818 or line 1819 to provide as an actuator control signal on line 1839 to control actuator and structure 1801. When flight control surface 1700 is in a position in portion 1724 of allowed range of movement 1718 of flight control surface 1700, flight control surface 1700 is far enough away from lower reference 1715 and upper reference 1717 such that the distance between flight control surface 1700 and lower reference 1715 and upper reference 1717 may not be measured. In this case, upper distance measurement 1828 and lower distance measurement 1836 may not be available for generating a stop control signal on line 1818 or line 1819 by stop controller 1804. Therefore, control signal selector 1806 may provide the position control signal generated by position controller 1802 on line 1808 as the actuator control signal on line 1839 when flight control surface 1700 is in a position in portion 1724 of allowed range of movement 1718 of flight control surface 1700.

Flight control surface 1700 is in a position within distance 1722 from upper reference 1717 or within distance 1720 from lower reference 1715 when flight control surface 1700 is not in a position in portion 1724 of allowed range of movement 1718 of flight control surface 1700. When the position of flight control surface 1700 is within distance 1722 from upper reference 1717, the distance between flight control surface 1700 and upper reference 1717 may be measured such that upper distance measurement 1828 is available and stop controller 1804 may generate a stop control signal for the upper stop distance on line 1818. When the position of flight control surface 1700 is within distance 1720 from lower reference 1715, the distance between flight control surface 1700 and lower reference 1715 may be measured such that lower distance measurement 1836 is available and stop controller 1804 may generate a stop control signal for the lower stop distance on line 1819. Therefore, when flight control surface 1700 is not in a position in portion 1724 of allowed range of movement 1718 of flight control surface 1700, control signal selector 1806 may select one of the position control signal on line 1808, the stop control signal for the upper stop distance on line 1818, or the stop control signal for the lower stop distance on line 1819, to provide as the actuator control signal on line 1839. Control signal selector 1806 may be configured to make this selection based on relative magnitudes of the control signals on lines 1808, 1818, and 1819.

When the position of flight control surface 1700 is not in portion 1724 of allowed range of movement 1718 of flight control surface 1700, first selector 1840 in control signal selector 1806 selects the lesser one of the position control signal from position controller 1802 on line 1808 and the stop control signal for the upper stop position from stop controller 1804 on line 1818 to provide on line 1841. Second selector 1842 in control signal selector 1806 then selects the greater one of the signal from first selector 1840 on line 1841 and the stop control signal for the lower stop distance from stop controller 1804 on line 1819 to provide as the actuator control signal on line 1839.

Figure 19:
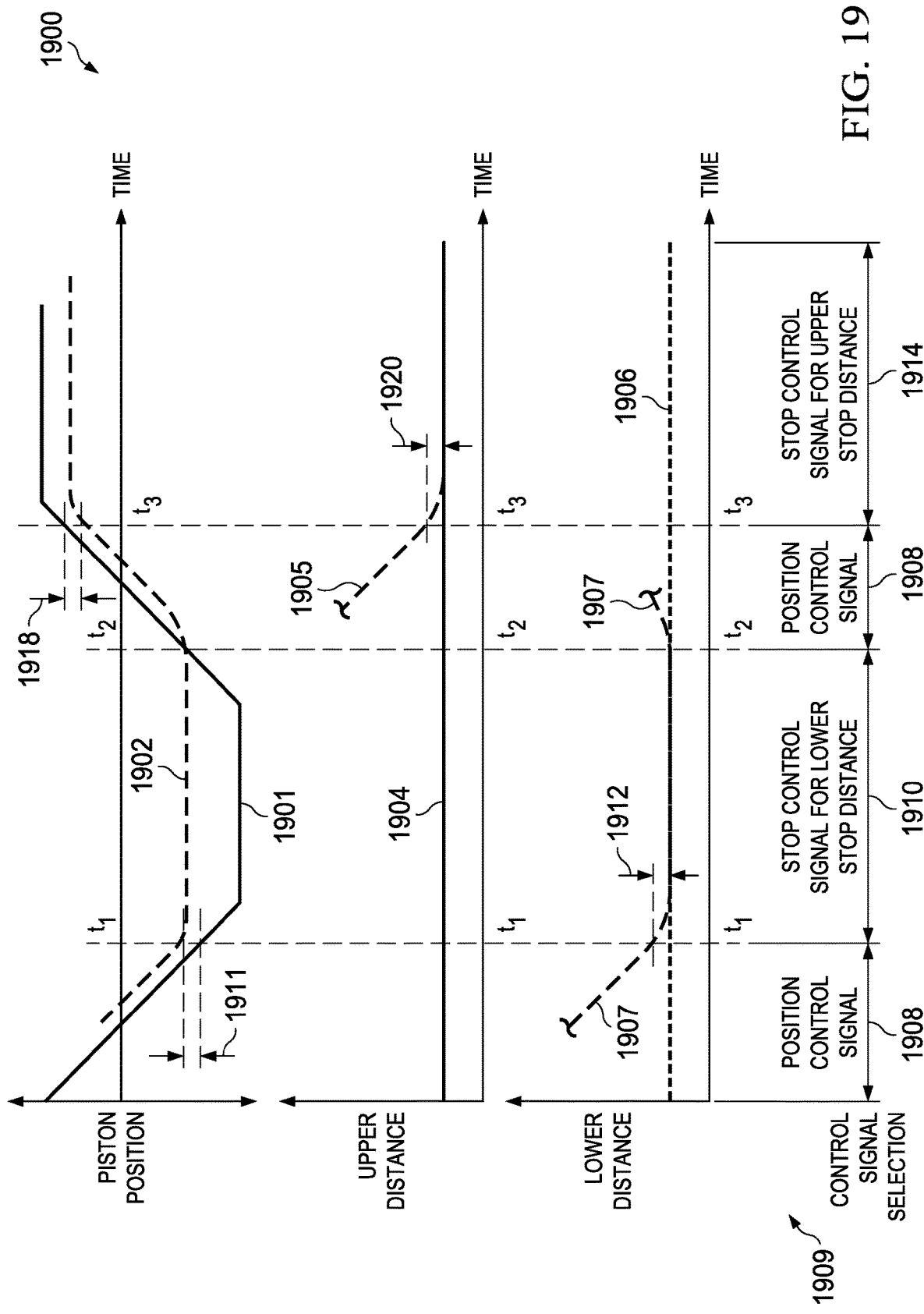
FIG. 19 is an illustration of signals over time in a controller for a flight control surface with an upper stop distance and a lower stop distance in accordance with an illustrative embodiment.

Turning to FIG. 19, an illustration of signals over time in a controller for a flight control surface with an upper stop distance and a lower stop distance is depicted in accordance with an illustrative embodiment. Signals 1900 may be an example of signals in actuator controller 1800 in FIG. 18 for controlling flight control surface 1700 in FIG. 17. The description of FIG. 19 is made with reference to FIG. 17 and FIG. 18.

Desired piston position 1901 may be an example of a desired position for piston 1708 indicated by position command 1812. Measured piston position 1902 may be an example of piston position measurement 1814 indicating the current position of piston 1708. Upper stop distance 1904 may be an example of upper stop distance 1826 for flight control surface 1700. Measured upper distance 1905 may be an example of upper distance measurement 1828 indicating the current distance of flight control surface 1700 from upper reference 1717. Lower stop distance 1906 may be an example of lower stop distance 1834 for flight control surface 1700. Measured lower distance 1907 may be an example of lower distance measurement 1836 indicating the current distance of flight control surface 1700 from lower reference 1715.

For purposes of simplicity, in this example, the same amount of difference 1810 determined in position controller 1802, difference 1824 determined in stop controller 1804, and difference 1832 determined in stop controller 1804 results in the same absolute value magnitude of the position control signal on line 1808 from position controller 1802, the stop control signal for the upper stop distance on line 1818 from stop controller 1804, and the stop control signal for the lower stop distance on line 1819 from stop controller 1804. For example, without limitation, gain 1816 in position controller 1802 and gain 1830 and gain 1838 in stop controller 1804 may be selected to have the same absolute value magnitude in this case. Gain 1830 in stop controller 1804 changes the sign of difference 1824 in this example.

Before time $t_1$, the difference between desired piston position 1901 and measured piston position 1902 is a relatively small negative value. The difference between upper stop distance 1904 and measured upper distance 1905 is a relatively large negative value. This difference is converted to a relatively large positive value by gain 1830 in stop controller 1804. The difference between lower stop distance 1906 and measured lower distance 1907 is a relatively large negative value. Therefore, before time $t_1$, position control signal 1908 based on the difference between desired piston position 1901 and measured piston position 1902 is selected by control signal selector 1806 as control signal selection 1909 for controlling actuator 1702. As a result, during this time, measured piston position 1902 follows desired piston position 1901 as piston 1708 is commanded to retract and measured lower distance 1907 of flight control surface 1700 moves toward lower stop distance 1906.

Between time $t_1$ and time $t_2$, the difference between desired piston position 1901 and measured piston position 1902 is a relatively large negative value. The difference between upper stop distance 1904 and measured upper distance 1905 remains a relatively large negative value. This difference is converted to a relatively large positive value by gain 1830 in stop controller 1804. The difference between lower stop distance 1906 and measured lower distance 1907 is a relatively small negative value. Therefore, between time $t_1$ and time $t_2$, stop control signal for lower stop distance 1910, based on the difference between lower stop distance 1906 and measured lower distance 1907, is selected by control signal selector 1806 as control signal selection 1909. As a result, during this time, measured lower distance 1907 of flight control surface 1700 is prevented from moving beyond lower stop distance 1906 even though piston 1708 is commanded to retract further.

At time $t_1$, difference 1911 between desired piston position 1901 and measured piston position 1902 is the same as difference 1912 between lower stop distance 1906 and measured lower distance 1907. Therefore, position control signal 1908 and stop control signal for lower stop distance 1910 may be equal when control signal selection 1909 switches at time $t_1$, resulting in a smooth transition.

Between time $t_2$ and time $t_3$, the difference between desired piston position 1901 and measured piston position 1902 is a relatively small positive value. The difference between upper stop distance 1904 and measured upper distance 1905 is a relatively large negative value. This difference is converted to a relatively large positive value by gain 1830 in stop controller 1804. The difference between lower stop distance 1906 and measured lower distance 1907 is a negative value. Therefore, between time $t_2$ and time $t_3$, position control signal 1908 based on the difference between desired piston position 1901 and measured piston position 1902 is selected again by control signal selector 1806 as control signal selection 1909 for controlling actuator 1702. As a result, during this time, measured piston position 1902 follows desired piston position 1901 as piston 1708 is commanded to extend and flight control surface 1700 moves away from lower reference 1715 and toward upper reference 1717.

After time $t_3$, the difference between desired piston position 1901 and measured piston position 1902 is a relatively large positive value. The difference between upper stop distance 1904 and measured upper distance 1905 is a relatively small negative value. This difference is converted to a relatively small positive value by gain 1830 in stop controller 1804. The difference between lower stop distance 1906 and measured lower distance 1907 is a relatively large negative value. Therefore, after time $t_3$, stop control signal for upper stop distance 1914, based on the difference between upper stop distance 1904 and measured upper distance 1905, is selected by control signal selector 1806 as control signal selection 1909. As a result, during this time, measured upper distance 1905 of flight control surface 1700 is prevented from moving beyond upper stop distance 1904 even though piston 1708 is commanded to extend further.

At time $t_3$, the absolute value of difference 1918 between desired piston position 1901 and measured piston position 1902 is the same as the absolute value of difference 1920 between upper stop distance 1904 and measured upper distance 1905. Therefore, position control signal 1908 and stop control signal for upper stop distance 1914 may be equal when control signal selection 1009 switches at time $t_3$, resulting in a smooth transition.

Figure 20:
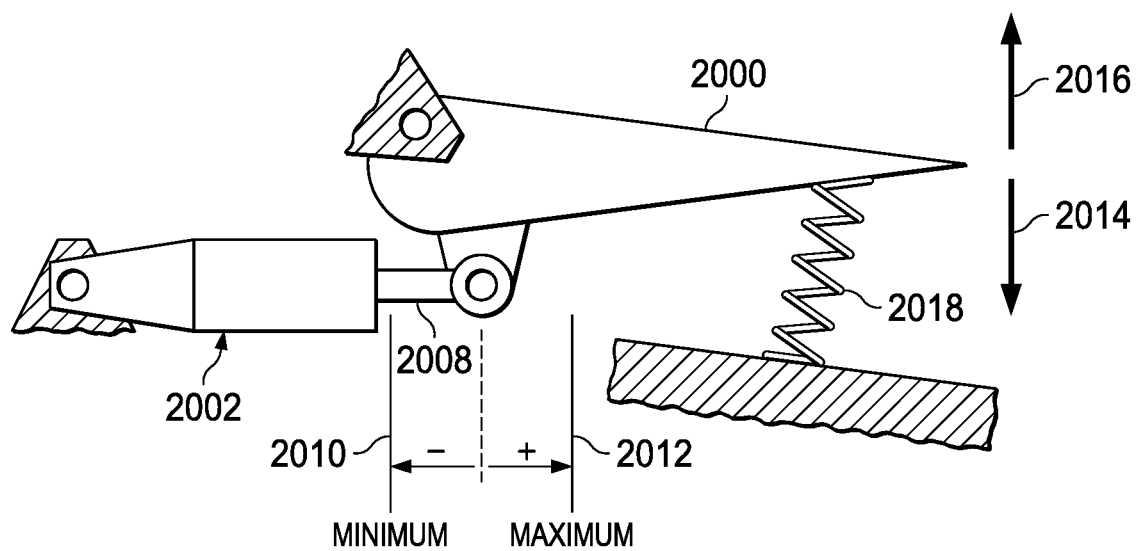
FIG. 20 is an illustration of a flight control surface with an allowed downward force in accordance with an illustrative embodiment.

Turning to FIG. 20, an illustration of a flight control surface with an allowed downward force is depicted in accordance with an illustrative embodiment. Flight control surface 2000 and actuator 2002 may be examples of one implementation of flight control surface 104 and actuator 103 in FIG. 1.

Actuator 2002 comprises piston 2008. Piston 2008 is moveable over the range indicated between lines 2010 and 2012. Piston 2008 is connected at or near a leading-edge of flight control surface 2000 in an appropriate manner such that retraction of piston 2008 causes the trailing-edge of flight control surface 2000 to move downward in the direction indicated by arrow 2014. In this example, retraction of piston 2008 and downward movement of the trailing-edge of flight control surface 2000 are defined as movements in a negative direction. Extension of piston 2008 causes the trailing-edge of flight control surface 2000 to move upward in the direction indicated by arrow 2016. Extension of piston 2008 and upward movement of the trailing-edge of flight control surface 2000 are defined as movements in a positive direction.

Spring 2018 represents a force that opposes the downward movement of flight control surface 2000 and that increases as the position of flight control surface 2000 moves downward. In other words, spring 2018 represents a force that must be provided to flight control surface 2000 to move flight control surface 2000 downward in the direction indicated by arrow 2014. For example, without limitation, the force represented by spring 2018 may be the result of a mechanical structure deformation in flight control surface 2000, an air load on flight control surface 2000, another force, or combinations of various forces that oppose the downward movement of flight control surface 2000 and that increase as flight control surface 2000 moves downward. Alternatively, or in addition, spring 2018 may represent a force that opposes retraction of piston 2008 and that increases as piston 2008 is retracted further. In this example, the force represented by spring 2018 is defined as a negative force.

The force on flight control surface 2000 represented by spring 2018 may change due to changing conditions other than changes in the position of flight control surface 2000. For example, without limitation, the force on flight control surface 2000 from an air load may change due to changes in the airspeed of flight control surface 2000.

The amount of force on flight control surface 2000 represented by spring 2018 may be measured in any appropriate manner using any appropriate sensor to identify the current force on flight control surface 2000 opposing the downward movement of flight control surface 2000. For example, without limitation, the current force on flight control surface 2000 may be derived from measured pressure in a hydraulic component in actuator 2002 or in any other appropriate manner.

An allowed downward force may be defined as the maximum allowed force opposing downward movement of flight control surface 2000. For example, without limitation, the allowed downward force may be defined as the maximum allowed force that actuator 2002 may apply to flight control surface 2000 to move flight control surface 2000 downward. The allowed downward force may be fixed or variable. In this example, the allowed downward force is defined as a negative force.

Figure 21:
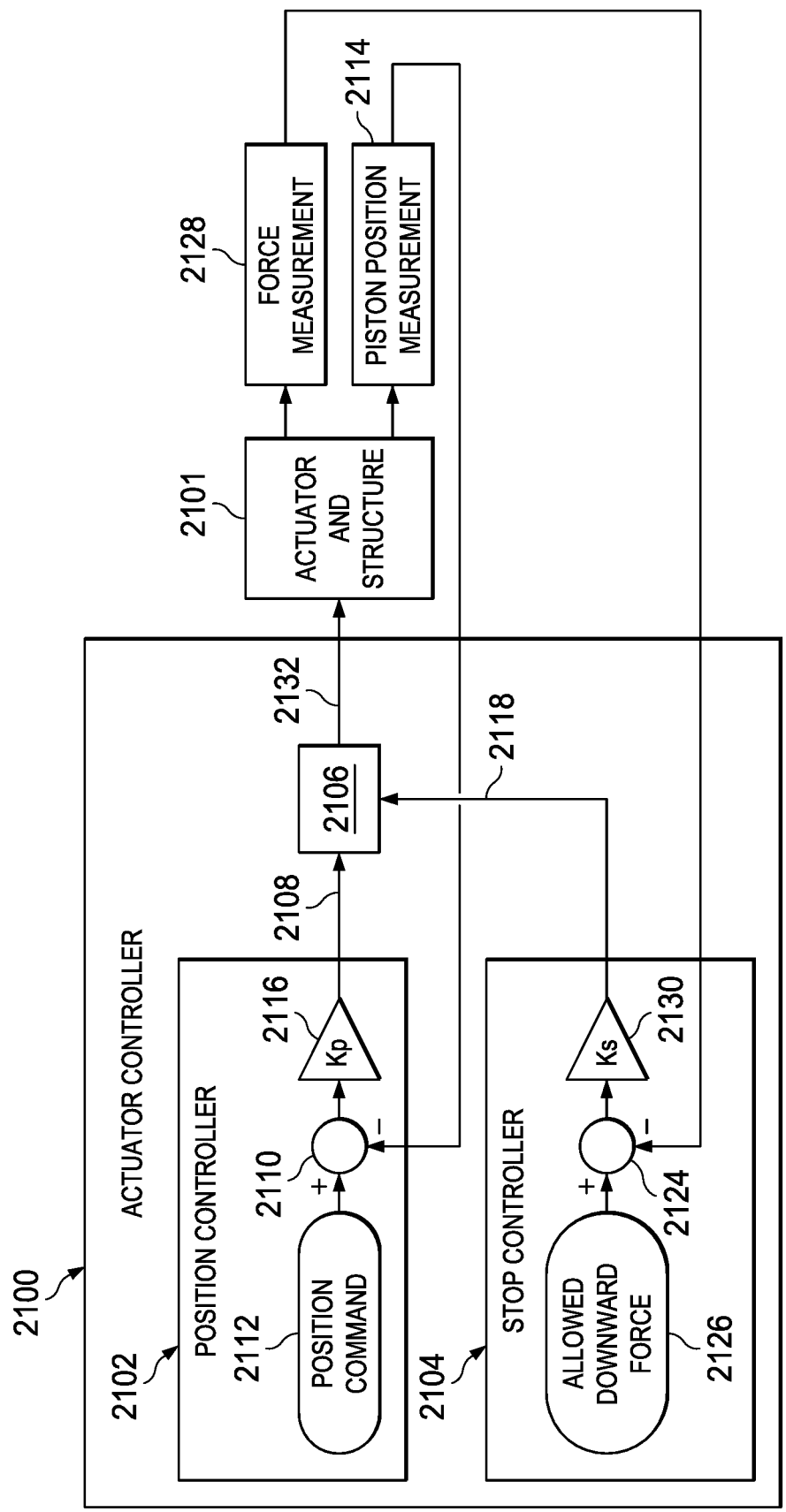
FIG. 21 is an illustration of a block diagram of a controller for a flight control surface with an allowed downward force in accordance with an illustrative embodiment.

Turning to FIG. 21, an illustration of a block diagram of a controller for a flight control surface with an allowed downward force is depicted in accordance with an illustrative embodiment. Actuator controller 2100 may be an example of one implementation of actuator controller 100 in FIG. 1. Actuator controller 2100 is configured to generate a control signal for controlling the position of actuator and structure 2101 corresponding to actuator 2002 and flight control surface 2000 in FIG. 20. The description of FIG. 21 is made with reference to FIG. 20.

Actuator controller 2100 comprises position controller 2102, stop controller 2104, and control signal selector 2106. Position controller 2102 generates a position control signal on line 2108. Position controller 2102 is configured to determine difference 2110 between a desired position for piston 2008 indicated by position command 2112 and piston position measurement 2114 indicating the current position of piston 2008. Piston position measurement 2114 may be obtained in any appropriate manner using any appropriate sensor to identify the current position of piston 2008. Difference 2110 between the desired position for piston 2008 and the current position of piston 2008 may be multiplied by gain 2116 to generate the position control signal on line 2108.

Stop controller 2104 generates a stop control signal on line 2118. Stop controller 2104 is configured to determine difference 2124 between allowed downward force 2126 for flight control surface 2000 and the current amount of force opposing the downward movement of flight control surface 2000 as indicated by force measurement 2128. Force measurement 2128 may be provided in any appropriate manner using any appropriate sensor to identify the current force on flight control surface 2000 opposing the downward movement of flight control surface 2000. Difference 2124 between allowed downward force 2126 and the current amount of force resisting the downward movement of flight control surface 2000 may be multiplied by an appropriate gain 2130 to generate the stop control signal on line 2118.

Control signal selector 2106 is configured to select either the position control signal from position controller 2102 on line 2108 or the stop control signal from stop controller 2104 on line 2118 to provide as an actuator control signal on line 2132 to control actuator and structure 2101. In this example, control signal selector 2106 selects the one of the position control signal on line 2108 and the stop control signal on line 2118 having the larger magnitude to provide as the actuator control signal on line 2132.

Figure 22:
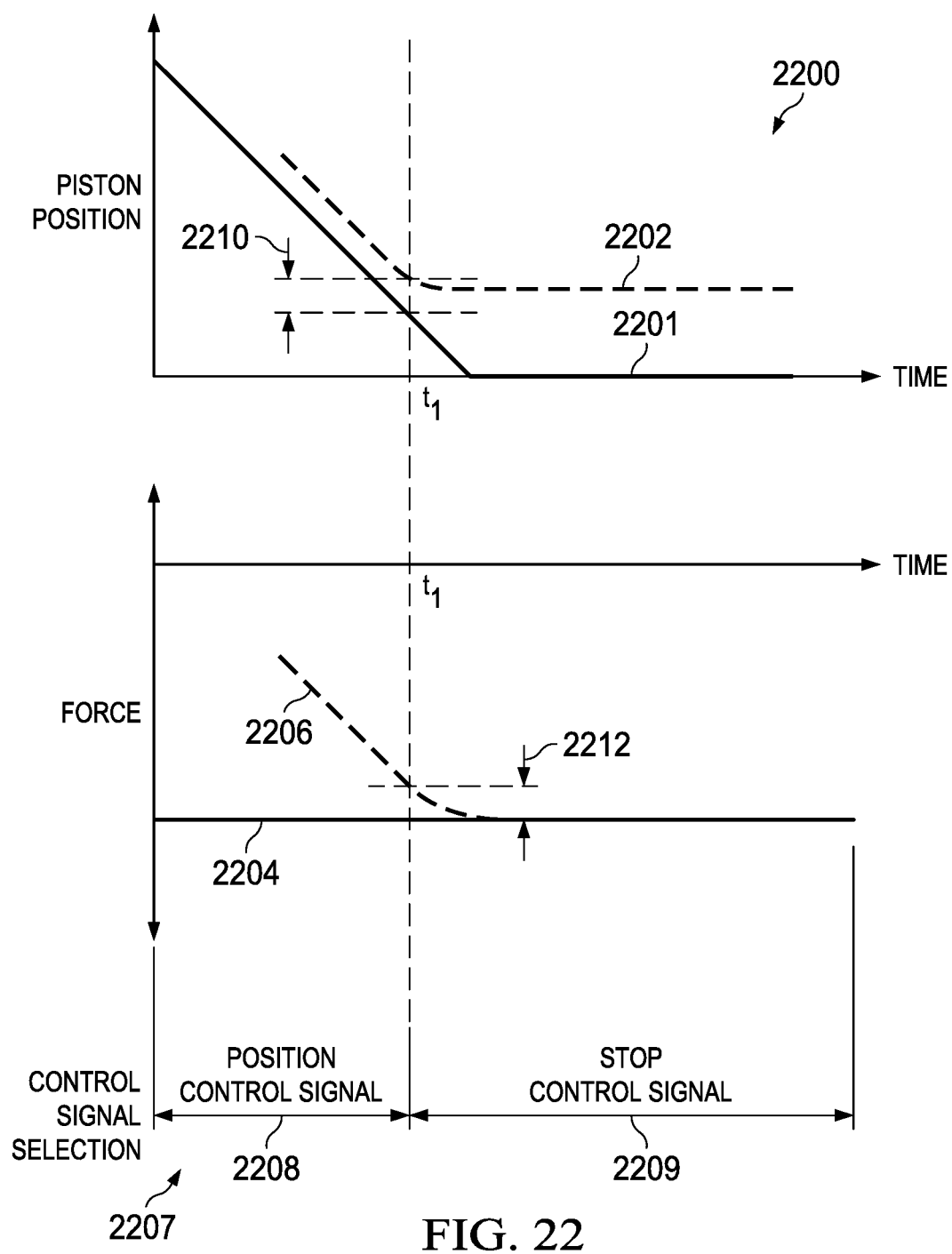
FIG. 22 is an illustration of signals over time in a controller for a flight control surface with an allowed downward force in accordance with an illustrative embodiment.

Turning to FIG. 22, an illustration of signals over time in a controller for a flight control surface with an allowed downward force is depicted in accordance with an illustrative embodiment. Signals 2200 may be an example of signals in actuator controller 2100 in FIG. 21 for controlling flight control surface 2000 in FIG. 20. The description of FIG. 22 is made with reference to FIG. 20 and FIG. 21.

Desired piston position 2201 may be an example of a desired position for piston 2008 indicated by position command 2112. Measured piston position 2202 may be an example of the current position of piston 2008 indicated by piston position measurement 2114. Allowed downward force 2204 may be an example of allowed downward force 2126 for flight control surface 2000. Measured downward force 2206 may be an example of the current amount of force on flight control surface 2000 opposing the downward movement of flight control surface 2000 as indicated by force measurement 2128.

Control signal selector 2106 selects either the position control signal from position controller 2102 on line 2108 or the stop control signal from stop controller 2104 on line 2118 as control signal selection 2207 that is provided as the actuator control signal on line 2132 to control actuator and structure 2101. In this example, control signal selector 2106 selects the one of the position control signal on line 2108 and the stop control signal on line 2118 having the greater magnitude as control signal selection 2207.

For purposes of simplicity, in this example, the same amount of difference 2110 determined in position controller 2102 and difference 2124 determined in stop controller 2104 results in the same magnitude of the position control signal from position controller 2102 on line 2108 and the stop control signal from stop controller 2104 on line 2118. For example, without limitation, gain 2116 in position controller 2102 and gain 2130 in stop controller 2104 may be selected to be the same in this case.

Before time $t_1$, the difference between desired piston position 2201 and measured piston position 2202 is a relatively small negative value. The difference between allowed downward force 2204 and measured downward force 2206 is a relatively large negative value. Therefore, before time $t_1$, position control signal 2208 based on the difference between desired piston position 2201 and measured piston position 2202 is selected as control signal selection 2207 for controlling actuator 2002. As a result, during this time, measured piston position 2202 follows desired piston position 2201 as piston 2008 is commanded to retract and the absolute value of measured downward force 2206 opposing downward movement of flight control surface 2000 increases toward the absolute value of allowed downward force 2204.

After time $t_1$, the difference between desired piston position 2201 and measured piston position 2202 is a relatively large negative value. The difference between allowed downward force 2204 and measured downward force 2206 is a relatively small negative value. Therefore, after time $t_1$, stop control signal 2209 based on the difference between allowed downward force 2204 and measured downward force 2206 is selected as control signal selection 2207. As a result, during this time, the absolute value of measured downward force 2206 opposing the downward movement of flight control surface 2000 is prevented from exceeding the absolute value of allowed downward force 2204 even though piston 2008 is commanded to retract further.

At time $t_1$, difference 2210 between desired piston position 2201 and measured piston position 2202 is the same as difference 2212 between allowed downward force 2204 and measured downward force 2206. Therefore, position control signal 2208 and stop control signal 2209 may be equal when control signal selection 2207 switches at time $t_1$, resulting in a smooth transition.

Figure 23:
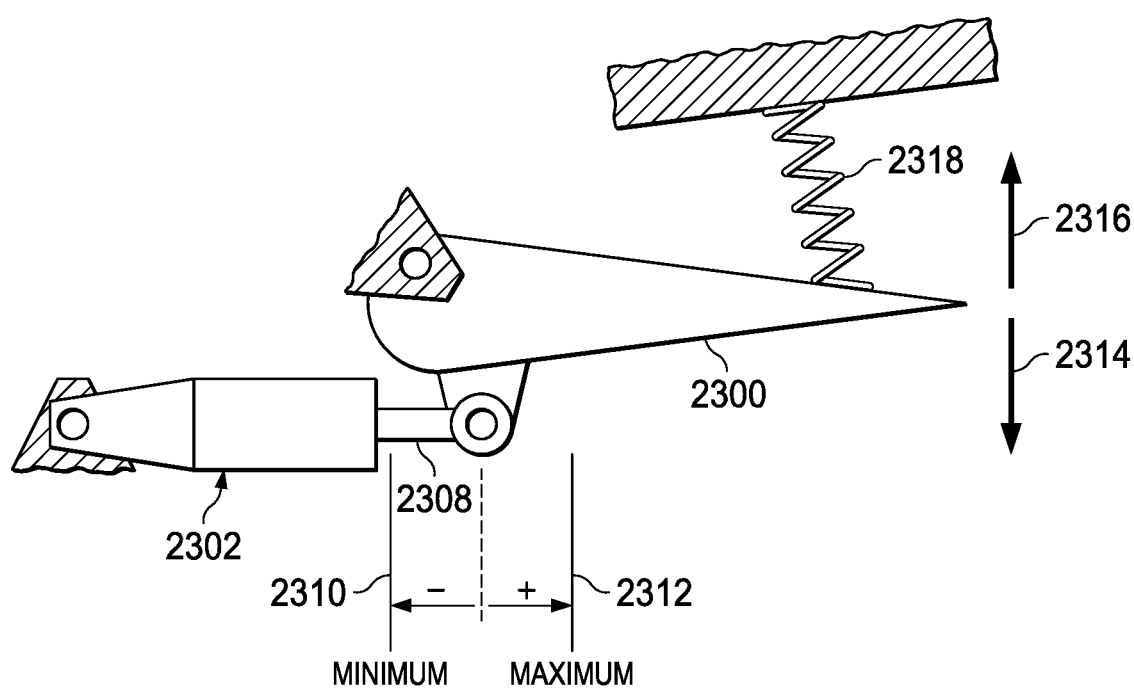
FIG. 23 is an illustration of a flight control surface with an allowed upward force in accordance with an illustrative embodiment.

Turning to FIG. 23, an illustration of a flight control surface with an allowed upward force is depicted in accordance with an illustrative embodiment. Flight control surface 2300 and actuator 2302 may be examples of one implementation of flight control surface 104 and actuator 103 in FIG. 1.

Actuator 2302 comprises piston 2308. Piston 2308 is moveable over the range indicated between lines 2310 and 2312. Piston 2308 is connected at or near a leading-edge of flight control surface 2300 in an appropriate manner such that retraction of piston 2308 causes the trailing-edge of flight control surface 2300 to move downward in the direction indicated by arrow 2314. In this example, retraction of piston 2308 and downward movement of the trailing-edge of flight control surface 2300 are defined as movements in a negative direction. Extension of piston 2308 causes the trailing-edge of flight control surface 2300 to move upward in the direction indicated by arrow 2316. Extension of piston 2308 and upward movement of the trailing-edge of flight control surface 2300 are defined as movements in a positive direction.

Spring 2318 represents a force that opposes the upward movement of flight control surface 2300 and that increases as the position of flight control surface 2300 moves upward. In other words, spring 2318 represents a force that must be provided to flight control surface 2300 to move flight control surface 2300 upward in the direction indicated by arrow 2316. For example, without limitation, the force represented by spring 2318 may be the result of a mechanical structure deformation in flight control surface 2300, an air load on flight control surface 2300, another force, or combinations of various forces that oppose the upward movement of flight control surface 2300 and that increase as flight control surface 2300 moves upward. Alternatively, or in addition, spring 2318 may represent a force that opposes extension of piston 2308 and that increases as piston 2308 is extended further. In this example, the force represented by spring 2318 is defined as a positive force.

The force on flight control surface 2300 represented by spring 2318 may change due to changing conditions other than changes in the position of flight control surface 2300. For example, without limitation, the force on flight control surface 2300 from an air load may change due to changes in the airspeed of flight control surface 2300.

The amount of force on flight control surface 2300 represented by spring 2318 may be measured in any appropriate manner using any appropriate sensor to identify the current force on flight control surface 2300 opposing the upward movement of flight control surface 2300. For example, without limitation, the current force on flight control surface 2300 may be derived from measured pressure in a hydraulic component in actuator 2302 or in any other appropriate manner.

An allowed upward force may be defined as the maximum allowed force opposing upward movement of flight control surface 2300. For example, without limitation, the allowed upward force may be defined as the maximum allowed force that actuator 2302 may apply to flight control surface 2300 to move flight control surface 2300 upward. The allowed upward force may be fixed or variable. In this example, the allowed upward force is defined as a positive force.

Figure 24:
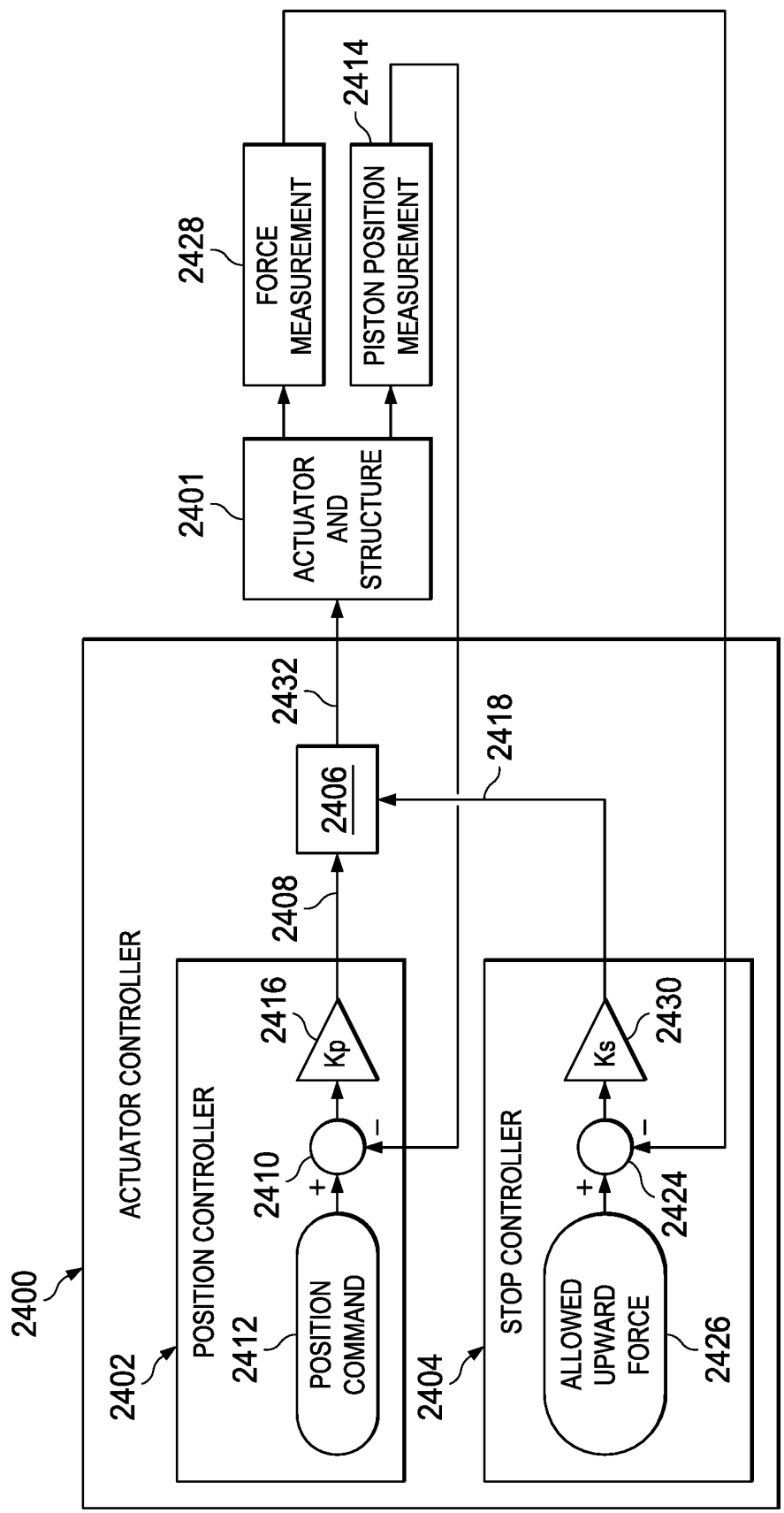
FIG. 24 is an illustration of a block diagram of a controller for a flight control surface with an allowed upward force in accordance with an illustrative embodiment.

Turning to FIG. 24, an illustration of a block diagram of a controller for a flight control surface with an allowed upward force is depicted in accordance with an illustrative embodiment. Actuator controller 2400 may be an example of one implementation of actuator controller 100 in FIG. 1. Actuator controller 2400 is configured to generate a control signal for controlling the position of actuator and structure 2401 corresponding to actuator 2302 and flight control surface 2300 in FIG. 23. The description of FIG. 24 is made with reference to FIG. 23.

Actuator controller 2400 comprises position controller 2402, stop controller 2404, and control signal selector 2406. Position controller 2402 generates a position control signal on line 2408. Position controller 2402 is configured to determine difference 2410 between a desired position for piston 2308 indicated by position command 2412 and piston position measurement 2414 indicating the current position of piston 2308. Piston position measurement 2414 may be obtained in any appropriate manner using any appropriate sensor to identify the current position of piston 2308. Difference 2410 between the desired position for piston 2308 and the current position of piston 2308 may be multiplied by gain 2416 to generate the position control signal on line 2408.

Stop controller 2404 generates a stop control signal on line 2418. Stop controller 2404 is configured to determine difference 2424 between allowed upward force 2426 for flight control surface 2300 and the current amount of force opposing the upward movement of flight control surface 2300 as indicated by force measurement 2428. Force measurement 2428 may be provided in any appropriate manner using any appropriate sensor to identify the current force on flight control surface 2300 opposing the upward movement of flight control surface 2300. Difference 2424 between allowed upward force 2426 and the current amount of force resisting the upward movement of flight control surface 2300 may be multiplied by an appropriate gain 2430 to generate the stop control signal on line 2418.

Control signal selector 2406 is configured to select either the position control signal from position controller 2402 on line 2408 or the stop control signal from stop controller 2404 on line 2418 to provide as an actuator control signal on line 2432 to control actuator and structure 2401. In this example, control signal selector 2406 selects the lesser one of the position control signal on line 2408 and the stop control signal on line 2418 to provide as the actuator control signal on line 2432.

Figure 25:
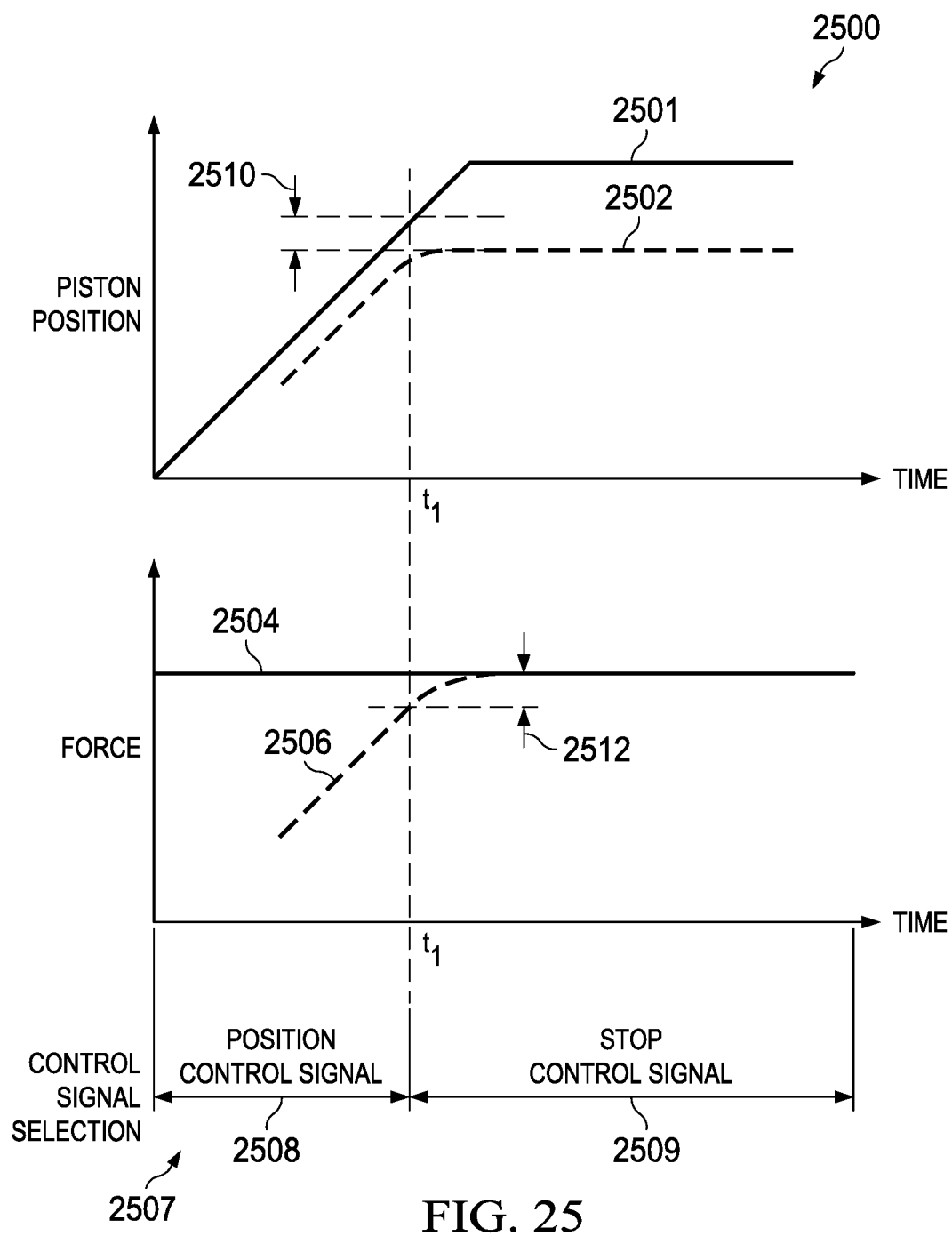
FIG. 25 is an illustration of signals over time in a controller for a flight control surface with an allowed upward force in accordance with an illustrative embodiment.

Turning to FIG. 25, an illustration of signals over time in a controller for a flight control surface with an allowed upward force is depicted in accordance with an illustrative embodiment. Signals 2500 may be an example of signals in actuator controller 2400 in FIG. 24 for controlling flight control surface 2300 in FIG. 23. The description of FIG. 25 is made with reference to FIG. 23 and FIG. 24.

Desired piston position 2501 may be an example of a desired position for piston 2308 indicated by position command 2412. Measured piston position 2502 may be an example of the current position of piston 2308 indicated by piston position measurement 2414. Allowed upward force 2504 may be an example of allowed upward force 2426 for flight control surface 2300. Measured upward force 2506 may be an example of the current amount of force on flight control surface 2300 opposing the upward movement of flight control surface 2300 as indicated by force measurement 2428.

Control signal selector 2406 selects either the position control signal from position controller 2402 on line 2408 or the stop control signal from stop controller 2404 on line 2418 as control signal selection 2507 that is provided as the actuator control signal on line 2432 to control actuator and structure 2401. In this example, control signal selector 2406 selects the lesser one of the position control signal on line 2408 and the stop control signal on line 2418 as control signal selection 2507.

For purposes of simplicity, in this example, the same amount of difference 2410 determined in position controller 2402 and difference 2424 determined in stop controller 2404 results in the same magnitude of the position control signal from position controller 2402 on line 2408 and the stop control signal from stop controller 2404 on line 2418. For example, without limitation, gain 2416 in position controller 2402 and gain 2430 in stop controller 2404 may be selected to be the same in this case.

Before time $t_1$, the difference between desired piston position 2501 and measured piston position 2502 is a relatively small positive value. The difference between allowed upward force 2504 and measured upward force 2506 is a relatively large positive value. Therefore, before time $t_1$, position control signal 2508 based on the difference between desired piston position 2501 and measured piston position 2502 is selected as control signal selection 2507 for controlling actuator 2302. As a result, during this time, measured piston position 2502 follows desired piston position 2501 as piston 2308 is commanded to extend and measured upward force 2506 opposing upward movement of flight control surface 2300 increases toward allowed upward force 2504.

After time $t_1$, the difference between desired piston position 2501 and measured piston position 2502 is a relatively large positive value. The difference between allowed upward force 2504 and measured upward force 2506 is a relatively small positive value. Therefore, after time $t_1$, stop control signal 2509 based on the difference between allowed upward force 2504 and measured upward force 2506 is selected as control signal selection 2507. As a result, during this time, measured upward force 2506 opposing the upward movement of flight control surface 2300 is prevented from exceeding allowed upward force 2504 even though piston 2308 is commanded to extend further.

At time $t_1$, difference 2510 between desired piston position 2501 and measured piston position 2502 is the same as difference 2512 between allowed upward force 2504 and measured upward force 2506. Therefore, position control signal 2508 and stop control signal 2509 may be equal when control signal selection 2507 switches at time $t_1$, resulting in a smooth transition.

Figure 26:
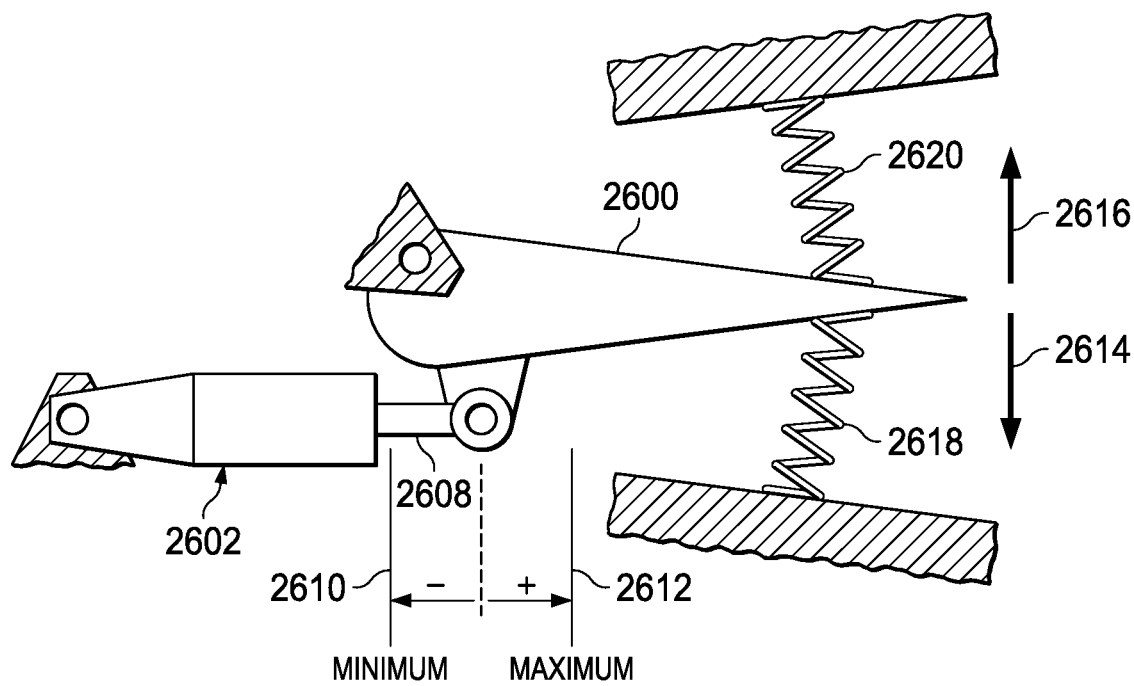
FIG. 26 is an illustration of a flight control surface with an allowed downward force and an allowed upward force in accordance with an illustrative embodiment.

Turning to FIG. 26, an illustration of a flight control surface with an allowed downward force and an allowed upward force is depicted in accordance with an illustrative embodiment. Flight control surface 2600 and actuator 2602 may be examples of one implementation of flight control surface 104 and actuator 103 in FIG. 1.

Actuator 2602 comprises piston 2608. Piston 2608 is moveable over the range indicated between lines 2610 and 2612. Piston 2608 is connected at or near a leading-edge of flight control surface 2600 in an appropriate manner such that retraction of piston 2608 causes the trailing-edge of flight control surface 2600 to move downward in the direction indicated by arrow 2614. In this example, retraction of piston 2608 and downward movement of the trailing-edge of flight control surface 2600 are defined as movements in a negative direction. Extension of piston 2608 causes the trailing-edge of flight control surface 2600 to move upward in the direction indicated by arrow 2616. Extension of piston 2608 and upward movement of the trailing-edge of flight control surface 2600 are defined as movements in a positive direction.

Spring 2618 represents a force that opposes the downward movement of flight control surface 2600 and that increases as the position of flight control surface 2600 moves downward. In other words, spring 2618 represents a force that must be provided to flight control surface 2600 to move flight control surface 2600 downward in the direction indicated by arrow 2614. Alternatively, or in addition, spring 2618 may represent a force that opposes retraction of piston 2608 and that increases as piston 2608 is retracted further. In this example, the force represented by spring 2618 is defined as a negative force.

Spring 2620 represents a force that opposes the upward movement of flight control surface 2600 and that increases as the position of flight control surface 2600 moves upward. In other words, spring 2620 represents a force that must be provided to flight control surface 2600 to move flight control surface 2600 upward in the direction indicated by arrow 2616. Alternatively, or in addition, spring 2620 may represent a force that opposes extension of piston 2608 and that increases as piston 2608 is extended further. In this example, the force represented by spring 2620 is defined as a positive force.

The forces on flight control surface 2600 represented by spring 2618 and spring 2620 may change due to changing conditions other than changes in the position of flight control surface 2600. For example, without limitation, the forces on flight control surface 2600 from an air load may change due to changes in the airspeed of flight control surface 2600.

The amount of force on flight control surface 2600 represented by spring 2618 and spring 2620 may be measured in any appropriate manner using any appropriate sensor to identify the current forces on flight control surface 2600 opposing downward and upward movement of flight control surface 2600. For example, without limitation, the current forces on flight control surface 2600 may be derived from measured pressure in a hydraulic component in actuator 2602 or in any other appropriate manner.

An allowed downward force may be defined as the maximum allowed force opposing downward movement of flight control surface 2600. For example, without limitation, the allowed downward force may be defined as the maximum allowed force that actuator 2602 may apply to flight control surface 2600 to move flight control surface 2600 downward when piston 2608 is retracted. In this example, the allowed downward force is defined as a negative force. An allowed upward force may be defined as the maximum allowed force opposing upward movement of flight control surface 2600. For example, without limitation, the allowed upward force may be defined as the maximum allowed force that actuator 2602 may apply to flight control surface 2600 to move flight control surface 2600 upward when piston 2608 is extended. In this example, the allowed upward force is defined as a positive force. The allowed downward force and the allowed upward force may be fixed or variable.

Figure 27:
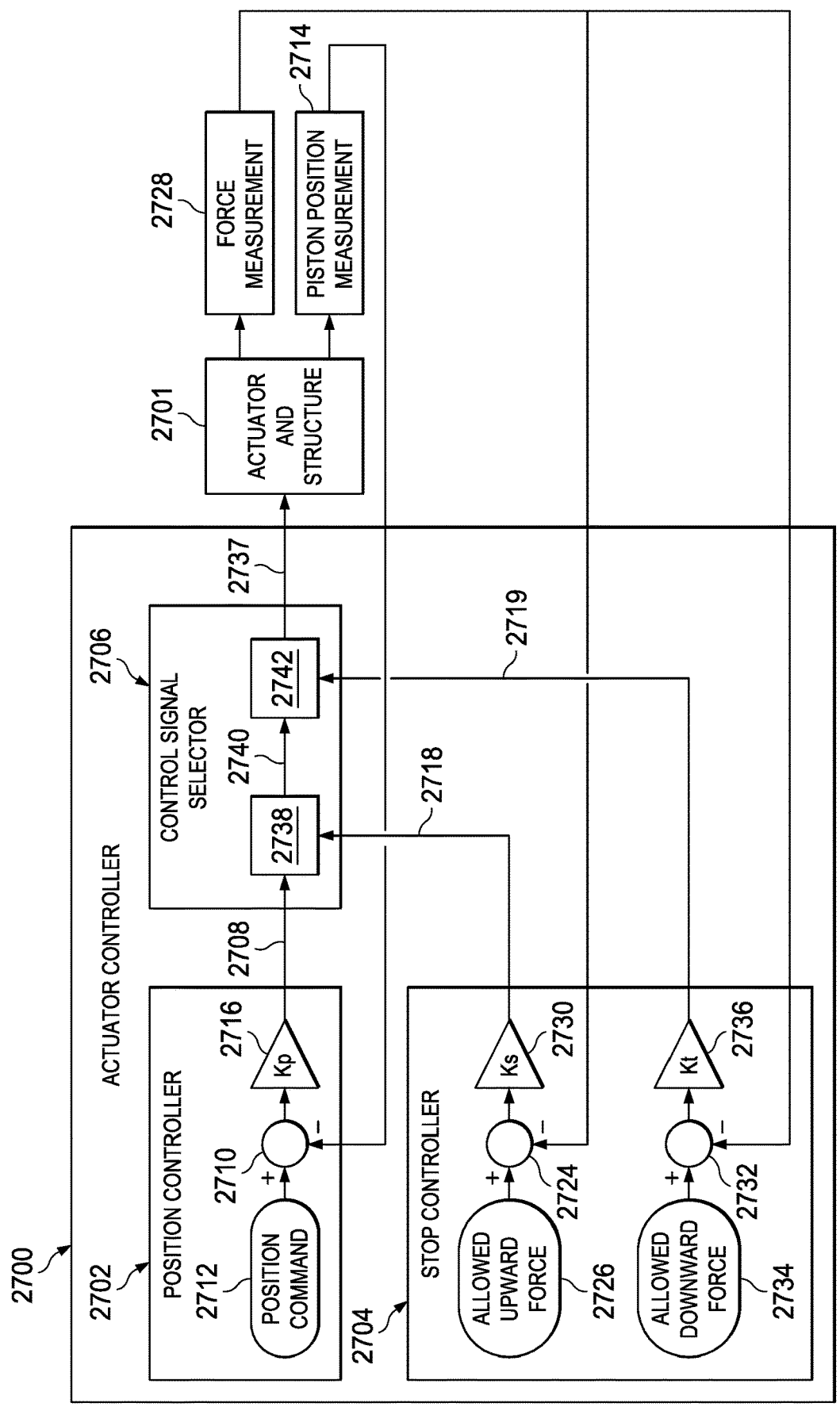
FIG. 27 is an illustration of a block diagram of a controller for a flight control surface with an allowed downward force and an allowed upward force in accordance with an illustrative embodiment.

Turning to FIG. 27, an illustration of a block diagram of a controller for a flight control surface with an allowed downward force and an allowed upward force is depicted in accordance with an illustrative embodiment. Actuator controller 2700 may be an example of one implementation of actuator controller 100 in FIG. 1. Actuator controller 2700 is configured to generate a control signal for controlling the position of actuator and structure 2701 corresponding to actuator 2602 and flight control surface 2600 in FIG. 26. The following description of FIG. 27 is made with reference to FIG. 26.

Actuator controller 2700 comprises position controller 2702, stop controller 2704, and control signal selector 2706. Position controller 2702 generates a position control signal on line 2708. Position controller 2702 is configured to determine difference 2710 between a desired position for piston 2608 indicated by position command 2712 and piston position measurement 2714 indicating the current position of piston 2608. Piston position measurement 2714 may be obtained in any appropriate manner using any appropriate sensor to identify the current position of piston 2608. Difference 2710 between the desired position for piston 2608 and the current position of piston 2608 may be multiplied by gain 2716 to generate the position control signal on line 2708.

Stop controller 2704 generates a stop control signal for an allowed upward force on line 2718 and a stop control signal for an allowed downward force on line 2719. Stop controller 2704 is configured to determine difference 2724 between allowed upward force 2726 for flight control surface 2600 and the current amount of force opposing the upward movement of flight control surface 2600 as indicated by force measurement 2728. Force measurement 2728 may be provided in any appropriate manner using any appropriate sensor to identify the current force on flight control surface 2600 opposing the upward or downward movement of flight control surface 2600. Difference 2724 between allowed upward force 2726 and the current amount of force opposing the upward movement of flight control surface 2600 may be multiplied by an appropriate gain 2730 to generate the stop control signal for the allowed upward force on line 2718.

Stop controller 2704 also is configured to determine difference 2732 between allowed downward force 2734 for flight control surface 2600 and the current amount of force opposing the downward movement of flight control surface 2600 as indicated by force measurement 2728. Difference 2732 between allowed downward force 2734 and the current amount of force opposing the downward movement of flight control surface 2600 may be multiplied by an appropriate gain 2736 to generate the stop control signal for the allowed downward force on line 2719.

Control signal selector 2706 is configured to select either the position control signal from position controller 2702 on line 2708 or one of the stop control signals from stop controller 2704 on line 2718 or line 2719 to provide as an actuator control signal on line 2737 to control actuator and structure 2701. In this example, control signal selector 2706 selects one of the position control signal on line 2708, the stop control signal for the allowed upward force on line 2718, or the stop control signal for the allowed downward force on line 2719 to provide as the actuator control signal on line 2737 based on relative magnitudes of the signals on lines 2708, 2718, and 2719.

First selector 2738 in control signal selector 2706 selects the lesser one of the position control signal from position controller 2702 on line 2708 and the stop control signal for the allowed upward force from stop controller 2704 on line 2718 to provide on line 2740. Second selector 2742 in control signal selector 2706 then selects the greater one of the signal from first selector 2738 on line 2740 and the stop control signal for the allowed downward force from stop controller 2704 on line 2719 to provide as the actuator control signal on line 2737.

Figure 28:
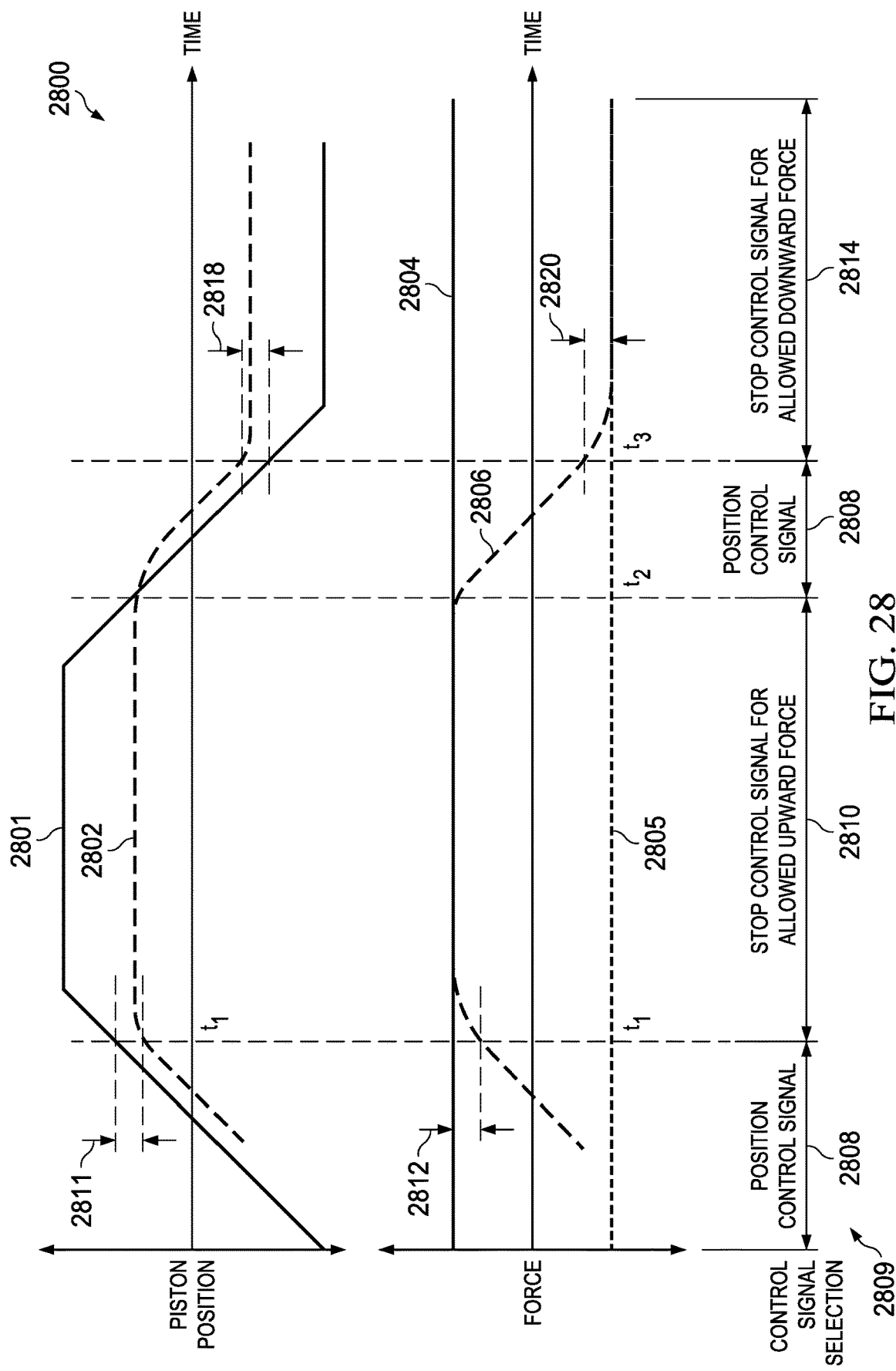
FIG. 28 is an illustration of signals over time in a controller for a flight control surface with an allowed upward force and an allowed downward force in accordance with an illustrative embodiment.

Turning to FIG. 28, an illustration of signals over time in a controller for a flight control surface with an allowed downward force and an allowed upward force is depicted in accordance with an illustrative embodiment. Signals 2800 may be an example of signals in actuator controller 2700 in FIG. 27 for controlling flight control surface 2600 in FIG. 26. The following description of FIG. 28 is made with reference to FIG. 26 and FIG. 27.

Desired piston position 2801 may be an example of a desired position for piston 2608 indicated by position command 2712. Measured piston position 2802 may be an example of the current position of piston 2608 indicated by piston position measurement 2714. Allowed upward force 2804 may be an example of allowed upward force 2726 for flight control surface 2600. Allowed downward force 2805 may be an example of allowed downward force 2734 for flight control surface 2600. Measured force 2806 may be an example of the current amount of force on flight control surface 2600 opposing the upward and downward movement of flight control surface 2600 as indicated by force measurement 2728.

For purposes of simplicity, in this example, the same amount of difference 2710 determined in position controller 2702, difference 2724 determined in stop controller 2704, and difference 2732 determined in stop controller 2704, results in the same absolute value magnitude of the position control signal from position controller 2702 on line 2708, the stop control signal for the allowed upward force from stop controller 2704 on line 2718, and the stop control signal for the allowed downward force from stop controller 2704 on line 2719. For example, without limitation, gain 2716 in position controller 2702, gain 2730 in stop controller 2704, and gain 2736 in stop controller 2704, may be selected to be the same in this case.

Before time $t_1$, the difference between desired piston position 2801 and measured piston position 2802 is a relatively small positive value. The difference between allowed upward force 2804 and measured force 2806 is a relatively large positive value. The difference between allowed downward force 2805 and measured force 2806 is a relatively large negative value. Therefore, applying the selection method of control signal selector 2706 as described above, before time $t_1$, position control signal 2808 based on the difference between desired piston position 2801 and measured piston position 2802 is selected as control signal selection 2809 for controlling actuator 2602. As a result, during this time, measured piston position 2802 follows desired piston position 2801 as piston 2608 is commanded to extend and measured force 2806 on flight control surface 2600 increases toward allowed upward force 2804 as flight control surface 2600 moves upward.

Between time $t_1$ and time $t_2$, the difference between desired piston position 2801 and measured piston position 2802 is a relatively large positive value. The difference between allowed upward force 2804 and measured force 2806 is a relatively small positive value. The difference between allowed downward force 2805 and measured force 2806 is a relatively large negative value. Therefore, applying the selection method of control signal selector 2706 as described above, between time $t_1$ and time $t_2$, stop control signal for allowed upward force 2810 based on the difference between allowed upward force 2804 and measured force 2806 is selected as control signal selection 2809. As a result, during this time, measured force 2806 is prevented from exceeding allowed upward force 2804 even though piston 2608 is commanded to extend further.

At time $t_1$, difference 2811 between desired piston position 2801 and measured piston position 2802 is the same as difference 2812 between allowed upward force 2804 and measured force 2806. Therefore, position control signal 2808 and stop control signal for allowed upward force 2810 may be equal when control signal selection 2809 switches at time $t_1$, resulting in a smooth transition.

Between time $t_2$ and time $t_3$, the difference between desired piston position 2801 and measured piston position 2802 is a relatively small negative value. The difference between allowed upward force 2804 and measured force 2806 is a relatively large positive value. The difference between allowed downward force 2805 and measured force 2806 is a relatively large negative value. Therefore, applying the selection method of control signal selector 2706 as described above, between time $t_2$ and time $t_3$, position control signal 2808 based on the difference between desired piston position 2801 and measured piston position 2802 is selected again as control signal selection 2809 for controlling actuator 2602. As a result, during this time, measured piston position 2802 follows desired piston position 2801 as piston 2608 is commanded to retract and the absolute value of measured force 2806 on flight control surface 2600 increases toward the absolute value of allowed downward force 2805 as flight control surface 2600 moves downward.

After time $t_3$, the difference between desired piston position 2801 and measured piston position 2802 is a relatively large negative value. The difference between allowed upward force 2804 and measured force 2806 is a relatively large positive value. The difference between allowed downward force 2805 and measured force 2806 is a relatively small negative value. Therefore, applying the selection method of control signal selector 2706 as described above, after time $t_3$, stop control signal for allowed downward force 2814 based on the difference between allowed downward force 2805 and measured force 2806 is selected as control signal selection 2809. As a result, during this time, the absolute value of measured force 2806 is prevented from exceeding the absolute value of allowed downward force 2805 even though piston 2608 is commanded to retract further.

At time $t_3$, difference 2818 between desired piston position 2801 and measured piston position 2802 is the same as difference 2820 between allowed downward force 2805 and measured force 2806. Therefore, position control signal 2808 and stop control signal for allowed downward force 2814 may be equal when control signal selection 2809 switches at time $t_3$, resulting in a smooth transition.

Figure 29:
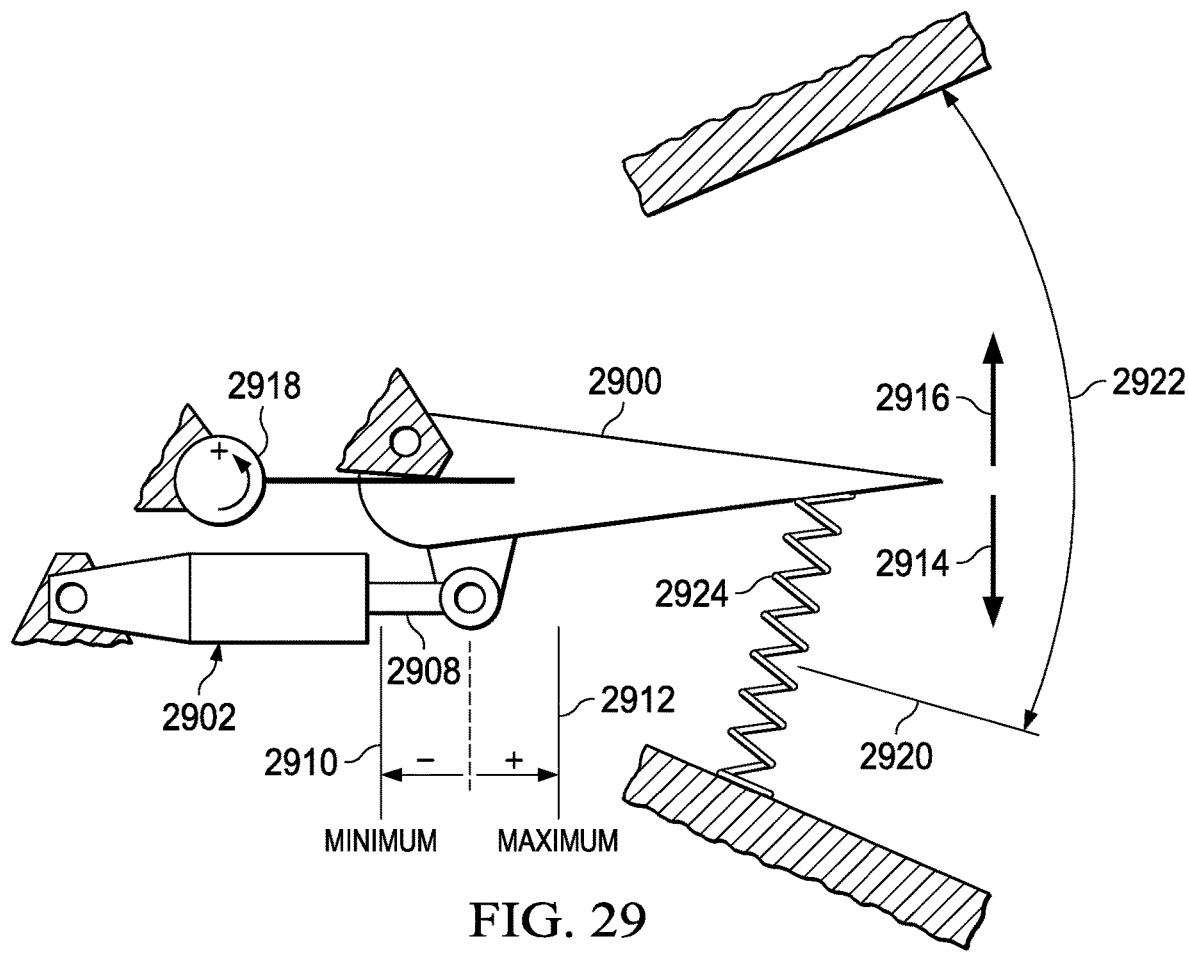
FIG. 29 is an illustration of a flight control surface with a lower stop angle and an allowed downward force in accordance with an illustrative embodiment.

Turning to FIG. 29, an illustration of a flight control surface with a lower stop angle and an allowed downward force is depicted in accordance with an illustrative embodiment. Flight control surface 2900 and actuator 2902 may be examples of one implementation of flight control surface 104 and actuator 103 in FIG. 1.

Actuator 2902 comprises piston 2908. Piston 2908 is moveable over the range indicated between lines 2910 and 2912. Piston 2908 is connected at or near a leading-edge of flight control surface 2900 in an appropriate manner such that retraction of piston 2908 causes the trailing-edge of flight control surface 2900 to move downward in the direction indicated by arrow 2914. In this example, retraction of piston 2908 and downward movement of the trailing-edge of flight control surface 2900 are defined as movements in a negative direction. Extension of piston 2908 causes the trailing-edge of flight control surface 2900 to move upward in the direction indicated by arrow 2916. Extension of piston 2908 and upward movement of the trailing-edge of flight control surface 2900 are defined as movements in a positive direction.

Angle sensor 2918 may be configured to identify the angle of flight control surface 2900 in any appropriate manner. For example, without limitation, angle sensor 2918 may identify the angle of flight control surface 2900 by a physical connection to flight control surface 2900 or in any other appropriate manner.

A lower stop angle for flight control surface 2900 may be defined as the angle of flight control surface 2900 at which the trailing-edge of flight control surface 2900 is at the position indicated by line 2920. The lower stop angle may be fixed or variable. For example, without limitation, the lower stop angle may be defined by a static or moveable object which it is desirable that flight control surface 2900 may approach very closely but not be allowed to strike, or in another appropriate manner.

Spring 2924 represents a force that opposes the downward movement of flight control surface 2900 and that increases as the position of flight control surface 2900 moves downward. In other words, spring 2924 represents a force that must be provided to flight control surface 2900 to move flight control surface 2900 downward in the direction indicated by arrow 2914. For example, without limitation, the force represented by spring 2924 may be the result of a mechanical structure deformation in flight control surface 2900, an air load on flight control surface 2900, another force, or combinations of various forces that oppose the downward movement of flight control surface 2900 and that increase as flight control surface 2900 moves downward. Alternatively, or in addition, spring 2924 may represent a force that opposes retraction of piston 2908 and that increases as piston 2908 is retracted further. In this example, the force represented by spring 2924 is defined as a negative force.

The force on flight control surface 2900 represented by spring 2924 may change due to changing conditions other than changes in the position of flight control surface 2900. For example, without limitation, the force on flight control surface 2900 from an air load may change due to changes in the airspeed of flight control surface 2900.

The amount of force on flight control surface 2900 represented by spring 2924 may be measured in any appropriate manner using any appropriate sensor to identify the current force on flight control surface 2900 opposing the downward movement of flight control surface 2900. For example, without limitation, the current force on flight control surface 2900 may be derived from measured pressure in a hydraulic component in actuator 2902 or in any other appropriate manner.

An allowed downward force may be defined as the maximum allowed force opposing downward movement of flight control surface 2900. For example, without limitation, the allowed downward force may be defined as the maximum allowed force that actuator 2902 may apply to flight control surface 2900 when piston 2908 is retracted to move flight control surface 2900 downward. The allowed downward force may be fixed or variable. In this example, the allowed downward force is defined as a negative force.

Figure 30:
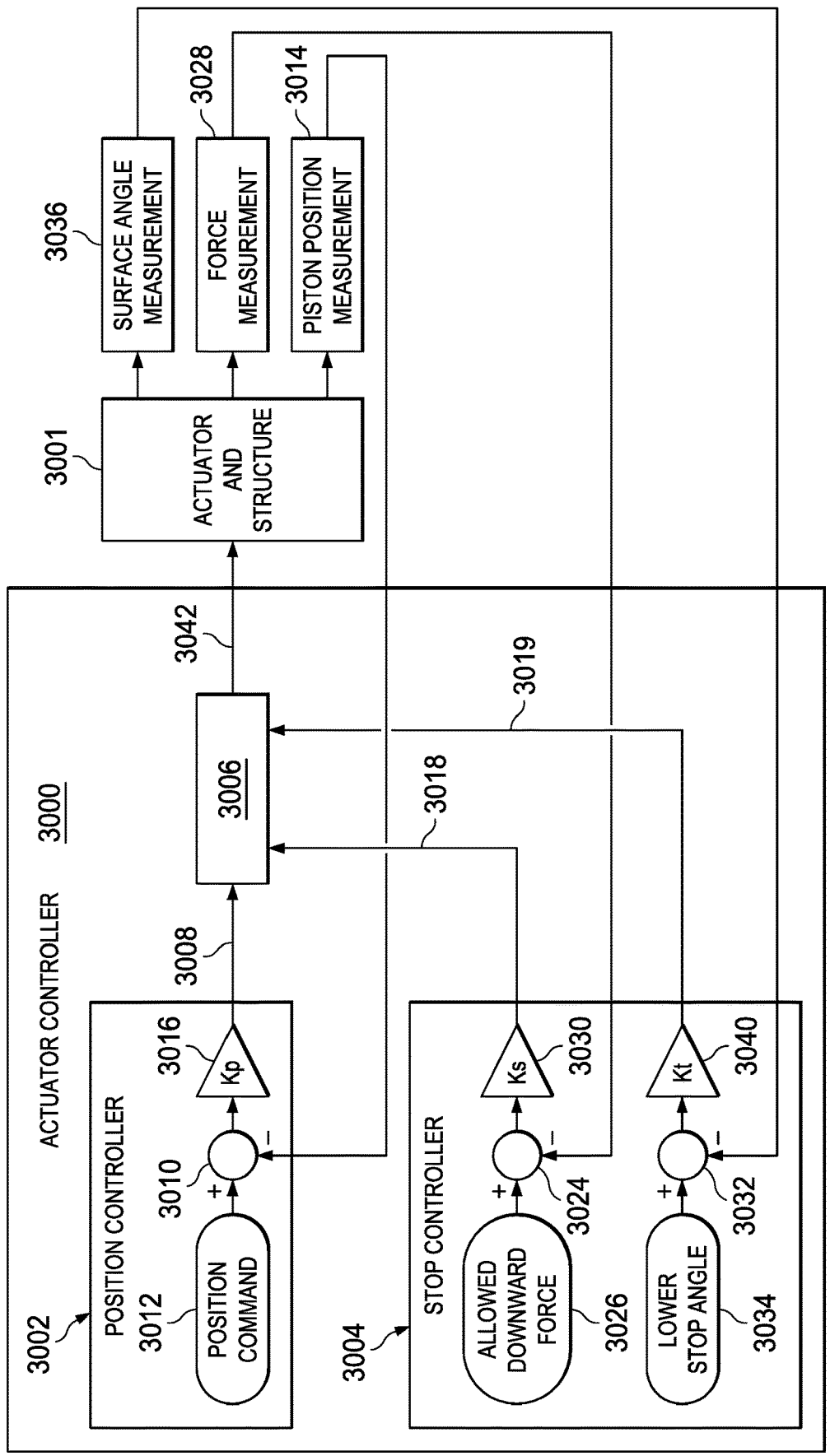
FIG. 30 is an illustration of a block diagram of a controller for a flight control surface with a lower stop angle and an allowed downward force in accordance with an illustrative embodiment.

Turning to FIG. 30, an illustration of a block diagram of a controller for a flight control surface with a lower stop angle and an allowed downward force is depicted in accordance with an illustrative embodiment. Actuator controller 3000 may be an example of one implementation of actuator controller 100 in FIG. 1. Actuator controller 3000 is configured to generate a control signal for controlling the position of actuator and structure 3001 corresponding to actuator 2902 and flight control surface 2900 in FIG. 29. The following description of FIG. 30 is made with reference to FIG. 29.

Actuator controller 3000 comprises position controller 3002, stop controller 3004, and control signal selector 3006. Position controller 3002 generates a position control signal on line 3008. Position controller 3002 is configured to determine difference 3010 between a desired position for piston 2908 indicated by position command 3012 and piston position measurement 3014 indicating the current position of piston 2908. Piston position measurement 3014 may be obtained in any appropriate manner using any appropriate sensor to identify the current position of piston 2908. Difference 3010 between the desired position for piston 2908 and the current position of piston 2908 may be multiplied by gain 3016 to generate the position control signal on line 3008.

Stop controller 3004 generates a stop control signal for an allowed downward force on line 3018 and a stop control signal for a lower stop angle on line 3019. Stop controller 3004 is configured to determine difference 3024 between allowed downward force 3026 for flight control surface 2900 and the current amount of force opposing the downward movement of flight control surface 2900 as indicated by force measurement 3028. Force measurement 3028 may be provided in any appropriate manner using any appropriate sensor to identify the current force on flight control surface 2900 opposing the downward movement of flight control surface 2900. Difference 3024 between allowed downward force 3026 and the current amount of force opposing the downward movement of flight control surface 2900 may be multiplied by an appropriate gain 3030 to generate the stop control signal for the allowed downward force on line 3018.

Stop controller 3004 also is configured to determine difference 3032 between lower stop angle 3034 for flight control surface 2900 and the current angle of flight control surface 2900 as indicated by surface angle measurement 3036. For example, without limitation, surface angle measurement 3036 may be provided by angle sensor 2918. Difference 3032 between lower stop angle 3034 and the current angle of flight control surface 2900 may be multiplied by an appropriate gain 3040 to generate the stop control signal for the lower stop angle on line 3019.

Control signal selector 3006 is configured to select either the position control signal from position controller 3002 on line 3008 or one of the stop control signals from stop controller 3004 on line 3018 or line 3019 to provide as an actuator control signal on line 3042 to control actuator and structure 3001. In this example, control signal selector 3006 selects the largest one of the position control signal on line 3008, the stop control signal for the allowed downward force on line 3018, or the stop control signal for the lower stop angle on line 3019 to provide as the actuator control signal on line 3042.

Figure 31:
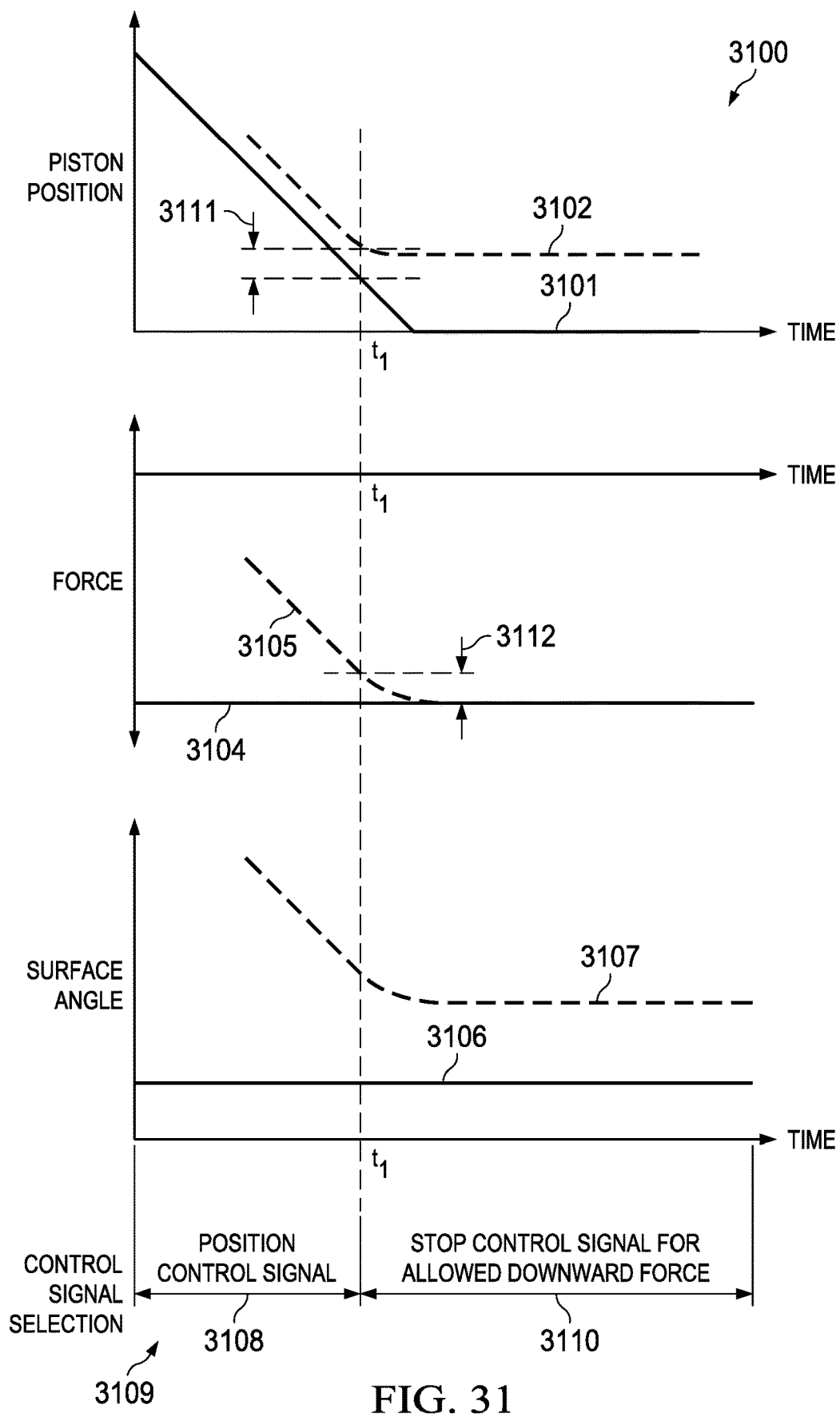
FIG. 31 is an illustration of first signals over time in a controller for a flight control surface with a lower stop angle and an allowed downward force in accordance with an illustrative embodiment.

Turning to FIG. 31, an illustration of first signals over time in a controller for a flight control surface with a lower stop angle and an allowed downward force is depicted in accordance with an illustrative embodiment. Signals 3100 may be an example of signals in actuator controller 3000 in FIG. 30 for controlling flight control surface 2900 in FIG. 29. The following description of FIG. 31 is made with reference to FIG. 29 and FIG. 30.

Desired piston position 3101 may be an example of a desired position for piston 2908 indicated by position command 3012. Measured piston position 3102 may be an example of the current position of piston 2908 indicated by piston position measurement 3014. Allowed downward force 3104 may be an example of allowed downward force 3026 for flight control surface 2900. Measured force 3105 may be an example of the current amount of force on flight control surface 2900 opposing the downward movement of flight control surface 2900 as indicated by force measurement 3028. Lower stop angle 3106 may be an example of lower stop angle 3034 for flight control surface 2900. Measured angle 3107 may be an example of the current angle of flight control surface 2900 as indicated by surface angle measurement 3036.

For purposes of simplicity, in this example, the same amount of difference 3010 determined in position controller 3002, difference 3024 determined in stop controller 3004, and difference 3032 determined in stop controller 3004, results in the same absolute value magnitude of the position control signal from position controller 3002 on line 3008, the stop control signal for the allowed downward force from stop controller 3004 on line 3018, and the stop control signal for the lower stop angle from stop controller 3004 on line 3019. For example, without limitation, gain 3016 in position controller 3002, gain 3030 in stop controller 3004, and gain 3040 in stop controller 3004, may be selected to be the same in this case.

Before time $t_1$, the difference between desired piston position 3101 and measured piston position 3102 is a relatively small negative value. The difference between allowed downward force 3104 and measured force 3105 is a relatively large negative value. The difference between lower stop angle 3106 and measured angle 3107 is a relatively large negative value. Therefore, applying the selection method of control signal selector 3006 as described above, before time $t_1$, position control signal 3108 based on the difference between desired piston position 3101 and measured piston position 3102 is selected as control signal selection 3109 for controlling actuator 2902. As a result, during this time, measured piston position 3102 follows desired piston position 3101 as piston 2908 is commanded to retract and the absolute value of measured force 3105 on flight control surface 2900 increases toward the absolute value of allowed downward force 3104 as measured angle 3107 of flight control surface 2900 moves downward toward lower stop angle 3106.

After time $t_1$, the difference between desired piston position 3101 and measured piston position 3102 is a relatively large negative value. The difference between allowed downward force 3104 and measured force 3105 is a relatively small negative value. The difference between lower stop angle 3106 and measured angle 3107 is a relatively large negative value. Therefore, applying the selection method of control signal selector 3006 as described above, after time $t_1$, stop control signal for allowed downward force 3110 based on the difference between allowed downward force 3104 and measured force 3105 is selected as control signal selection 3109. In this case, measured force 3105 on flight control surface 2900 reaches allowed downward force 3104 before measured angle 3107 of flight control surface 2900 reaches lower stop angle 3106. As a result, during this time, the absolute value of measured force 3105 is prevented from exceeding the absolute value of allowed downward force 3104 even though piston 2908 is commanded to retract further.

At time $t_1$, difference 3111 between desired piston position 3101 and measured piston position 3102 is the same as difference 3112 between allowed downward force 3104 and measured force 3105. Therefore, position control signal 3108 and stop control signal for allowed downward force 3110 may be equal when control signal selection 3109 switches at time $t_1$, resulting in a smooth transition.

Figure 32:
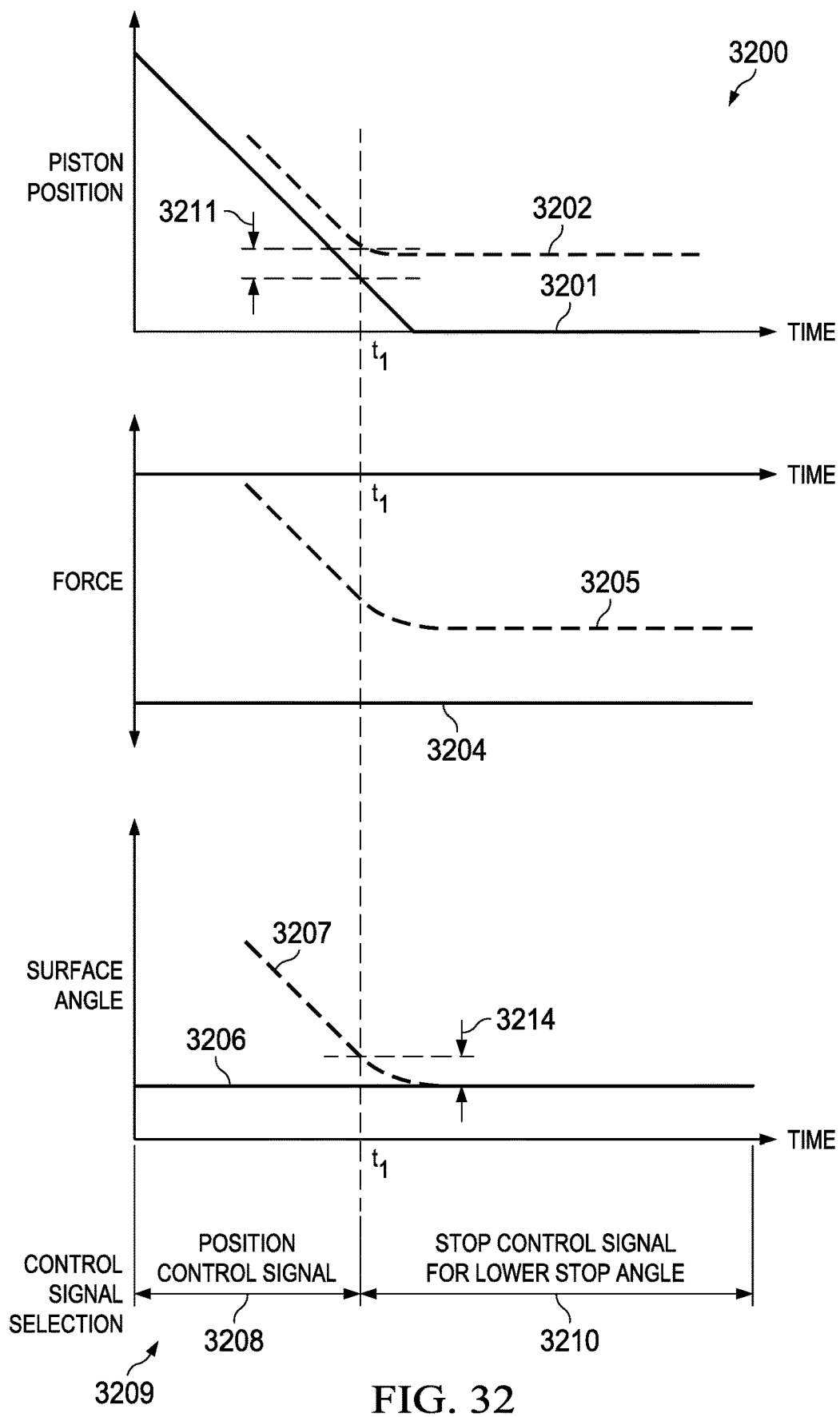
FIG. 32 is an illustration of second signals over time in a controller for a flight control surface with a lower stop angle and an allowed downward force in accordance with an illustrative embodiment.

Turning to FIG. 32, an illustration of second signals over time in a controller for a flight control surface with a lower stop angle and an allowed downward force is depicted in accordance with an illustrative embodiment. Signals 3200 may be an example of signals in actuator controller 3000 in FIG. 30 for controlling flight control surface 2900 in FIG. 29. The following description of FIG. 32 is made with reference to FIG. 29 and FIG. 30.

Desired piston position 3201 may be an example of a desired position for piston 2908 indicated by position command 3012. Measured piston position 3202 may be an example of the current position of piston 2908 indicated by piston position measurement 3014. Allowed downward force 3204 may be an example of allowed downward force 3026 for flight control surface 2900. Measured force 3205 may be an example of the current amount of force on flight control surface 2900 opposing the downward movement of flight control surface 2900 as indicated by force measurement 3028. Lower stop angle 3206 may be an example of lower stop angle 3034 for flight control surface 2900. Measured angle 3207 may be an example of the current angle of flight control surface 2900 as indicated by surface angle measurement 3036.

For purposes of simplicity, in this example, the same amount of difference 3010 determined in position controller 3002, difference 3024 determined in stop controller 3004, and difference 3032 determined in stop controller 3004, results in the same absolute value magnitude of the position control signal from position controller 3002 on line 3008, the stop control signal for the allowed downward force from stop controller 3004 on line 3018, and the stop control signal for the lower stop angle from stop controller 3004 on line 3019. For example, without limitation, gain 3016 in position controller 3002, gain 3030 in stop controller 3004, and gain 3040 in stop controller 3004, may be selected to be the same in this case.

Before time $t_1$, the difference between desired piston position 3201 and measured piston position 3202 is a relatively small negative value. The difference between allowed downward force 3204 and measured force 3205 is a relatively large negative value. The difference between lower stop angle 3206 and measured angle 3207 is a relatively large negative value. Therefore, applying the selection method of control signal selector 3006 as described above, before time $t_1$, position control signal 3208 based on the difference between desired piston position 3201 and measured piston position 3202 is selected as control signal selection 3209 for controlling actuator 2902. As a result, during this time, measured piston position 3202 follows desired piston position 3201 as piston 2908 is commanded to retract and the absolute value of measured force 3205 on flight control surface 2900 increases toward the absolute value of allowed downward force 3204 as measured angle 3207 of flight control surface 2900 moves downward toward lower stop angle 3206.

After time $t_1$, the difference between desired piston position 3201 and measured piston position 3202 is a relatively large negative value. The difference between allowed downward force 3204 and measured force 3205 is a relatively large negative value. The difference between lower stop angle 3206 and measured angle 3207 is a relatively small negative value. Therefore, applying the selection method of control signal selector 3006 as described above, after time $t_1$, stop control signal for lower stop angle 3210 based on the difference between lower stop angle 3206 and measured angle 3207 is selected as control signal selection 3209. In this case, measured angle 3207 of flight control surface 2900 reaches lower stop angle 3206 before measured force 3205 on flight control surface 2900 reaches allowed downward force 3204. As a result, during this time, measured angle 3207 of flight control surface 2900 is prevented from exceeding lower stop angle 3206 even though piston 2908 is commanded to retract further.

At time $t_1$, difference 3211 between desired piston position 3201 and measured piston position 3202 is the same as difference 3214 between lower stop angle 3206 and measured angle 3207. Therefore, position control signal 3208 and stop control signal for lower stop angle 3210 may be equal when control signal selection 3209 switches at time $t_1$, resulting in a smooth transition.

Figure 33:
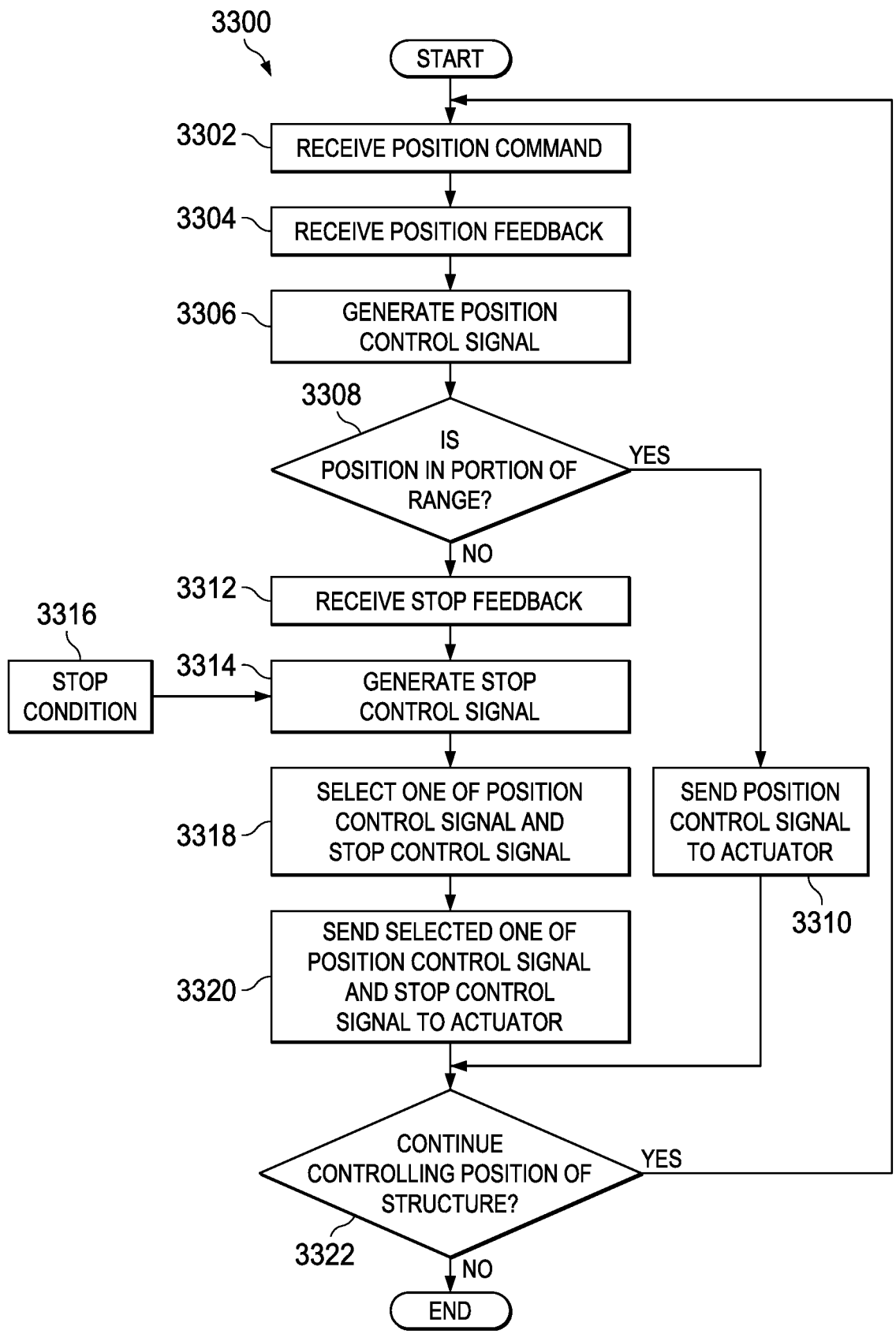
FIG. 33 is an illustration of a flowchart of a process for controlling a position of a structure in accordance with an illustrative embodiment.

Turning to FIG. 33, an illustration of a flowchart of a process for controlling a position of a structure is depicted in accordance with an illustrative embodiment. For example, without limitation, process 3300 may be implemented in actuator controller 100 to control the position of structure 102 in FIG. 1.

Process 3300 may begin with receiving a position command indicating a desired position for the structure (operation 3302). For example, without limitation, the position command may indicate a desired position for the structure itself or for an actuator for moving the structure. Position feedback indicating the actual current position of the structure also may be received (operation 3304). For example, without limitation, the position feedback may be provided by a position sensor for measuring the current position of the structure or of the actuator for moving the structure. A position control signal then may be generated based on a difference between the desired position for the structure and the actual current position indicated by the position feedback (operation 3306). For example, without limitation, the position control signal may be generated by multiplying the difference between the desired position for the structure and the measured current position of the structure by a gain or by using any other control method commonly available and appropriate for the system being controlled.

It then may be determined whether the current position of the structure is within a portion of the range of positions over which the structure is configured to be moved (operation 3308). The portion of the range of positions for the structure may comprise a portion of the range of positions for which it is desirable to control the movement of the structure using only the position control signal generated based on the difference between the desired position for the structure and the actual current position for the structure. For example, without limitation, the portion of the range of positions for the structure may be separated from stop positions for the structure. The position control signal generated in operation 3306 may be sent to an actuator for controlling the position of the structure (operation 3310) in response to a determination at operation 3308 that the position of the structure is within the portion of the range of positions.

When it is determined at operation 3308 that the position of the structure is not within the portion of the range of positions, stop feedback may be received (operation 3312). For example, without limitation, the stop feedback may be provided by any appropriate sensor for measuring a current actual condition corresponding to stop condition 3316. A stop control signal then may be generated (operation 3314) using the stop feedback received in operation 3312 and stop condition 3316. For example, without limitation, the stop control signal may be generated by multiplying the difference between stop condition 3316 for the structure and the measured current condition of the structure by a gain or by using any other control method commonly available and appropriate for the system being controlled.

A selected one of the position control signal generated in operation 3306 and the stop control signal generated in operation 3314 then may be selected (operation 3318). For example, one of the position control signal and the stop control signal may be selected based on the relative magnitudes of the position control signal and the stop control signal. The selected one of the position control signal and the stop control signal then may be sent to the actuator to control the position of the structure (operation 3320).

Following operation 3310 and operation 3320 it may be determined whether controlling the position of the structure is to continue (operation 3322). Process 3300 may be repeated, by returning to operation 3302, in response to a determination at operation 3322 that the position of the structure is to continue to be controlled. Otherwise, the process terminates.

The flowcharts and block diagrams in the different depicted embodiments illustrate the architecture, functionality, and operation of some possible implementations of apparatuses and methods in illustrative embodiments. In this regard, each block in the flowcharts or block diagrams may represent a module, segment, function, and/or a portion of an operation or step. For example, one or more of the blocks may be implemented as program code, in hardware, or a combination of program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order shown in the figures. For example, in some cases, two blocks shown in succession may be executed substantially concurrently, or the blocks may sometimes be performed in the reverse order, depending upon the functionality involved. Also, other blocks may be added in addition to the blocks illustrated in a flowchart or block diagram.

The description of the different illustrative embodiments has been presented for purposes of illustration and description and is not intended to be exhaustive or to limit the embodiments in the form disclosed. For example, illustrative embodiments are not limited to the examples presented in FIGS. 2-31. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of controlling a position of a structure, comprising:
   using an actuator controller to perform the steps of:
   receiving a position command indicating a desired position for the structure, wherein the structure is configured to move over a mechanical range of positions;
   receiving a position feedback signal from a position sensor indicating a position of an actuator of the structure;
   generating a position control signal based on a difference between the desired position and the position of the structure indicated by the position feedback signal;
   receiving, from a stop feedback sensor, a stop feedback signal of a current condition of a control surface of the structure;
   generating a stop control signal based on a difference between the stop feedback signal and a stop condition for the control surface of the structure, wherein the stop condition defines a stop for the control surface of the structure;
   selecting a one of the position control signal and the stop control signal as an actuator control signal by selecting the position control signal to be the actuator control signal in response to a determination that a magnitude of the position control signal is smaller than a magnitude of the stop control signal and selecting the stop control signal to be the actuator control signal in response to a determination that the magnitude of the stop control signal is smaller than the magnitude of the position control signal, wherein the actuator control signal indicates a direction and magnitude of movement of the actuator of the structure in response to the actuator control signal; and
   providing the actuator control signal to the actuator of the structure for controlling the position of the control surface of the structure, wherein the actuator of the structure moves the structure toward the desired position when the actuator control signal provided to the actuator of the structure is the position control signal and moves the control surface of the structure toward a position corresponding to the stop condition when the actuator control signal provided to the actuator of the structure is the stop control signal.

2. The method of claim 1, wherein:
   the position feedback signal indicates the position of the actuator of the structure; and
   the stop feedback signal indicates the position of the control surface of the structure other than by identifying the position of the actuator of the structure.

3. The method of claim 1, wherein the stop feedback signal and the stop condition are selected from:
   the stop feedback signal indicates an angle of the control surface of the structure and the stop condition indicates a stop angle for the control surface of the structure;
   the stop feedback signal indicates a distance of the control surface of the structure from a reference and the stop condition indicates a stop distance from the reference; and
   the stop feedback signal indicates a force on the control surface of the structure and the stop condition indicates an allowed force on the control surface of the structure.

4. The method of claim 1, wherein the actuator of the structure is selected from a linear actuator and a rotary actuator.

5. The method of claim 1, wherein:
   when the position of the control surface of the structure is within a first portion of the mechanical range of positions, the actuator controller is used to perform the step of selecting the position control signal to be the actuator control signal in response to the determination that the magnitude of the position control signal is smaller than the magnitude of the stop control signal and selecting the stop control signal to be the actuator control signal in response to the determination that the magnitude of the stop control signal is smaller than the magnitude of the position control signal; and
   when the position of the control surface of the structure is within a second portion of the mechanical range of positions, the actuator controller selects the position control signal to be the actuator control signal.

6. The method of claim 5, wherein:
   the first portion of the mechanical range of positions is located adjacent to a limit of the mechanical range of positions; and
   the second portion of the mechanical range of positions is located beyond the first portion from the limit of the mechanical range of positions.

7. An apparatus that comprises:
a position controller configured to receive a position command that comprises a desired position for an actuator of a structure, wherein the structure is configured to:
move over a mechanical range of positions;
receive, from a position sensor, a position feedback signal that indicates a position of the structure; and
generate a position control signal based on a difference between the desired position for the actuator of the structure and the position of the actuator of the structure indicated by the position feedback signal;
a stop controller configured to:
receive, from a stop feedback sensor, a stop feedback signal of a condition of a control surface of the structure relative to the position of the control surface of the structure; and
generate a stop control signal based on a difference between the stop feedback signal and a stop condition for the control surface of the structure, wherein the stop condition defines a stop for the control surface of the structure; and
a control signal selector configured to:
select the position control signal as an actuator control signal responsive to a determination that a magnitude of the position control signal being smaller than a magnitude of the stop control signal;
select the stop control signal to be the actuator control signal responsive to a determination that the magnitude of the stop control signal being smaller than the magnitude of the position control signal, wherein the actuator control signal indicates a direction and magnitude of movement of the actuator of the structure in response to the actuator control signal: and
provide the actuator control signal to the actuator and control the position of the control surface of the structure, wherein the actuator of the structure is configured to move the control surface of the structure toward the desired position when the actuator control signal provided to the actuator of the structure is the position control signal and is configured to move the control surface of the structure toward a position that corresponds to the stop condition when the actuator control signal provided to the actuator of the structure is the stop control signal.

8. The apparatus of claim 7, wherein:
the position feedback signal indicates a position of the actuator of the structure; and
the stop feedback signal indicates the position of the control surface of the structure other than by identifying the position of the actuator of the structure.

9. The apparatus of claim 7, wherein the stop feedback signal and the stop condition are selected from:
the stop feedback signal indicates an angle of the structure and the stop condition indicates a stop angle for the structure;
the stop feedback signal indicates a distance of a surface of the structure from a reference and the stop condition indicates a stop distance from the reference; and
the stop feedback signal indicates a force on the control surface of the structure and the stop condition indicates an allowed force on the control surface of the structure.

10. The apparatus of claim 7, wherein the actuator of the structure is selected from a linear actuator and a rotary actuator.

11. The apparatus of claim 7, wherein the control surface of the structure is selected from a group of structures that consists of: an aileron, an elevator, a rudder, a spoiler, a flap, a slat, and an air brake.

12. The apparatus of claim 7, wherein:
responsive to a position of the control surface of the structure being within a first portion of the mechanical range of positions, the control signal selector is configured to select:
the position control signal to be the actuator control signal in response to the determination that the magnitude of the position control signal is smaller than the magnitude of the stop control signal; and
the stop control signal to be the actuator control signal in response to the determination that the magnitude of the stop control signal is smaller than the magnitude of the position control signal; and
responsive to the position of the control surface of the structure being within a second portion of the mechanical range of positions, the control signal selector is configured to select the position control signal to be the actuator control signal.

13. The apparatus of claim 12, wherein:
the first portion of the mechanical range of positions is located adjacent to a limit of the mechanical range of positions; and
the second portion of the mechanical range of positions is located beyond the first portion from the limit of the mechanical range of positions.

14. An apparatus that comprises:
a position controller configured to:
receive a position command that comprises a desired position for an actuator of a structure, wherein the structure is configured to move over a mechanical range of positions,
receive, from a position sensor, a position feedback signal that comprises a position of the structure, and
generate a position control signal based on a difference between the desired position and a position indicated by the position feedback signal;
a stop controller configured to:
receive, from a stop feedback sensor, a stop feedback signal of a condition of a control surface of the structure; and
generate a stop control signal based on a difference between the stop feedback signal and a stop condition for the control surface of the structure, wherein the stop condition defines a stop for the control surface of the structure; and
a control signal selector configured to:
select the position control signal as an actuator control signal responsive to a determination that a magnitude of the position control signal being larger than a magnitude of the stop control signal;
select the stop control signal to be the actuator control signal responsive to a determination that the magnitude of the stop control signal being larger than the magnitude of the position control signal, wherein the actuator control signal indicates a direction and magnitude of movement of the actuator of the structure in response to the actuator control signal: and
provide the actuator control signal to the actuator of the structure and control the position of the control surface of the structure, wherein the actuator of the structure is configured to move the control surface of the structure toward the desired position when the actuator control signal provided to the actuator of the structure is the position control signal and is configured to move the control surface of the structure toward a position corresponding to the stop condition when the actuator control signal provided to the actuator of the structure is the stop control signal.

15. The apparatus of claim 14, wherein:
the position feedback signal indicates a position of the actuator of the structure; and
the stop feedback signal indicates the position of the control surface of the structure other than by identifying the position of the actuator of the structure.

16. The apparatus of claim 14, wherein the stop feedback signal and the stop condition are selected from:
the stop feedback signal indicates an angle of the control surface of the structure and the stop condition indicates a stop angle for the control surface of the structure;
the stop feedback signal indicates a distance of a surface of the control surface of the structure from a reference and the stop condition indicates a stop distance from the reference; and
the stop feedback signal indicates a force on the control surface of the structure and the stop condition indicates an allowed force on the control surface of the structure.

17. The apparatus of claim 14, wherein the actuator of the structure is selected from a linear actuator and a rotary actuator.

18. The apparatus of claim 14, wherein the control surface of the structure comprises a flight control surface on an aircraft.

19. The apparatus of claim 14, wherein:
when a position of the control surface of the structure is within a first portion of the mechanical range of positions, the control signal selector is configured to select the position control signal to be the actuator control signal in response to the determination that the magnitude of the position control signal is larger than the magnitude of the stop control signal and to select the stop control signal to be the actuator control signal in response to the determination that the magnitude of the stop control signal is larger than the magnitude of the position control signal; and
when the position of the control surface of the structure is within a second portion of the mechanical range of positions, the control signal selector is configured to select the position control signal to be the actuator control signal.

20. The apparatus of claim 19, wherein:
the first portion of the mechanical range of positions is located adjacent to a limit of the mechanical range of positions; and
the second portion of the mechanical range of positions is located beyond the first portion from the limit of the mechanical range of positions.

\* \* \* \* \*